US012592759B2

(12) United States Patent (10) Patent No.: US 12,592,759 B2
Khoshnevisan et al. (45) Date of Patent: Mar. 31, 2026

(54) SOUNDING REFERENCE SIGNAL RESOURCE INDICATOR DESIGNS FOR CODEBOOK-BASED COMMUNICATIONS

(71) Applicant: QUALCOMM Incorporated, San Diego, CA (US)

(72) Inventors: Mostafa Khoshnevisan, San Diego, CA (US); Yitao Chen, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 422 days.

(21) Appl. No.: 18/446,347

(22) Filed: Aug. 8, 2023

(65) Prior Publication Data

US 2024/0063875 A1 Feb. 22, 2024

Related U.S. Application Data

(60) Provisional application No. 63/397,271, filed on Aug. 11, 2022.

(51) Int. Cl.
H04B 7/06 (2006.01)
H04L 5/00 (2006.01)
(52) U.S. Cl.
CPC ........... H04B 7/0639 (2013.01); H04B 7/063 (2013.01); H04L 5/0051 (2013.01)
(58) Field of Classification Search
CPC .... H04B 7/0639; H04B 7/063; H04B 7/0628; H04B 7/0404; H04L 5/0051; H04L 5/0048
See application file for complete search history.

(56) References Cited

U.S. PATENT DOCUMENTS 11,901,982 B2 * 2/2024 Ly ......................... H04B 7/0486
2021/0050889 A1 * 2/2021 Park ..................... H04B 7/0482
(Continued)

FOREIGN PATENT DOCUMENTS

CN 118235355 A * 6/2024 .......... H04L 5/0044
EP 4216448 A1 7/2023
(Continued)

OTHER PUBLICATIONS

International Search Report and Written Opinion—PCT/US2023/071943—ISA/EPO—Nov. 27, 2023.
(Continued)

*Primary Examiner* — Ayaz R Sheikh
*Assistant Examiner* — Louis Samara
(74) *Attorney, Agent, or Firm* — QUALCOMM Incorporated

(57) ABSTRACT

Methods, systems, and devices for wireless communications are described. A UE may receive one or more control messages that indicate a quantity of a set of sounding reference signal (SRS) resource sets configured for codebook usage and at least one maximum rank value associated with uplink shared channel transmissions by the UE. The UE may receive downlink control information (DCI) with an SRS resource indicator (SRI) field and a transmit precoding matrix indicator (TPMI) field. The UE may then interpret the SRI and TPMI fields according to a mapping that is based on the maximum rank value and a maximum quantity of ports the UE is capable of supporting. Then, the UE may transmit the uplink shared channel message in accordance with the mapping.

30 Claims, 17 Drawing Sheets

(56)            References Cited

U.S. PATENT DOCUMENTS

| | | | | |
|---|---|---|---|---|
| 2021/0068142 | A1* | 3/2021 | Park ................. | H04W 72/0453 |
| 2021/0226680 | A1 | 7/2021 | Khoshnevisan et al. | |
| 2022/0123799 | A1* | 4/2022 | Varatharaajan ....... | H04L 5/0048 |
| 2022/0399921 | A1* | 12/2022 | Park .................... | H04B 7/0626 |
| 2023/0180252 | A1* | 6/2023 | Khoshnevisan ..... | H04B 7/0404 |
| | | | | 370/329 |

FOREIGN PATENT DOCUMENTS

| | | | | | |
|---|---|---|---|---|---|
| WO | WO-2021203445 | A1 * | 10/2021 | .......... | H04W 52/146 |
| WO | WO-2022060089 | A1 | 3/2022 | | |
| WO | WO-2022067662 | A1 * | 4/2022 | ......... | H04B 7/06966 |
| WO | WO-2023011352 | A1 * | 2/2023 | ........... | H04L 5/0051 |
| WO | WO-2024035772 | A1 * | 2/2024 | ........... | H04B 7/0486 |

OTHER PUBLICATIONS

LG Electronics: "Discussions on Full Tx Power Uplink Transmission", 3GPP TSG RAN WG1 #99, R1-1912271, 3rd Generation Partnership Project, Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019, 8 Pages, XP051823336, Section, DCI size ambiguity, p. 5.

\* cited by examiner

600

130

105

115

Network Entity

Transceiver

1510

Antenna

1515

Communications Manager

1520

Memory

Code

1530

1525

1540

Processor

1535

1505

1500

Figure 16:
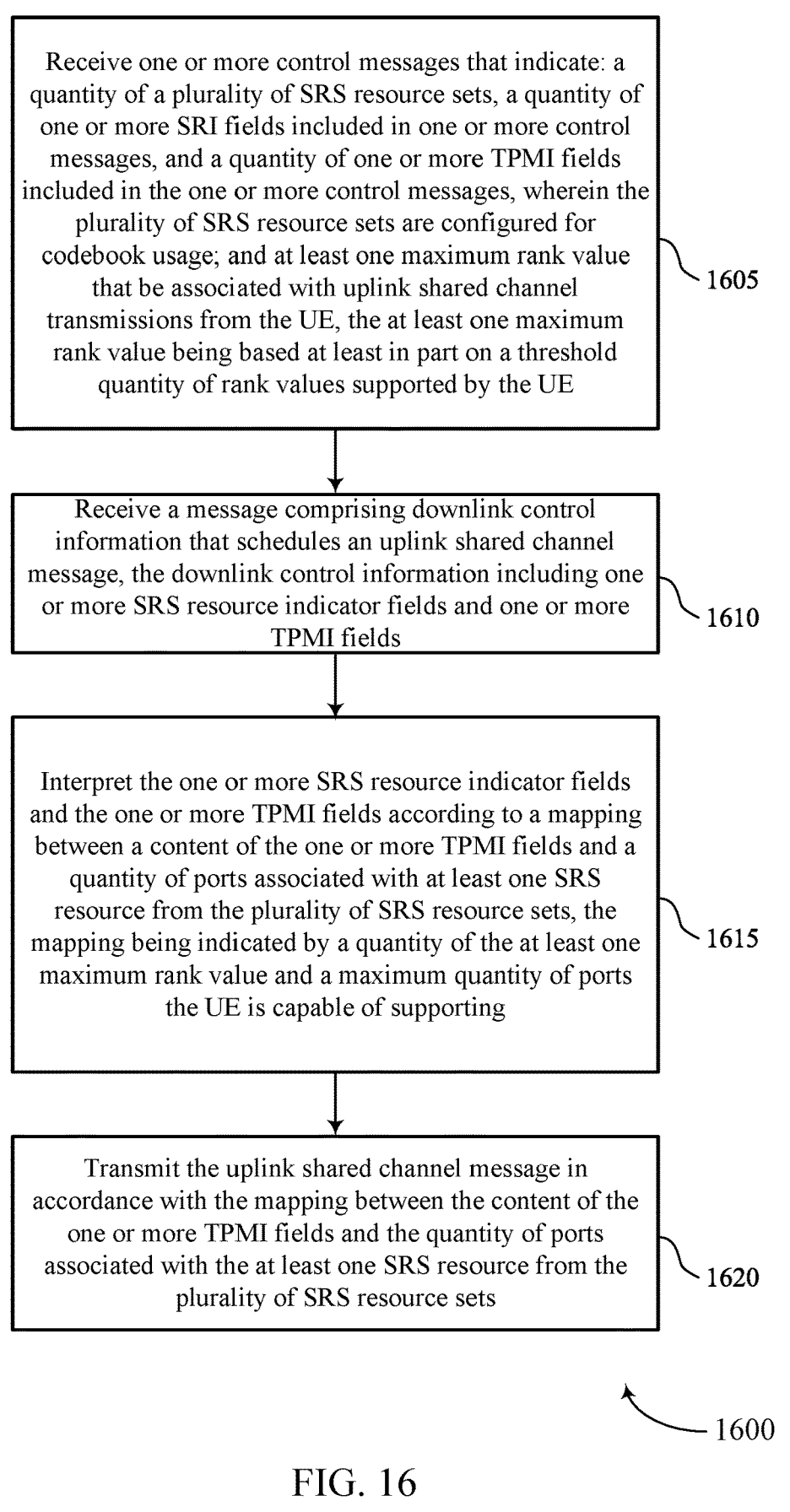

Receive one or more control messages that indicate: a quantity of a plurality of SRS resource sets, a quantity of one or more SRI fields included in one or more control messages, and a quantity of one or more TPMI fields included in the one or more control messages, wherein the plurality of SRS resource sets are configured for codebook usage; and at least one maximum rank value that be associated with uplink shared channel transmissions from the UE, the at least one maximum rank value being based at least in part on a threshold quantity of rank values supported by the UE

1605

Receive a message comprising downlink control information that schedules an uplink shared channel message, the downlink control information including one or more SRS resource indicator fields and one or more TPMI fields

1610

Interpret the one or more SRS resource indicator fields and the one or more TPMI fields according to a mapping between a content of the one or more TPMI fields and a quantity of ports associated with at least one SRS resource from the plurality of SRS resource sets, the mapping being indicated by a quantity of the at least one maximum rank value and a maximum quantity of ports the UE is capable of supporting

1615

Transmit the uplink shared channel message in accordance with the mapping between the content of the one or more TPMI fields and the quantity of ports associated with the at least one SRS resource from the plurality of SRS resource sets

Figure 17:
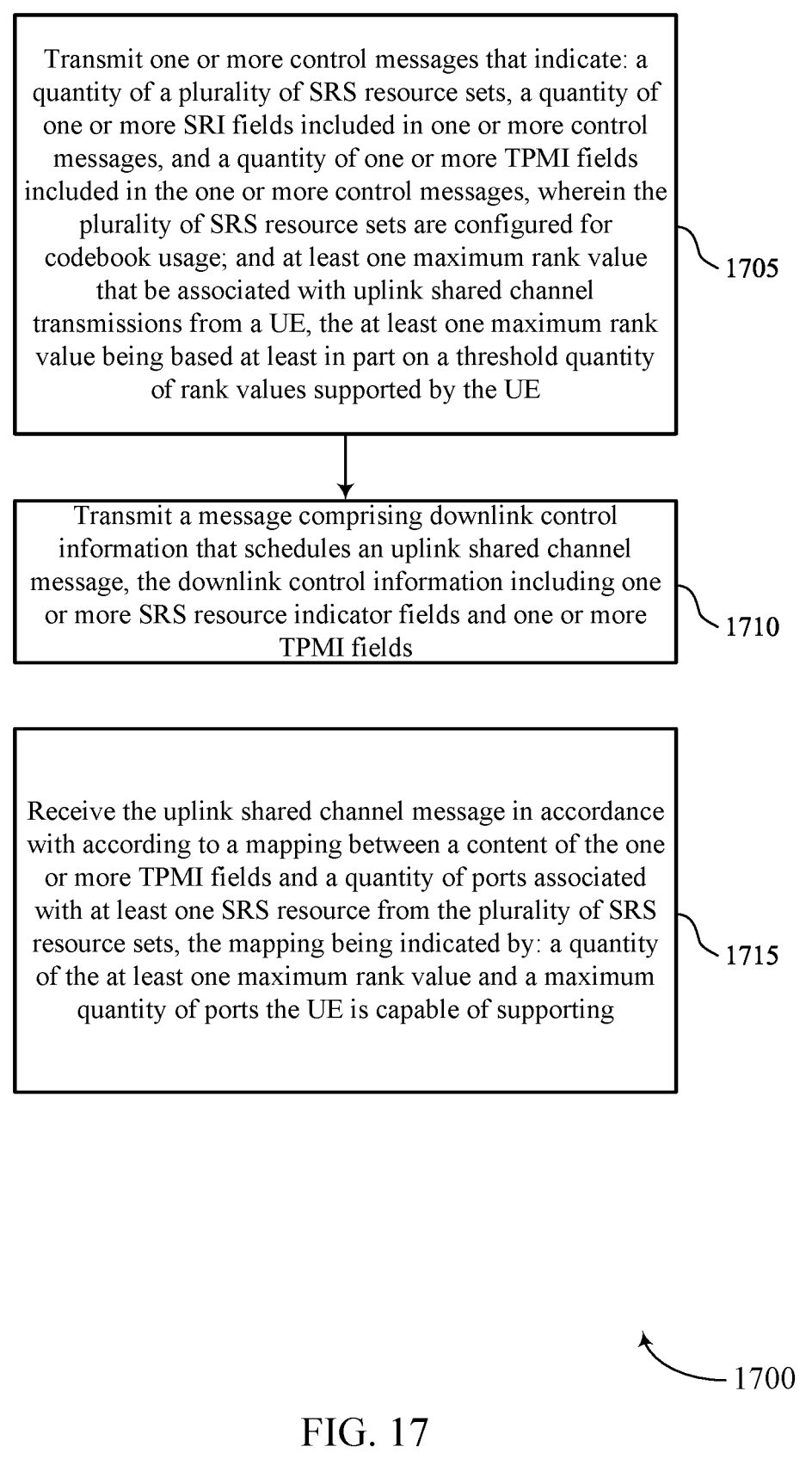

Transmit one or more control messages that indicate: a quantity of a plurality of SRS resource sets, a quantity of one or more SRI fields included in one or more control messages, and a quantity of one or more TPMI fields included in the one or more control messages, wherein the plurality of SRS resource sets are configured for codebook usage; and at least one maximum rank value that be associated with uplink shared channel transmissions from a UE, the at least one maximum rank value being based at least in part on a threshold quantity of rank values supported by the UE

1705

Transmit a message comprising downlink control information that schedules an uplink shared channel message, the downlink control information including one or more SRS resource indicator fields and one or more TPMI fields

1710

Receive the uplink shared channel message in accordance with according to a mapping between a content of the one or more TPMI fields and a quantity of ports associated with at least one SRS resource from the plurality of SRS resource sets, the mapping being indicated by: a quantity of the at least one maximum rank value and a maximum quantity of ports the UE is capable of supporting

SOUNDING REFERENCE SIGNAL RESOURCE INDICATOR DESIGNS FOR CODEBOOK-BASED COMMUNICATIONS

CROSS REFERENCE

The present Application for Patent claims the benefit of U.S. Provisional Patent Application No. 63/397,271 by KHOSHNEVISAN et al., entitled "SOUNDING REFERENCE SIGNAL RESOURCE INDICATOR DESIGNS FOR CODEBOOK-BASED COMMUNICATIONS," filed Aug. 11, 2022, assigned to the assignee hereof, and expressly incorporated by reference herein.

FIELD OF TECHNOLOGY

The following relates to wireless communications, including sounding reference signal (SRS) resource indicator (SRI) designs for codebook (CB)-based communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support sounding reference signal (SRS) resource indicator (SRI) designs for codebook (CB)-based communications. For example, the described techniques provide for a signaling-based mechanism according to which a user equipment (UE) may dynamically switch between communicating with a single transmission and reception point (TRP) in a single TRP (sTRP) operation mode and communicating with multiple TRPs in a multi-TRP (mTRP) operation mode while supporting various configurations relating to how many layers (e.g., a rank) and how many ports the UE may use for uplink transmissions, such as physical uplink shared channel (PUSCH) transmissions. In some aspects, the uplink transmissions may include two or more PUSCH transmissions that at least partially overlap in a time domain. In some cases, the UE may interpret one or more DCI fields (e.g., a transmission precoding matrix indicator (TPMI) field, an SRI field) scheduling a PUSCH transmission in either an sTRP or mTRP operation mode based on a maximum quantity of layers the UE is capable of supporting in an mTRP operation mode when transmitting, via a same component carrier, two PUSCH transmissions that overlap at least partially in a time domain. Based on interpreting the one or more DCI fields, the UE may transmit the one or multiple PUSCH transmissions according to the SRS resources, ports, and layers indicated by the DCI.

A method for wireless communication by a UE is described. The method may include receiving one or more control messages that indicate: a quantity of a set of multiple SRS resource sets, a quantity of one or more SRI fields included in one or more control messages, and a quantity of one or more TPMI fields included in the one or more control messages, where the set of multiple SRS resource sets are configured for CB usage and at least one maximum rank value that is associated with uplink shared channel transmissions from the UE, the at least one maximum rank value being based on a threshold quantity of rank values supported by the UE. The method may additionally include receiving a message including DCI that schedules an uplink shared channel message, the DCI including one or more SRI fields and one or more TPMI fields, interpreting the one or more SRI fields and the one or more TPMI fields according to a mapping between a content of the one or more TPMI fields and a quantity of ports associated with at least one SRS resource from the set of multiple SRS resource sets, the mapping being indicated by: a quantity of the at least one maximum rank value and a maximum quantity of ports the UE is capable of supporting, and transmitting the uplink shared channel message in accordance with the mapping between the content of the one or more TPMI fields and the quantity of ports associated with the at least one SRS resource from the set of multiple SRS resource sets.

A UE for wireless communication is described. The UE may include one or more memories and one or more processors coupled to the one or more memories. The one or more processors may be individually or collectively configured to receive one or more control messages that indicate: a quantity of a set of multiple SRS resource sets, a quantity of one or more SRI fields included in one or more control messages, and a quantity of one or more TPMI fields included in the one or more control messages, where the set of multiple SRS resource sets are configured for CB usage and at least one maximum rank value that be associated with uplink shared channel transmissions from the UE, the at least one maximum rank value being based on a threshold quantity of rank values supported by the UE. In some examples, the one or more processors may be individually or collectively configured to receive a message including DCI that schedules an uplink shared channel message, the DCI including one or more SRI fields and one or more TPMI fields, interpret the one or more SRI fields and the one or more TPMI fields according to a mapping between a content of the one or more TPMI fields and a quantity of ports associated with at least one SRS resource from the set of multiple SRS resource sets, the mapping being indicated by: a quantity of the at least one maximum rank value and a maximum quantity of ports the UE be capable of supporting, and transmit the uplink shared channel message in accordance with the mapping between the content of the one or more TPMI fields and the quantity of ports associated with the at least one SRS resource from the set of multiple SRS resource sets.

Another UE for wireless communication is described. The UE may include means for receiving one or more control messages that indicate: a quantity of a set of multiple SRS resource sets, a quantity of one or more SRI fields included in one or more control messages, and a quantity of one or more TPMI fields included in the one or more control messages, where the set of multiple SRS resource sets are configured for CB usage and means for at least one maximum rank value that is associated with uplink shared channel transmissions from the UE, the at least one maximum rank value being based on a threshold quantity of rank values supported by the UE. In some examples, the UE may include means for receiving a message including DCI that schedules an uplink shared channel message, the DCI including one or more SRI fields and one or more TPMI fields, means for interpreting the one or more SRI fields and the one or more TPMI fields according to a mapping between a content of the one or more TPMI fields and a quantity of ports associated with at least one SRS resource from the set of multiple SRS resource sets, the mapping being indicated by: a quantity of the at least one maximum rank value and a maximum quantity of ports the UE is capable of supporting, and means for transmitting the uplink shared channel message in accordance with the mapping between the content of the one or more TPMI fields and the quantity of ports associated with the at least one SRS resource from the set of multiple SRS resource sets.

A non-transitory computer-readable medium storing code for wireless communication is described. The code may include instructions executable by one or more processors to receive one or more control messages that indicate: a quantity of a set of multiple SRS resource sets, a quantity of one or more SRI fields included in one or more control messages, and a quantity of one or more TPMI fields included in the one or more control messages, where the set of multiple SRS resource sets are configured for CB usage and at least one maximum rank value that be associated with uplink shared channel transmissions from the UE, the at least one maximum rank value being based on a threshold quantity of rank values supported by the UE. In some examples, the instructions may be executable by the one or more processors to receive a message including DCI that schedules an uplink shared channel message, the DCI including one or more SRI fields and one or more TPMI fields, interpret the one or more SRI fields and the one or more TPMI fields according to a mapping between a content of the one or more TPMI fields and a quantity of ports associated with at least one SRS resource from the set of multiple SRS resource sets, the mapping being indicated by: a quantity of the at least one maximum rank value and a maximum quantity of ports the UE be capable of supporting, and transmit the uplink shared channel message in accordance with the mapping between the content of the one or more TPMI fields and the quantity of ports associated with the at least one SRS resource from the set of multiple SRS resource sets.

Some examples of the method, UEs, and non-transitory computer-readable medium described herein may further include operations, features, means, instructions, or one or more processors configured for transmitting, via a capability report, information associated with the maximum quantity of ports the UE may be capable of supporting when the uplink shared channel message may be associated with more than one uplink shared channel that overlap at least partially in a time domain, when the uplink shared channel message may be associated with a single uplink shared channel, or both, where receiving the message including the DCI may be based on transmitting the information via the capability report.

Some examples of the method, UEs, and non-transitory computer-readable medium described herein may further include operations, features, means, instructions, or one or more processors configured for receiving an indication of a configuration associated with the at least one maximum rank value, where the configuration may be either a first configuration or a second configuration, and where: the first configuration indicates that, if the uplink shared channel message is associated with a single uplink shared channel, the maximum quantity of ports associated with the uplink shared channel message may be equal to a larger between a first maximum quantity of ports of a first SRS resource and a second maximum quantity of ports of a second SRS resource and the second configuration indicates that, if the uplink shared channel message is associated with the single uplink shared channel, the maximum quantity of ports associated with the uplink shared channel message may be equal to a summation of the first maximum quantity of ports of the first SRS resource and the second maximum quantity of ports of the second SRS resource.

In some examples of the method, UEs, and non-transitory computer-readable medium described herein, the configuration may be indicated per DCI format, per bandwidth part, or per component carrier.

In some examples of the method, UEs, and non-transitory computer-readable medium described herein, receiving the one or more control messages that indicate the at least one maximum rank value may include operations, features, means, instructions, or one or more processors configured for receiving an indication of a respective maximum rank value for each respective SRS resource set of the set of multiple SRS resource sets configured at the UE.

In some examples of the method, UEs, and non-transitory computer-readable medium described herein, interpreting the one or more TPMI fields may be independent of whether the uplink shared channel message may be associated with more than one uplink shared channel that overlap at least partially in a time domain, interpreting the one or more SRI fields may be independent of whether the uplink shared channel message may be associated with the more than one uplink shared channel that overlap at least partially in the time domain, the at least one maximum rank value that may be associated with uplink shared channel transmissions from the UE may be applicable when the uplink shared channel message may be associated with a single uplink shared channel or the more than one uplink shared channel that overlap at least partially in the time domain, and a threshold quantity of ports supported by the UE may be applicable when the uplink shared channel message may be associated with the single uplink shared channel or the more than one uplink shared channel that overlap at least partially in the time domain.

In some examples of the method, UEs, and non-transitory computer-readable medium described herein, the respective maximum rank value for each respective SRS resource set of the set of multiple SRS resource sets may be applicable when the uplink shared channel message may be associated with a single uplink shared channel or more than one uplink shared channel that overlap at least partially in a time domain.

In some examples of the method, UEs, and non-transitory computer-readable medium described herein, each maximum rank value of the at least one maximum rank value may be indicated per control resource set index value, per SRS resource set, per DCI format, per bandwidth part, or per component carrier.

In some examples of the method, UEs, and non-transitory computer-readable medium described herein, receiving the one or more control messages that indicate the at least one maximum rank value may include operations, features, means, instructions, or one or more processors configured for receiving an indication of a baseline maximum rank value that may be applicable to any one or more of the set of multiple SRS resource sets when the uplink shared channel message may be associated with a single uplink shared channel and receiving an indication of a respective set of one or more maximum rank values for each respective SRS resource set of the set of multiple SRS resource sets, where the respective set of one or more maximum rank values for each respective SRS resource set may be applicable to that respective SRS resource set when the uplink shared channel message may be associated with more than one uplink shared channel that overlap at least partially in a time domain, and where the baseline maximum rank value may be less than or equal to a summation of the respective set of one or more maximum rank values for each respective SRS resource set of the set of multiple SRS resource sets.

In some examples of the method, UEs, and non-transitory computer-readable medium described herein, if the uplink shared channel message is associated with the single uplink shared channel, the one or more TPMI fields each indicate a rank value less than or equal to the baseline maximum rank value and if the uplink shared channel message is associated with the more than one uplink shared channel that overlap at least partially in the time domain, the one or more TPMI fields each indicate rank values that may be less than or equal to the respective set of one or more maximum rank values for each respective SRS resource set of the more than one uplink shared channel that overlap at least partially in the time domain.

In some examples of the method, UEs, and non-transitory computer-readable medium described herein, interpreting the one or more TPMI fields may be independent of whether the uplink shared channel message is associated with the more than one uplink shared channel that overlap at least partially in the time domain, interpreting the one or more SRI fields may be independent of whether the uplink shared channel message is associated with the more than one uplink shared channel that overlap at least partially in the time domain, if the uplink shared channel message is associated with the single uplink shared channel, the one or more SRI fields each indicate a quantity of ports less than or equal to the maximum quantity of ports the UE may be capable of supporting, and if the uplink shared channel message is associated with the more than one uplink shared channel that overlap at least partially in the time domain, the one or more SRI fields each indicate quantities of ports that may be less than or equal to multiple maximum quantities of ports for each respective SRS resource set of the more than one uplink shared channel, where the maximum quantity of ports the UE may be capable of supporting may be equal to a summation of the multiple maximum quantities of ports for each respective SRS resource set.

In some examples of the method, UEs, and non-transitory computer-readable medium described herein, the DCI includes a field including information indicative of whether the uplink shared channel message may be associated with more than one uplink shared channel that overlap at least partially in a time domain and the mapping may be further indicated by whether the uplink shared channel message may be associated with the more than one uplink shared channel that overlap at least partially in the time domain.

In some examples of the method, UEs, and non-transitory computer-readable medium described herein, if the field in the DCI indicates that the uplink shared channel message is associated with a single uplink shared channel, interpreting the one or more TPMI fields includes interpreting the one or more TPMI fields according to the mapping between the content of the one or more TPMI fields and each of the quantity of ports associated with one SRS resource for the single uplink shared channel and if the field in the DCI indicates that the uplink shared channel message is associated with the more than one uplink shared channel that overlap at least partially in the time domain, interpreting the one or more TPMI fields includes interpreting the one or more TPMI fields according to a first mapping between the content of a first TPMI field and a first subset of a first quantity of ports associated with a first SRS resource from a first SRS resource set and a second mapping between the content of a second TPMI field and a second subset of a second quantity of ports associated with a second SRS resource from a second SRS resource set.

In some examples of the method, UEs, and non-transitory computer-readable medium described herein, the first subset includes a first half of the first quantity of ports associated with the first SRS resource and the second subset includes a first half of the second quantity of ports associated with the second SRS resource.

In some examples of the method, UEs, and non-transitory computer-readable medium described herein, receiving the one or more control messages may include operations, features, means, instructions, or one or more processors configured for receiving an indication of the first subset of the first quantity of ports associated with the first SRS resource and the second subset of the second quantity of ports associated with the second SRS resource.

Some examples of the method, UEs, and non-transitory computer-readable medium described herein may further include operations, features, means, instructions, or one or more processors configured for transmitting, via a capability report, information indicating the first subset of the first quantity of ports associated with the first SRS resource and the second subset of the second quantity of ports associated with the second SRS resource, the first subset and the second subset corresponding to maximum quantities of ports the UE may be capable of supporting for the first SRS resource and the second SRS resource when the uplink shared channel message may be associated with the more than one uplink shared channel that overlap at least partially in the time domain.

In some examples of the method, UEs, and non-transitory computer-readable medium described herein, interpreting the one or more SRI fields may be independent of whether the uplink shared channel message may be associated with the more than one uplink shared channel that overlap at least partially in the time domain.

In some examples of the method, UEs, and non-transitory computer-readable medium described herein, a size of each of the one or more TPMI fields corresponds to the maximum quantity of ports the UE may be capable of supporting when the uplink shared channel message may be associated with more than one uplink shared channel that overlap at least partially in the time domain.

In some examples of the method, UEs, and non-transitory computer-readable medium described herein, receiving the message including the DCI includes receiving the message within a first control resource set associated with a first control resource set index value, receiving the message within a second control resource set associated with a second control resource set index value, or a combination thereof, one or more SRS resource sets may be indicated from the set of multiple SRS resource sets by a combination of the field in the DCI that indicates whether the uplink shared channel message may be associated with the more than one uplink shared channel and whether the message including the DCI may be received within the first control resource set associated with the first control resource set index value or the second control resource set associated with the second control resource set index value, and interpreting the one or more SRI fields includes selecting, from the one or more SRS resource sets indicated from the set of multiple SRS resource sets, the at least one SRS resource for transmitting the uplink shared channel message in accordance with the one or more SRI fields.

In some examples of the method, UEs, and non-transitory computer-readable medium described herein, a first SRS resource set may be indicated from the set of multiple SRS resource sets when the field in the DCI indicates that the uplink shared channel message may be associated with a single uplink shared channel and the message including the DCI may be received within the first control resource set associated with the first control resource set index value, a second SRS resource set may be indicated from the set of multiple SRS resource sets when the field in the DCI indicates that the uplink shared channel message may be associated with the single uplink shared channel and the message including the DCI may be received within the second control resource set associated with the second control resource set index value, a third SRS resource set may be indicated from the set of multiple SRS resource sets when the field in the DCI indicates that the uplink shared channel message may be associated with the more than one uplink shared channel and the message including the DCI may be received within the first control resource set associated with the first control resource set index value, and a fourth SRS resource set may be indicated from the set of multiple SRS resource sets when the field in the DCI indicates that the uplink shared channel message may be associated with the more than one uplink shared channel and the message including the DCI may be received within the second control resource set associated with the first control resource set index value.

In some examples of the method, UEs, and non-transitory computer-readable medium described herein, the first SRS resource set and the third SRS resource set may be associated with a first set of common power control parameters, the second SRS resource set and the fourth SRS resource set may be associated with a second set of common power control parameters, a first quantity of SRS resources in the first SRS resource set and the third SRS resource set may be the same, and a second quantity of SRS resources in the second SRS resource set and the fourth SRS resource set may be the same.

In some examples of the method, UEs, and non-transitory computer-readable medium described herein, a first SRS resource having a first position within the first SRS resource set and a second SRS resource having the first position within the third SRS resource set may be associated with a same beam, a same transmission configuration indicator (TCI) state, a same spatial relation information, or a combination thereof, a third SRS resource having a second position within the second SRS resource set and a fourth SRS resource having the second position within the fourth SRS resource set may be associated with a same beam, a same TCI state, a same spatial relation information, or a combination thereof, the first SRS resource having a first position within the third SRS resource set may be associated with a smaller quantity of ports than a second SRS resource having the first position within the first SRS resource set, and the third SRS resource having a second position within the fourth SRS resource set may be associated with a smaller quantity of ports than a fourth SRS resource having the second position within the second SRS resource set.

In some examples of the method, UEs, and non-transitory computer-readable medium described herein, if the message including the DCI is received within the first control resource set, the field including information indicative of whether the uplink shared channel message may be associated with more than one uplink shared channel that overlap at least partially in the time domain includes one bit that indicates and if the message including the DCI is received within the second control resource set, the field including information indicative of whether the uplink shared channel message may be associated with more than one uplink shared channel that overlap at least partially in the time domain includes one bit that indicates.

In some examples of the method, UEs, and non-transitory computer-readable medium described herein, interpreting the one or more SRI fields may be based on a combination of the field in the DCI that indicates whether the uplink shared channel message may be associated with the more than one uplink shared channel and whether the message including the DCI may be received within the first control resource set associated with the first control resource set index value or the second control resource set associated with the second control resource set index value and interpreting the one or more TPMI fields may be based on a quantity of ports associated with the selected at least one SRS resource for transmitting the uplink shared channel message.

In some examples of the method, UEs, and non-transitory computer-readable medium described herein, the field including information indicative of whether the uplink shared channel message is associated with more than one uplink shared channel that overlap at least partially in the time domain may include one bit that indicates: the uplink shared channel message is associated with a single uplink shared channel; or the uplink shared channel message is associated with the more than one uplink shared channel that overlap at least partially in the time domain.

A method for wireless communication by a network entity is described. The method may include transmitting one or more control messages that indicate: a quantity of a set of multiple SRS resource sets, a quantity of one or more SRI fields included in one or more control messages, and a quantity of one or more TPMI fields included in the one or more control messages, where the set of multiple SRS resource sets are configured for CB usage and at least one maximum rank value that is associated with uplink shared channel transmissions from a UE, the at least one maximum rank value being based on a threshold quantity of rank values supported by the UE. In some examples, the method may include transmitting a message including DCI that schedules an uplink shared channel message, the DCI including one or more SRI fields and one or more TPMI fields, and receiving the uplink shared channel message in accordance with according to a mapping between a content of the one or more TPMI fields and a quantity of ports associated with at least one SRS resource from the set of multiple SRS resource sets, the mapping being indicated by: a quantity of the at least one maximum rank value and a maximum quantity of ports the UE is capable of supporting.

A network entity for wireless communication is described. The network entity may include one or more memories and one or more processors coupled to the one or more memories. The one or more processors may be individually or collectively configured to transmit one or more control messages that indicate: a quantity of a set of multiple SRS resource sets, a quantity of one or more SRI fields included in one or more control messages, and a quantity of one or more TPMI fields included in the one or more control messages, where the set of multiple SRS resource sets are configured for CB usage and at least one maximum rank value that be associated with uplink shared channel transmissions from a UE, the at least one maximum rank value being based on a threshold quantity of rank values supported by the UE. In some examples, the one or more processors may be individually or collectively configured to transmit a message including DCI that schedules an uplink shared channel message, the DCI including one or more SRI fields and one or more TPMI fields, and receive the uplink shared channel message in accordance with according to a mapping between a content of the one or more TPMI fields and a quantity of ports associated with at least one SRS resource from the set of multiple SRS resource sets, the mapping being indicated by: a quantity of the at least one maximum rank value and a maximum quantity of ports the UE be capable of supporting.

Another network entity for wireless communication is described. The network entity may include means for transmitting one or more control messages that indicate: a quantity of a set of multiple SRS resource sets, a quantity of one or more SRI fields included in one or more control messages, and a quantity of one or more TPMI fields included in the one or more control messages, where the set of multiple SRS resource sets are configured for CB usage and means for at least one maximum rank value that is associated with uplink shared channel transmissions from a UE, the at least one maximum rank value being based on a threshold quantity of rank values supported by the UE. In some examples, the network entity may include means for transmitting a message including DCI that schedules an uplink shared channel message, the DCI including one or more SRI fields and one or more TPMI fields, and means for receiving the uplink shared channel message in accordance with according to a mapping between a content of the one or more TPMI fields and a quantity of ports associated with at least one SRS resource from the set of multiple SRS resource sets, the mapping being indicated by: a quantity of the at least one maximum rank value and a maximum quantity of ports the UE is capable of supporting.

A non-transitory computer-readable medium storing code for wireless communication is described. The code may include instructions executable by one or more processors to transmit one or more control messages that indicate: a quantity of a set of multiple SRS resource sets, a quantity of one or more SRI fields included in one or more control messages, and a quantity of one or more TPMI fields included in the one or more control messages, where the set of multiple SRS resource sets are configured for CB usage and at least one maximum rank value that be associated with uplink shared channel transmissions from a UE, the at least one maximum rank value being based on a threshold quantity of rank values supported by the UE. In some examples, the instructions may be executable by the one or more processors to transmit a message including DCI that schedules an uplink shared channel message, the DCI including one or more SRI fields and one or more TPMI fields, and receive the uplink shared channel message in accordance with according to a mapping between a content of the one or more TPMI fields and a quantity of ports associated with at least one SRS resource from the set of multiple SRS resource sets, the mapping being indicated by: a quantity of the at least one maximum rank value and a maximum quantity of ports the UE be capable of supporting.

Some examples of the method, network entities, and non-transitory computer-readable medium described herein may further include operations, features, means, instructions, or one or more processors configured for receiving, via a capability report, information associated with the maximum quantity of ports the UE may be capable of supporting when the uplink shared channel message may be associated with more than one uplink shared channel that overlap at least partially in a time domain, when the uplink shared channel message may be associated with a single uplink shared channel, or both, where transmitting the message including the DCI may be based on transmitting the information via the capability report.

Some examples of the method, network entities, and non-transitory computer-readable medium described herein may further include operations, features, means, instructions, or one or more processors configured for transmitting an indication of a configuration associated with the at least one maximum rank value, where the configuration may be either a first configuration or a second configuration, and where: the first configuration indicates that, if the uplink shared channel message is associated with a single uplink shared channel, the maximum quantity of ports associated with the uplink shared channel message may be equal to a larger between a first maximum quantity of ports of a first SRS resource and a second maximum quantity of ports of a second SRS resource and the second configuration indicates that, if the uplink shared channel message is associated with the single uplink shared channel, the maximum quantity of ports associated with the uplink shared channel message may be equal to a summation of the first maximum quantity of ports of the first SRS resource and the second maximum quantity of ports of the second SRS resource.

In some examples of the method, network entities, and non-transitory computer-readable medium described herein, the configuration may be indicated per DCI format, per bandwidth part, or per component carrier.

In some examples of the method, network entities, and non-transitory computer-readable medium described herein, transmitting the one or more control messages that indicate the at least one maximum rank value may include operations, features, means, instructions, or one or more processors configured for transmitting an indication of a respective maximum rank value for each respective SRS resource set of the set of multiple SRS resource sets configured at the UE.

In some examples of the method, network entities, and non-transitory computer-readable medium described herein, an interpretation of the one or more TPMI fields may be independent of whether the uplink shared channel message may be associated with more than one uplink shared channel that overlap at least partially in a time domain, an interpretation of the one or more SRI fields may be independent of whether the uplink shared channel message may be associated with the more than one uplink shared channel that overlap at least partially in the time domain, the at least one maximum rank value that may be associated with uplink shared channel transmissions from the UE may be applicable when the uplink shared channel message may be associated with a single uplink shared channel or the more than one uplink shared channel that overlap at least partially in the time domain, and a threshold quantity of ports supported by the UE may be applicable when the uplink shared channel message may be associated with the single uplink shared channel or the more than one uplink shared channel that overlap at least partially in the time domain.

In some examples of the method, network entities, and non-transitory computer-readable medium described herein, the respective maximum rank value for each respective SRS resource set of the set of multiple SRS resource sets may be applicable when the uplink shared channel message may be associated with a single uplink shared channel or more than one uplink shared channel that overlap at least partially in a time domain.

In some examples of the method, network entities, and non-transitory computer-readable medium described herein, each maximum rank value of the at least one maximum rank value may be indicated per control resource set index value, per SRS resource set, per DCI format, per bandwidth part, or per component carrier.

In some examples of the method, network entities, and non-transitory computer-readable medium described herein, transmitting the one or more control messages that indicate the at least one maximum rank value may include operations, features, means, instructions, or one or more processors configured for transmitting an indication of a baseline maximum rank value that may be applicable to any one or more of the set of multiple SRS resource sets when the uplink shared channel message may be associated with a single uplink shared channel and transmitting an indication of a respective set of one or more maximum rank values for each respective SRS resource set of the set of multiple SRS resource sets, where the respective set of one or more maximum rank values for each respective SRS resource set may be applicable to that respective SRS resource set when the uplink shared channel message may be associated with more than one uplink shared channel that overlap at least partially in a time domain, and where the baseline maximum rank value may be less than or equal to a summation of the respective set of one or more maximum rank values for each respective SRS resource set of the set of multiple SRS resource sets.

In some examples of the method, network entities, and non-transitory computer-readable medium described herein, if the uplink shared channel message is associated with the single uplink shared channel, the one or more TPMI fields each indicate a rank value less than or equal to the baseline maximum rank value and if the uplink shared channel message is associated with the more than one uplink shared channel that overlap at least partially in the time domain, the one or more TPMI fields each indicate rank values that may be less than or equal to the respective set of one or more maximum rank values for each respective SRS resource set of the more than one uplink shared channel that overlap at least partially in the time domain.

In some examples of the method, network entities, and non-transitory computer-readable medium described herein, an interpretation of the one or more TPMI fields may be independent of whether the uplink shared channel message may be associated with the more than one uplink shared channel that overlap at least partially in the time domain, an interpretation of the one or more SRI fields may be independent of whether the uplink shared channel message may be associated with the more than one uplink shared channel that overlap at least partially in the time domain, if the uplink shared channel message is associated with the single uplink shared channel, the one or more SRI fields each indicate a quantity of ports less than or equal to the maximum quantity of ports the UE may be capable of supporting, and if the uplink shared channel message is associated with the more than one uplink shared channel that overlap at least partially in the time domain, the one or more SRI fields each indicate quantities of ports that may be less than or equal to multiple maximum quantities of ports for each respective SRS resource set of the more than one uplink shared channel, where the maximum quantity of ports the UE may be capable of supporting may be equal to a summation of the multiple maximum quantities of ports for each respective SRS resource set.

In some examples of the method, network entities, and non-transitory computer-readable medium described herein, the DCI includes a field including information indicative of whether the uplink shared channel message may be associated with more than one uplink shared channel that overlap at least partially in a time domain and the mapping may be further indicated by whether the uplink shared channel message may be associated with the more than one uplink shared channel that overlap at least partially in the time domain.

In some examples of the method, network entities, and non-transitory computer-readable medium described herein, if the field in the DCI indicates that the uplink shared channel message is associated with a single uplink shared channel, an interpretation of the one or more TPMI fields includes interpreting the one or more TPMI fields according to the mapping between the content of the one or more TPMI fields and each of the quantity of ports associated with one SRS resource for the single uplink shared channels and if the field in the DCI indicates that the uplink shared channel message is associated with the more than one uplink shared channel that overlap at least partially in the time domain, an interpretation of the one or more TPMI fields includes interpreting the one or more TPMI fields according to a first mapping between the content of a first TPMI field and a first subset of a first quantity of ports associated with a first SRS resource from a first SRS resource set and a second mapping between the content of a second TPMI field and a second subset of a second quantity of ports associated with a second SRS resource from a second SRS resource set.

In some examples of the method, network entities, and non-transitory computer-readable medium described herein, the first subset includes a first half of the first quantity of ports associated with the first SRS resource and the second subset includes a first half of the second quantity of ports associated with the second SRS resource.

In some examples of the method, network entities, and non-transitory computer-readable medium described herein, transmitting the one or more control messages may include operations, features, means, instructions, or one or more processors configured for transmitting an indication of the first subset of the first quantity of ports associated with the first SRS resource and the second subset of the second quantity of ports associated with the second SRS resource.

Some examples of the method, network entities, and non-transitory computer-readable medium described herein may further include operations, features, means, instructions, or one or more processors configured for receiving, via a capability report, information indicating the first subset of the first quantity of ports associated with the first SRS resource and the second subset of the second quantity of ports associated with the second SRS resource, the first subset and the second subset corresponding to maximum quantities of ports the UE may be capable of supporting for the first SRS resource and the second SRS resource when the uplink shared channel message may be associated with the more than one uplink shared channel that overlap at least partially in the time domain.

In some examples of the method, network entities, and non-transitory computer-readable medium described herein, the interpretation of the one or more SRI fields may be independent of whether the uplink shared channel message may be associated with the more than one uplink shared channel that overlap at least partially in the time domain.

In some examples of the method, network entities, and non-transitory computer-readable medium described herein, a size of each of the one or more TPMI fields corresponds to the maximum quantity of ports the UE may be capable of supporting when the uplink shared channel message may be associated with more than one uplink shared channel that overlap at least partially in the time domain.

In some examples of the method, network entities, and non-transitory computer-readable medium described herein, transmitting the message including the DCI includes transmitting the message within a first control resource set associated with a first control resource set index value, transmitting the message within a second control resource set associated with a second control resource set index value, or a combination thereof, one or more SRS resource sets may be indicated from the set of multiple SRS resource sets by a combination of the field in the DCI that indicates whether the uplink shared channel message may be associated with the more than one uplink shared channel and whether the message including the DCI may be transmitted within the first control resource set associated with the first control resource set index value or the second control resource set associated with the second control resource set index value, and an interpretation of the one or more SRI fields includes selecting, from the one or more SRS resource sets indicated from the set of multiple SRS resource sets, the at least one SRS resource for receiving the uplink shared channel message in accordance with the one or more SRI fields.

In some examples of the method, network entities, and non-transitory computer-readable medium described herein, a first SRS resource set may be indicated from the set of multiple SRS resource sets when the field in the DCI indicates that the uplink shared channel message may be associated with a single uplink shared channel and the message including the DCI may be transmitted within the first control resource set associated with the first control resource set index value, a second SRS resource set may be indicated from the set of multiple SRS resource sets when the field in the DCI indicates that the uplink shared channel message may be associated with the single uplink shared channel and the message including the DCI may be transmitted within the second control resource set associated with the second control resource set index value, a third SRS resource set may be indicated from the set of multiple SRS resource sets when the field in the DCI indicates that the uplink shared channel message may be associated with the more than one uplink shared channel and the message including the DCI may be transmitted within the first control resource set associated with the first control resource set index value, and a fourth SRS resource set may be indicated from the set of multiple SRS resource sets when the field in the DCI indicates that the uplink shared channel message may be associated with the more than one uplink shared channel and the message including the DCI may be transmitted within the second control resource set associated with the first control resource set index value.

In some examples of the method, network entities, and non-transitory computer-readable medium described herein, the first SRS resource set and the third SRS resource set may be associated with a first set of common power control parameters, the second SRS resource set and the fourth SRS resource set may be associated with a second set of common power control parameters, a first quantity of SRS resources in the first SRS resource set and the third SRS resource set may be the same, and a second quantity of SRS resources in the second SRS resource set and the fourth SRS resource set may be the same.

In some examples of the method, network entities, and non-transitory computer-readable medium described herein, a first SRS resource having a first position within the first SRS resource set and a second SRS resource having the first position within the third SRS resource set may be associated with a same beam, a same TCI state, a same spatial relation information, or a combination thereof, a third SRS resource having a second position within the second SRS resource set and a fourth SRS resource having the second position within the fourth SRS resource set may be associated with a same beam, a same TCI state, a same spatial relation information, or a combination thereof, the first SRS resource having a first position within the third SRS resource set may be associated with a smaller quantity of ports than a second SRS resource having the first position within the first SRS resource set, and the third SRS resource having a second position within the fourth SRS resource set may be associated with a smaller quantity of ports than a fourth SRS resource having the second position within the second SRS resource set.

In some examples of the method, network entities, and non-transitory computer-readable medium described herein, if the message including the DCI may be transmitted within the first control resource set, the field including information indicative of whether the uplink shared channel message may be associated with more than one uplink shared channel that overlap at least partially in the time domain includes one bit that indicates and if the message including the DCI may be transmitted within the second control resource set, the field including information indicative of whether the uplink shared channel message may be associated with more than one uplink shared channel that overlap at least partially in the time domain includes one bit that indicates.

In some examples of the method, network entities, and non-transitory computer-readable medium described herein, the interpretation of the one or more SRI fields may be based on a combination of the field in the DCI that indicates whether the uplink shared channel message may be associated with the more than one uplink shared channel and whether the message including the DCI may be transmitted within the first control resource set associated with the first control resource set index value or the second control resource set associated with the second control resource set index value and an interpretation of the one or more TPMI fields may be based on a quantity of ports associated with the selected at least one SRS resource for receiving the uplink shared channel message.

In some examples of the method, network entities, and non-transitory computer-readable medium described herein, the field including information indicative of whether the uplink shared channel message is associated with more than one uplink shared channel that overlap at least partially in the time domain may include one bit that indicates: the uplink shared channel message is associated with a single uplink shared channel; or the uplink shared channel message is associated with the more than one uplink shared channel that overlap at least partially in the time domain.

Figure 4:
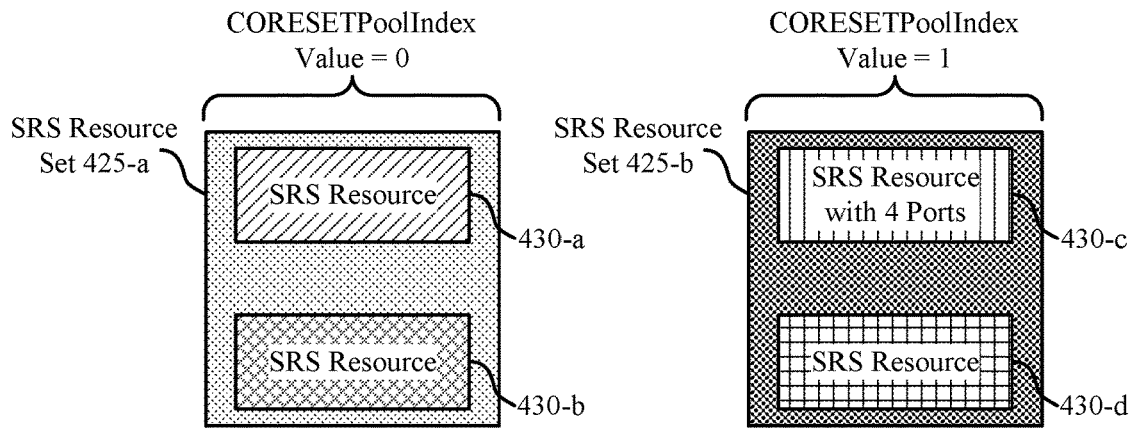
Figure 4:
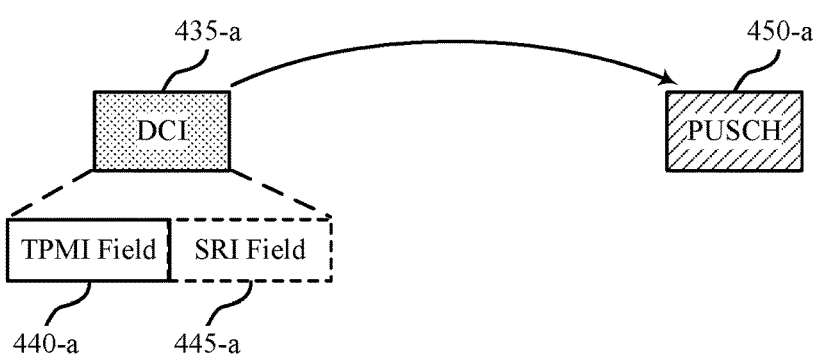
Figure 4:
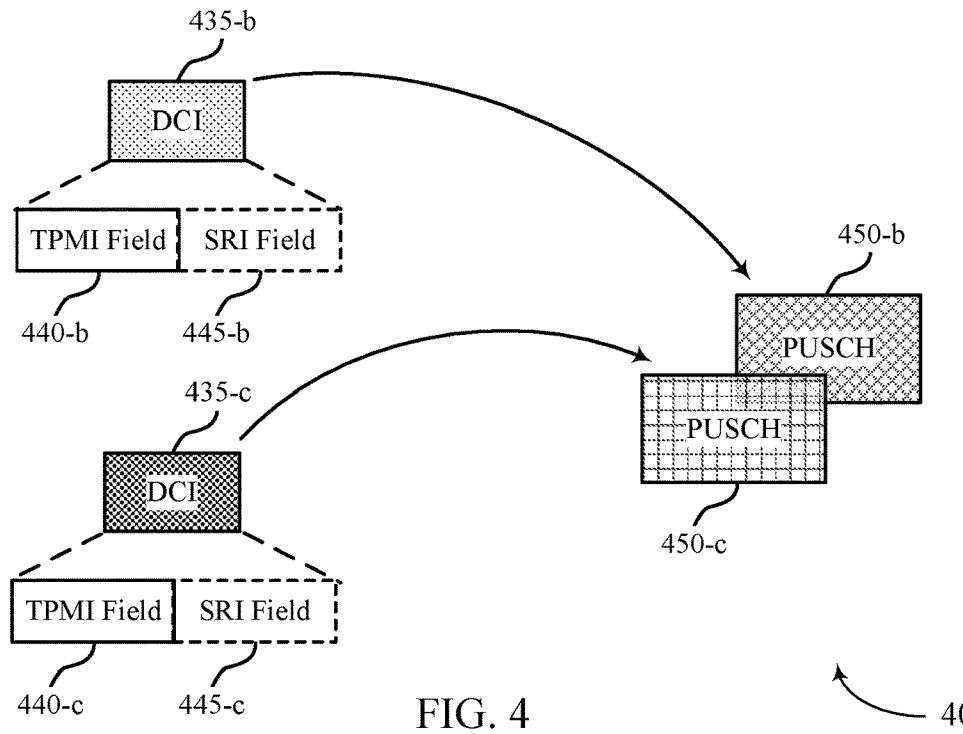
Figure 5:
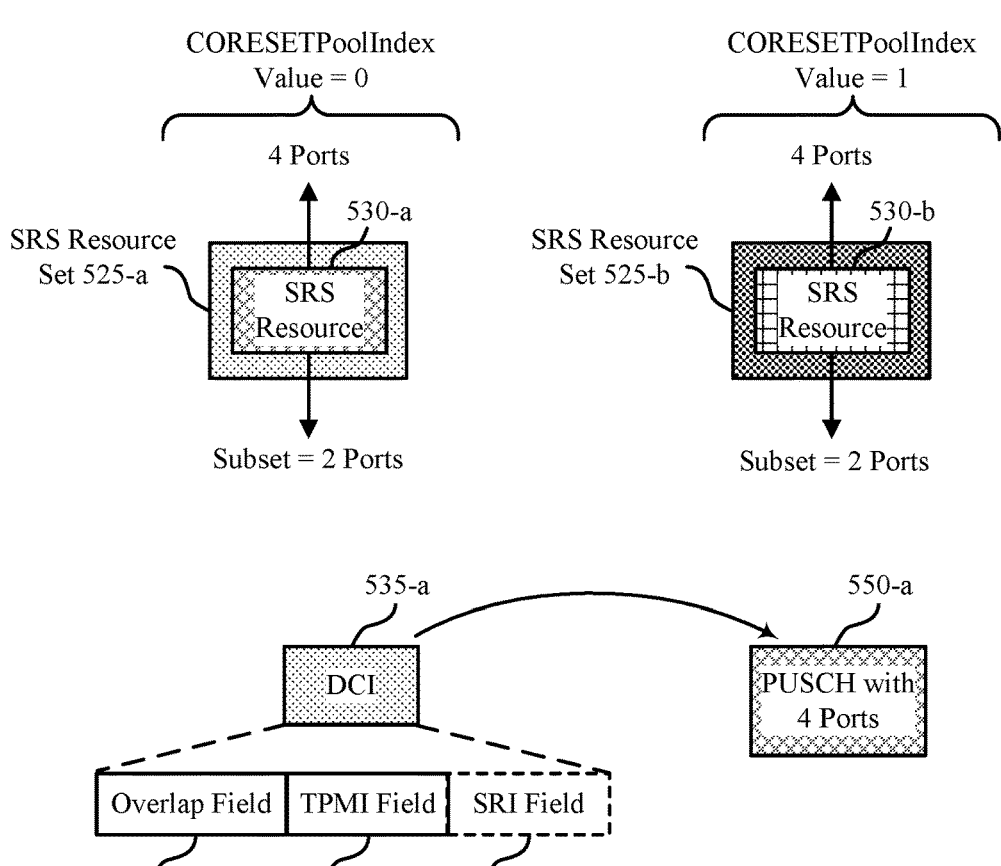
Figure 5:
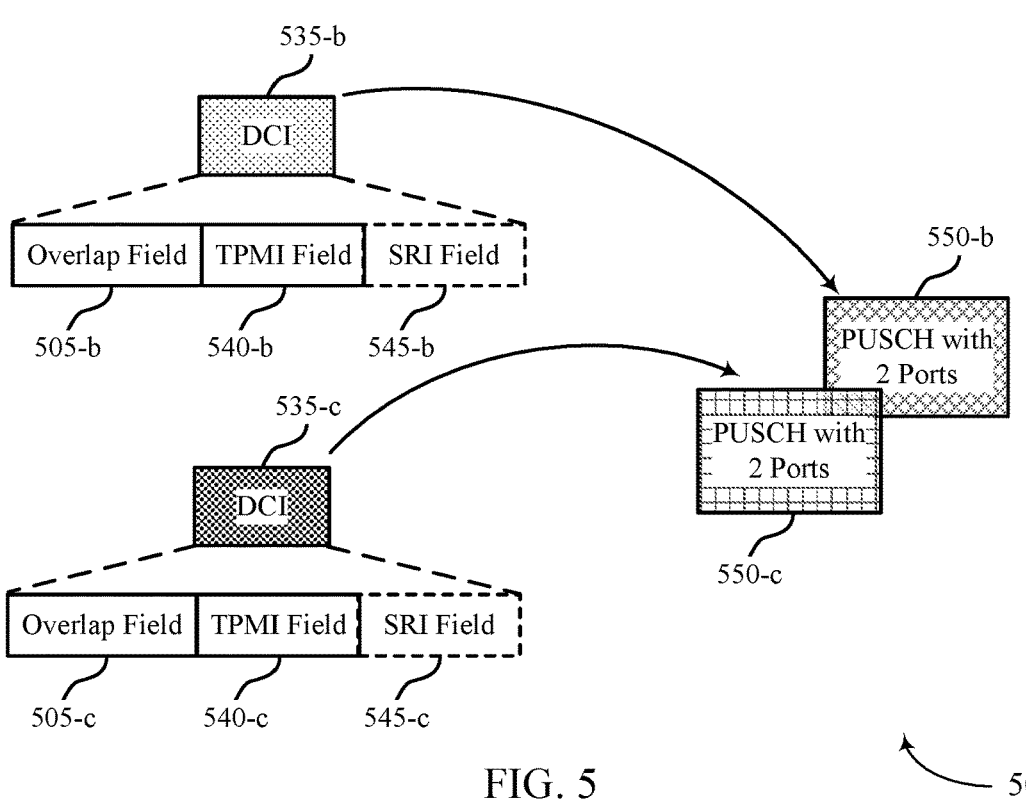
Figure 6:
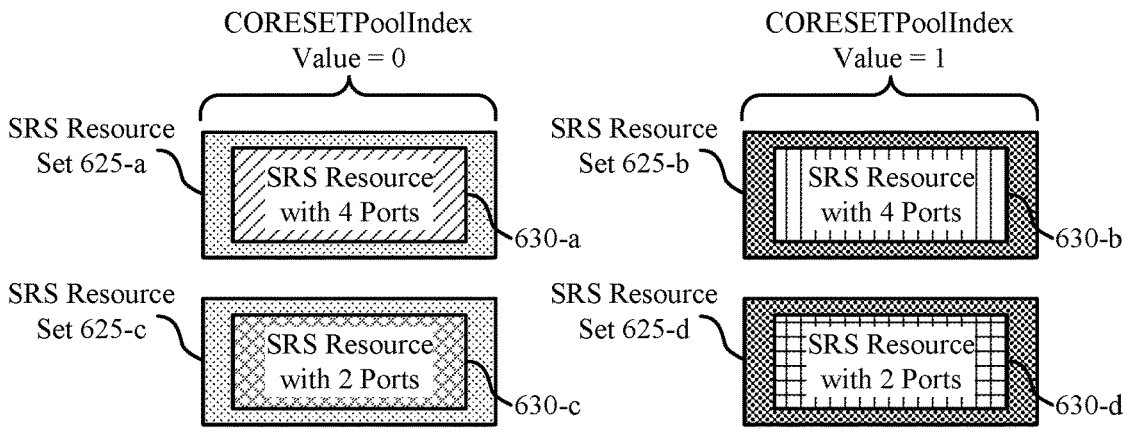
Figure 6:
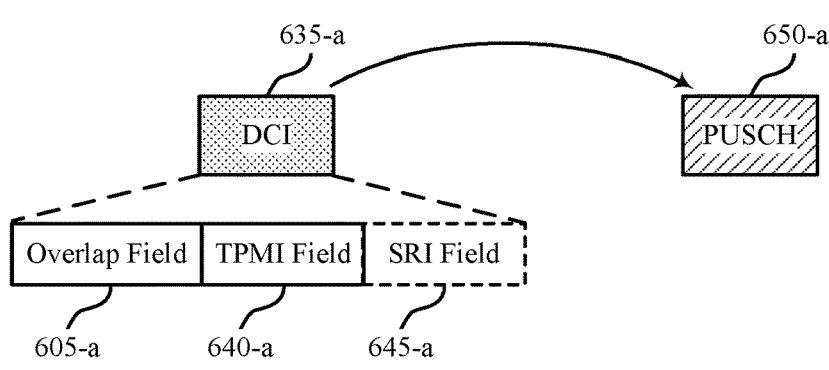
Figure 6:
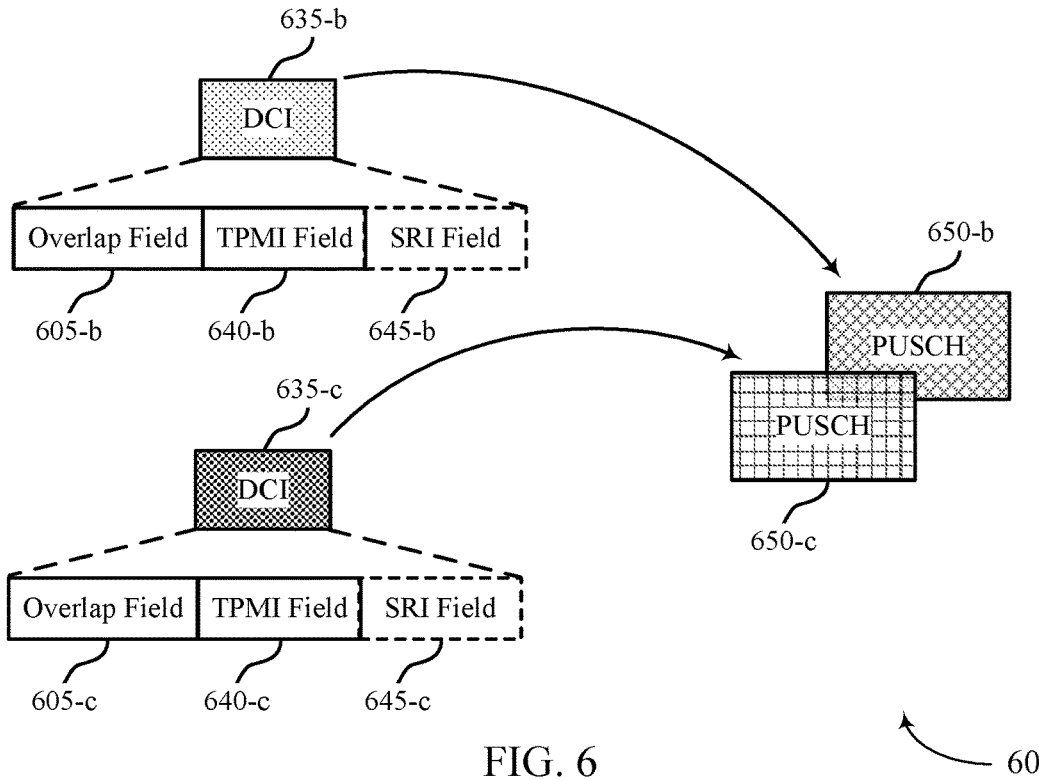

FIGS. 4 through 6 illustrate examples of resource selection procedures that support SRI designs for CB-based communications in accordance with one or more aspects of the present disclosure.

Figure 7:
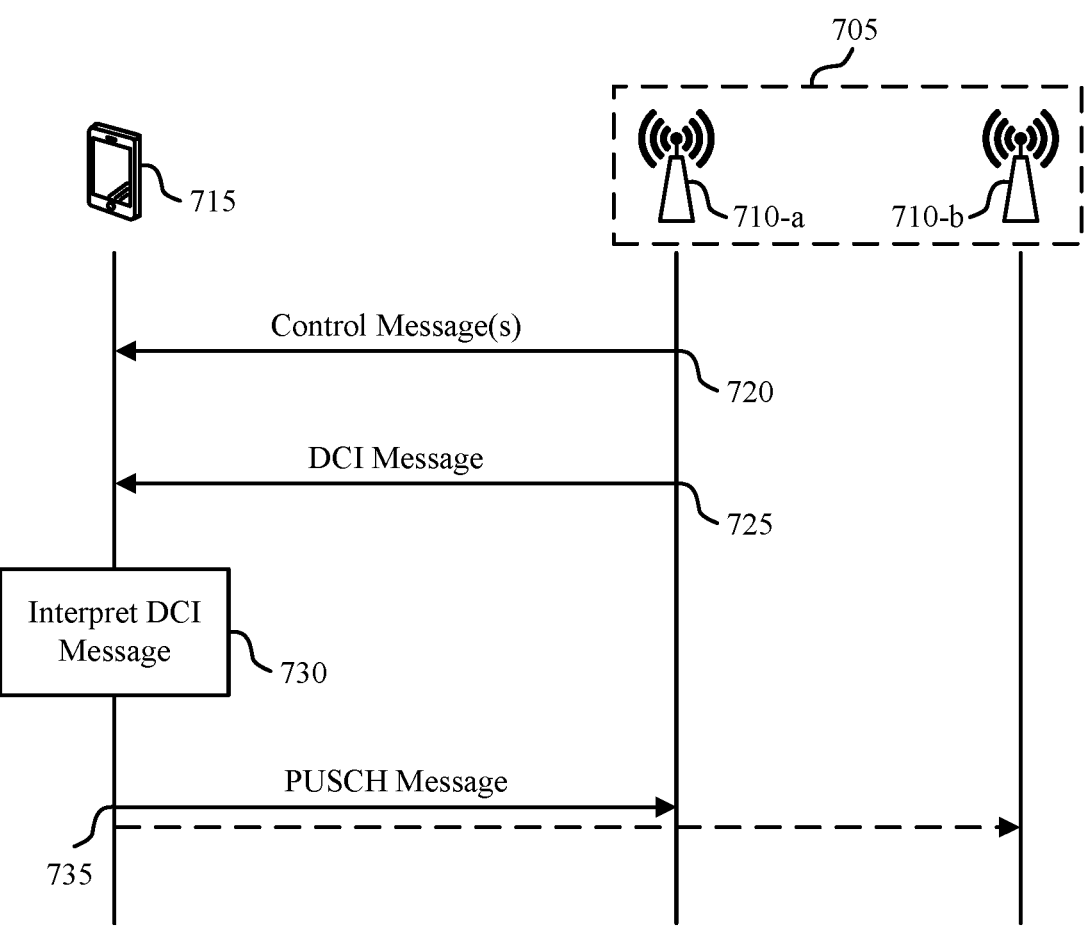

FIG. 7 illustrates an example of a process flow in a system that supports SRI designs for CB-based communications in accordance with one or more aspects of the present disclosure.

Figure 8:
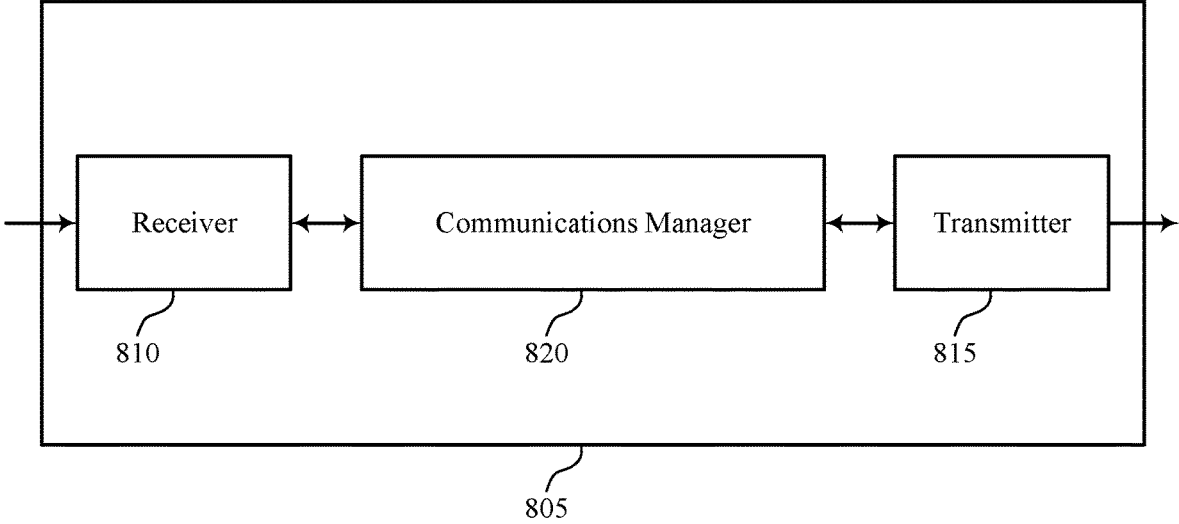
Figure 9:
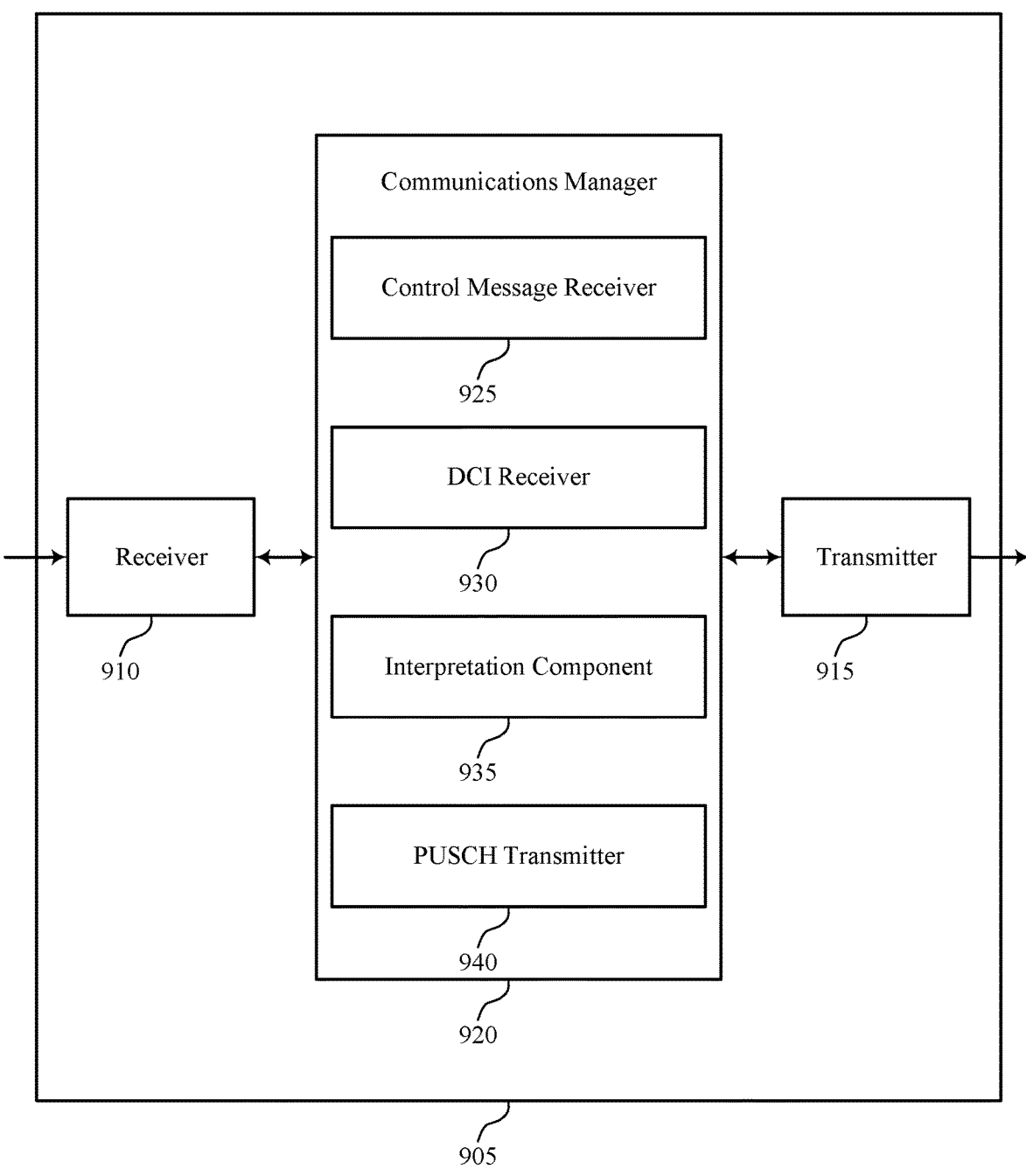

FIGS. 8 and 9 show block diagrams of devices that support SRI designs for CB-based communications in accordance with one or more aspects of the present disclosure.

Figure 10:
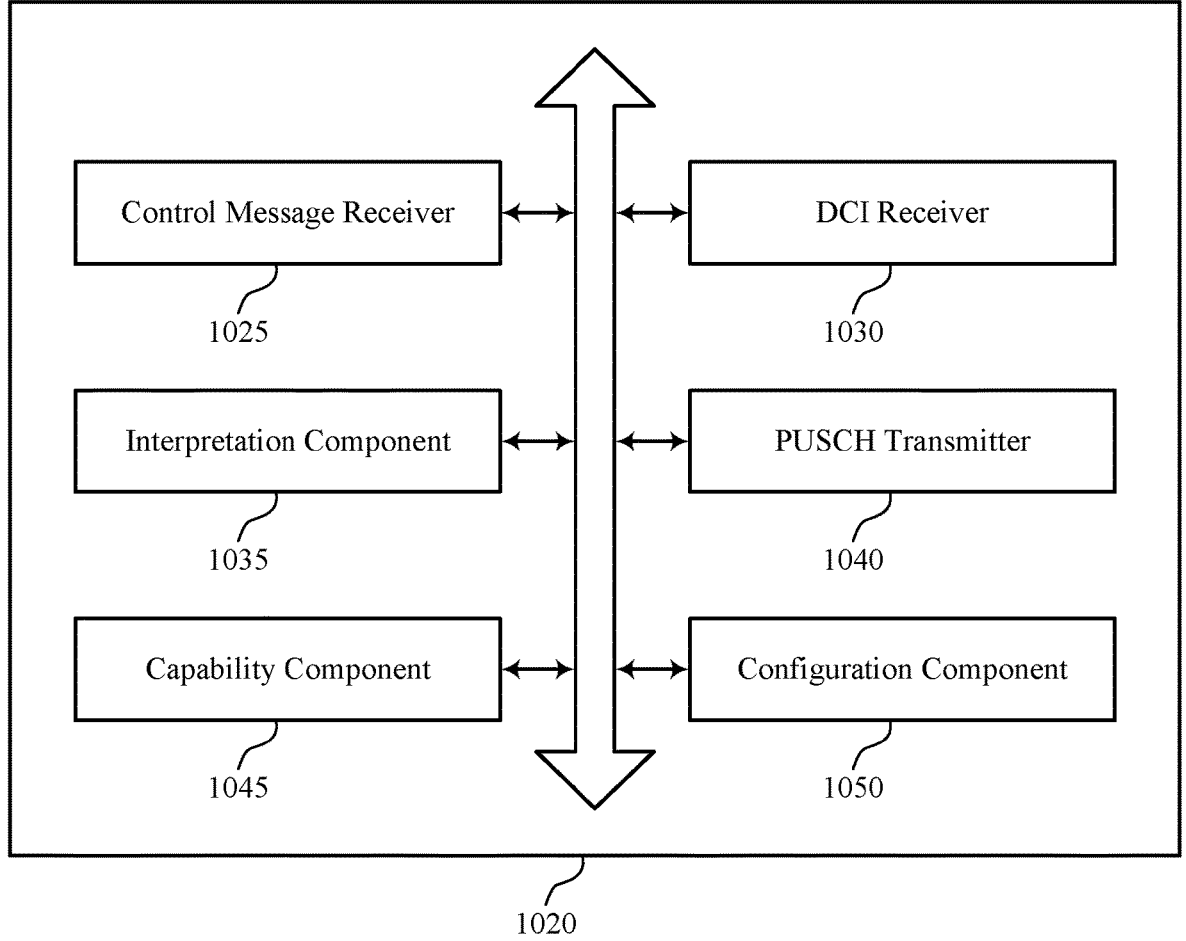

FIG. 10 shows a block diagram of a communications manager that supports SRI designs for CB-based communications in accordance with one or more aspects of the present disclosure.

Figure 11:
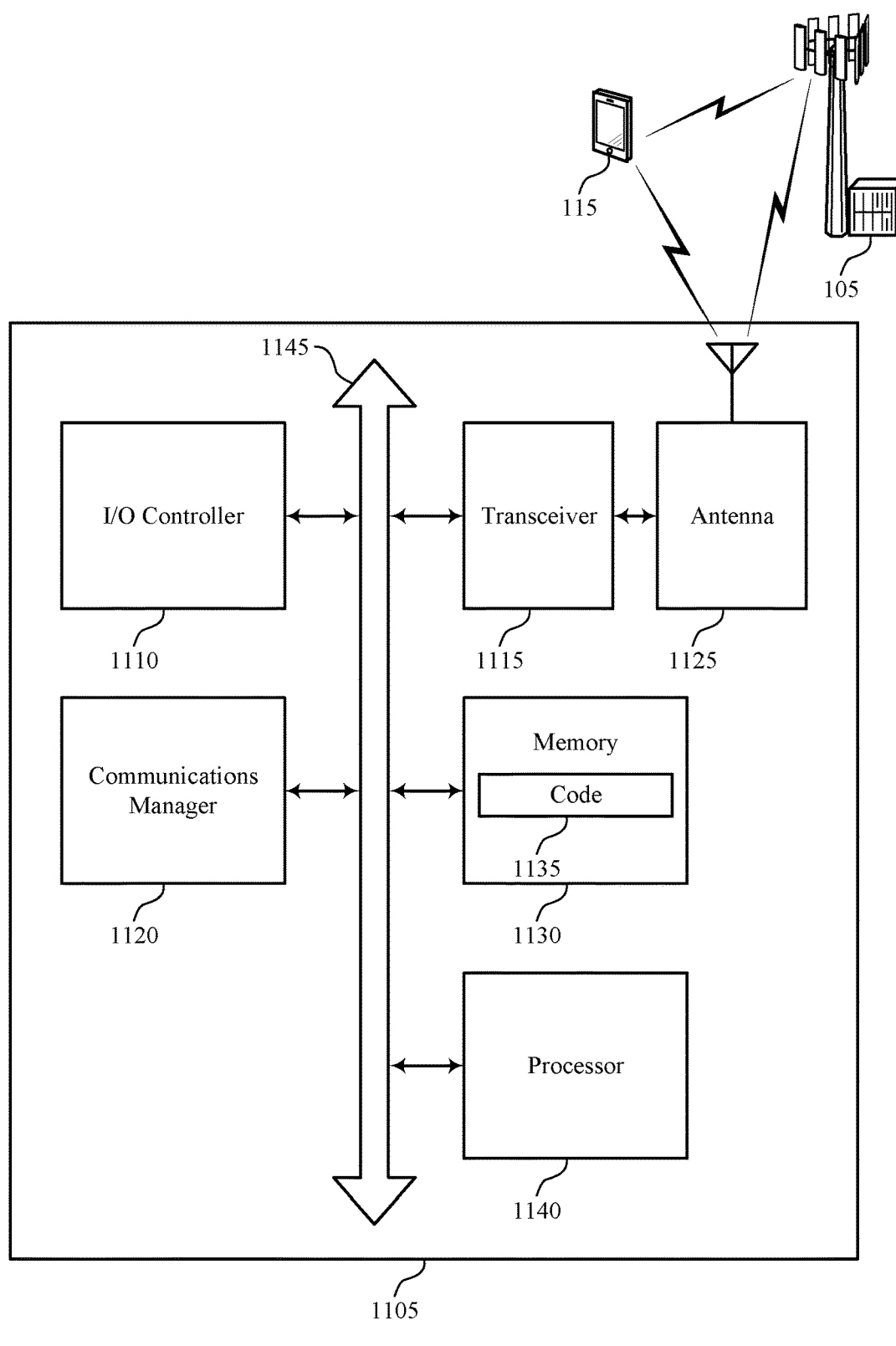

FIG. 11 shows a diagram of a system including a device that supports SRI designs for CB-based communications in accordance with one or more aspects of the present disclosure.

Figure 12:
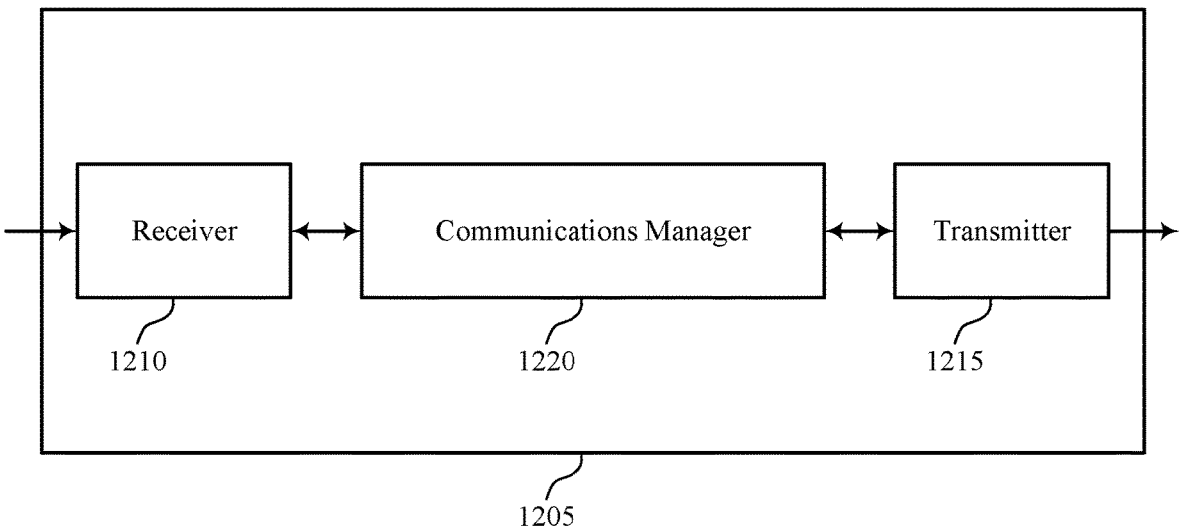
Figure 13:
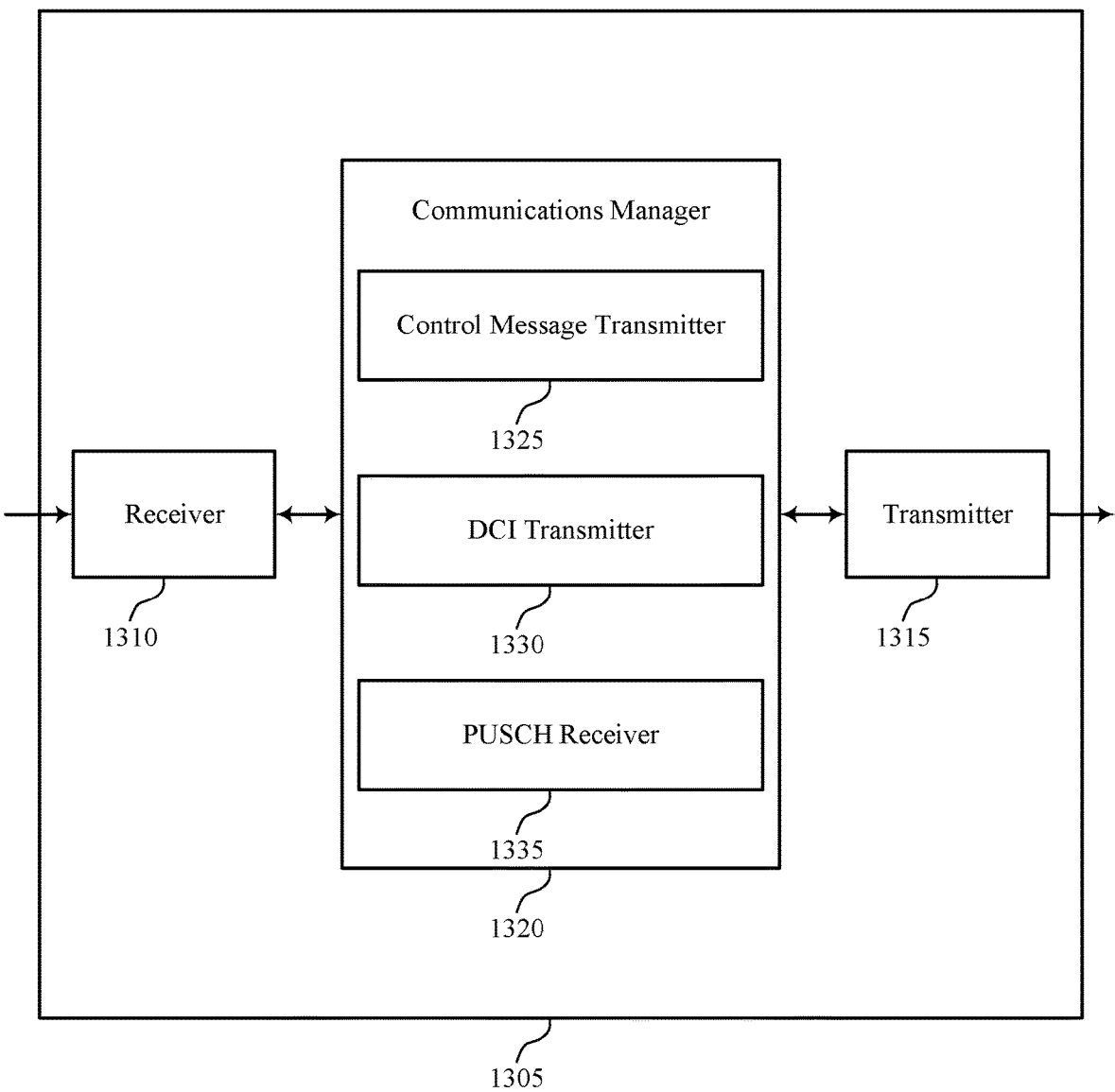

FIGS. 12 and 13 show block diagrams of devices that support SRI designs for CB-based communications in accordance with one or more aspects of the present disclosure.

Figure 14:
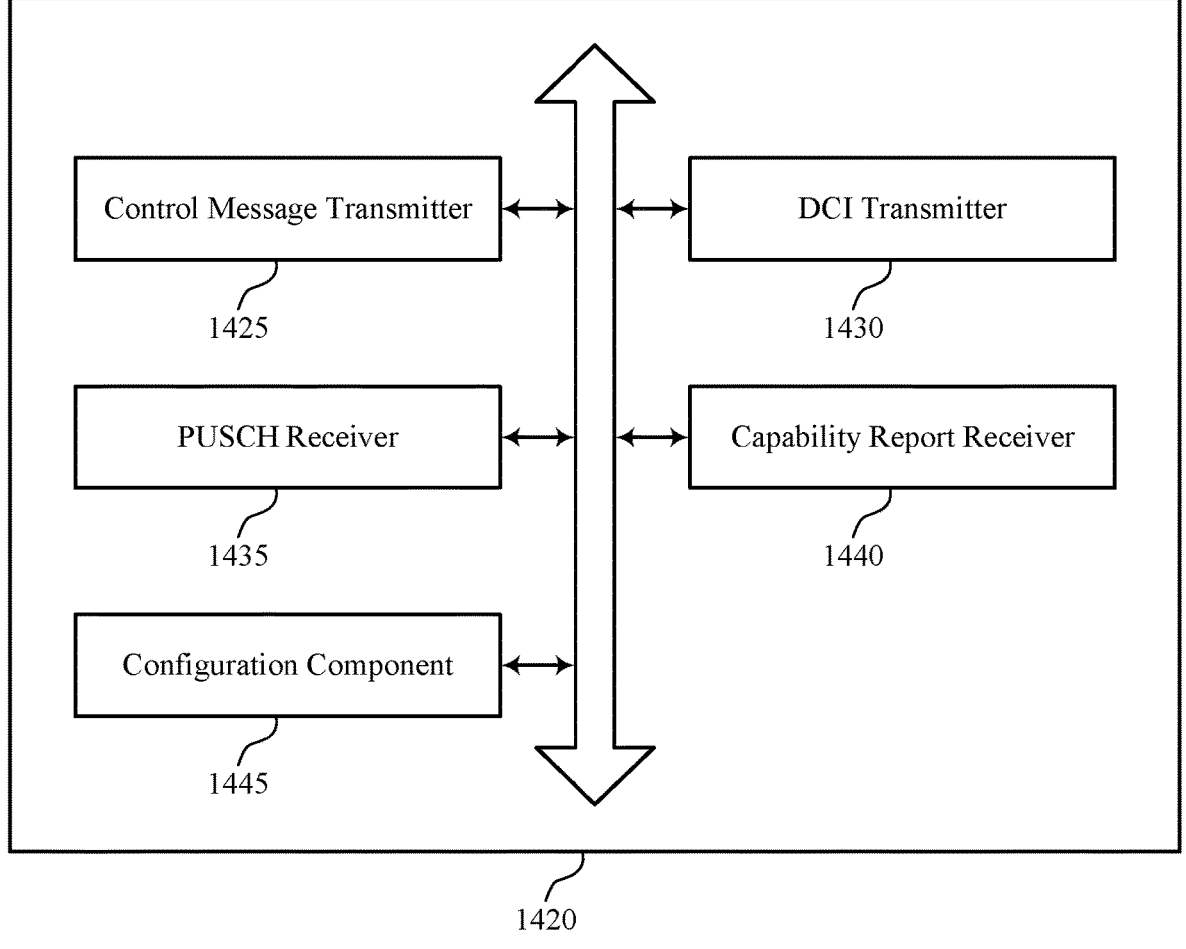

FIG. 14 shows a block diagram of a communications manager that supports SRI designs for CB-based communications in accordance with one or more aspects of the present disclosure.

Figure 15:

FIG. 15 shows a diagram of a system including a device that supports SRI designs for CB-based communications in accordance with one or more aspects of the present disclosure.

FIGS. 16 and 17 show flowcharts illustrating methods that support SRI designs for CB-based communications in accordance with one or more aspects of the present disclosure.

DETAILED DESCRIPTION

In some wireless communications systems, a network entity may dynamically schedule an uplink shared channel message, such as a physical uplink shared channel (PUSCH), from a user equipment (UE) via a message including downlink control information (DCI). In some cases, the message including the DCI may indicate information associated with the PUSCH message to be transmitted from the UE. For example, the DCI may include an indication of whether a transmission is associated with a codebook (CB)-based PUSCH transmission or a non-CB (NCB)-based PUSCH transmission. For example, for CB-based PUSCH transmissions, the DCI message may include a transmit precoding matrix indicator (TPMI) field indicating information associated with a quantity of PUSCH ports for the UE to select from a set of ports associated with a sounding reference signal (SRS) resource, which in some cases may be indicated via an SRS resource indicator (SRI) field in the DCI. For CB-based transmissions, the UE may use the TPMI field to identify a quantity of layers and a precoder to use for the transmitting the PUSCH message. In some examples, different DCI messages (e.g., transmitted by different transmission reception points (TRPs)) may be used to schedule respective PUSCH messages to two or more TRPs, which may be referred to as multiple DCI (mDCI) mTRP operations.

Further, a UE may support, at a given time, one of various different configurations relating to how many layers the UE may use for the PUSCH message. That is, the UE may be capable of transmitting up to (X1, X2) layers in a simultaneous transmission with multiple panels (STxMP) deployment. Here, the UE may be capable of transmitting a first PUSCH via a first SRS resource using up to X1 layers and transmitting a second PUSCH via a second SRS resource using up to X2 layers, when the first PUSCH and the second PUSCH are transmitted via a same component carrier and overlap at least partially in a time domain. Additionally, the UE may be capable of supporting up to (P1, P2) ports for PUSCH transmissions in the STxMP deployment. That is, the UE may be capable of transmitting a first PUSCH transmission via a first SRS resource using up to P1 ports and transmitting a second PUSCH transmission via a second SRS resource using up to P2 ports when the first and second PUSCH are transmitted via a same component carrier and overlap at least partially in the time domain. According to a first configuration, the UE may transmit a PUSCH using up to max(X1, X2) layers and up to max (P1, P2) ports when operating in a single transmission reception point (TRP) deployment. According to a second configuration, the UE may transmit a PUSCH using up to X1+X2 layers and up to P1+P2 ports when operating in a single TRP (sTRP) deployment.

While both configurations may be valid UE implementations, some systems may be unable to dynamically support both sTRP and STxMP deployments. For example, some systems may not define mappings that enable the UE to obtain information that are in compliance with one or both of the first configuration and the second configuration for both sTRP and STxMP PUSCH transmissions based on interpreting fields within a DCI. As such, a network entity may be unable to dynamically schedule a UE with sTRP and STxMP PUSCH messages that comply in cases of both the first configuration and the second configuration.

In some implementations, a UE and a network entity may support one or more configuration- or signaling-based mechanisms according to which the network entity may configure one or more maxRank values and one or more threshold (e.g., maximum) number of port values in accordance with the first configuration or the second configuration and according to which the UE may interpret one more DCI fields to identify, ascertain, or otherwise determine information associated with an sTRP or STxMP PUSCH message. For example, in scenarios in which the UE is configured in accordance with the first configuration, the network entity may configure one maxRank value and one threshold (e.g., maximum) number of ports value for each SRS resource set (e.g., X1 and P1 for a first SRS resource set and X2 and P2 for a second SRS resource set) that is applicable regardless of whether sTRP operation or STxMP operation is indicated.

Additionally, or alternatively, in scenarios in which the UE is configured in accordance with the second configuration, the network entity may configure a baseline maxRank value (e.g., X) and a baseline maximum number of ports value (e.g., P) that is applicable when sTRP operation is indicated and one or more additional maxRank values and maximum number of ports values for each SRS resource set (e.g., X1 and P1 for a first SRS resource set and X2 and P2 for a second SRS resource set) that are applicable when STxMP operation is indicated. Additionally, or alternatively, in scenarios in which the UE is configured in accordance with the second configuration, the network entity may indicate, via a field in the DCI, whether a scheduled PUSCH overlaps in time with another scheduled PUSCH. In this case, the UE may interpret one or more fields of the DCI differently based on whether the scheduled PUSCH overlaps in time with another scheduled PUSCH. Thus, the network entity may schedule PUSCH transmissions for sTRP operation or STxMP operation that are in compliance with a threshold (e.g., maximum) quantity of layers or ports supported by the UE for the respective operation.

Aspects of the disclosure are initially described in the context of wireless communications systems. Aspects of the disclosure are then described in the context of PUSCH configurations and a process flow. Aspects of the disclosure are further illustrated by and described with reference to apparatus diagrams, system diagrams, and flowcharts that relate to SRI designs for CB-based communications.

Figure 1:
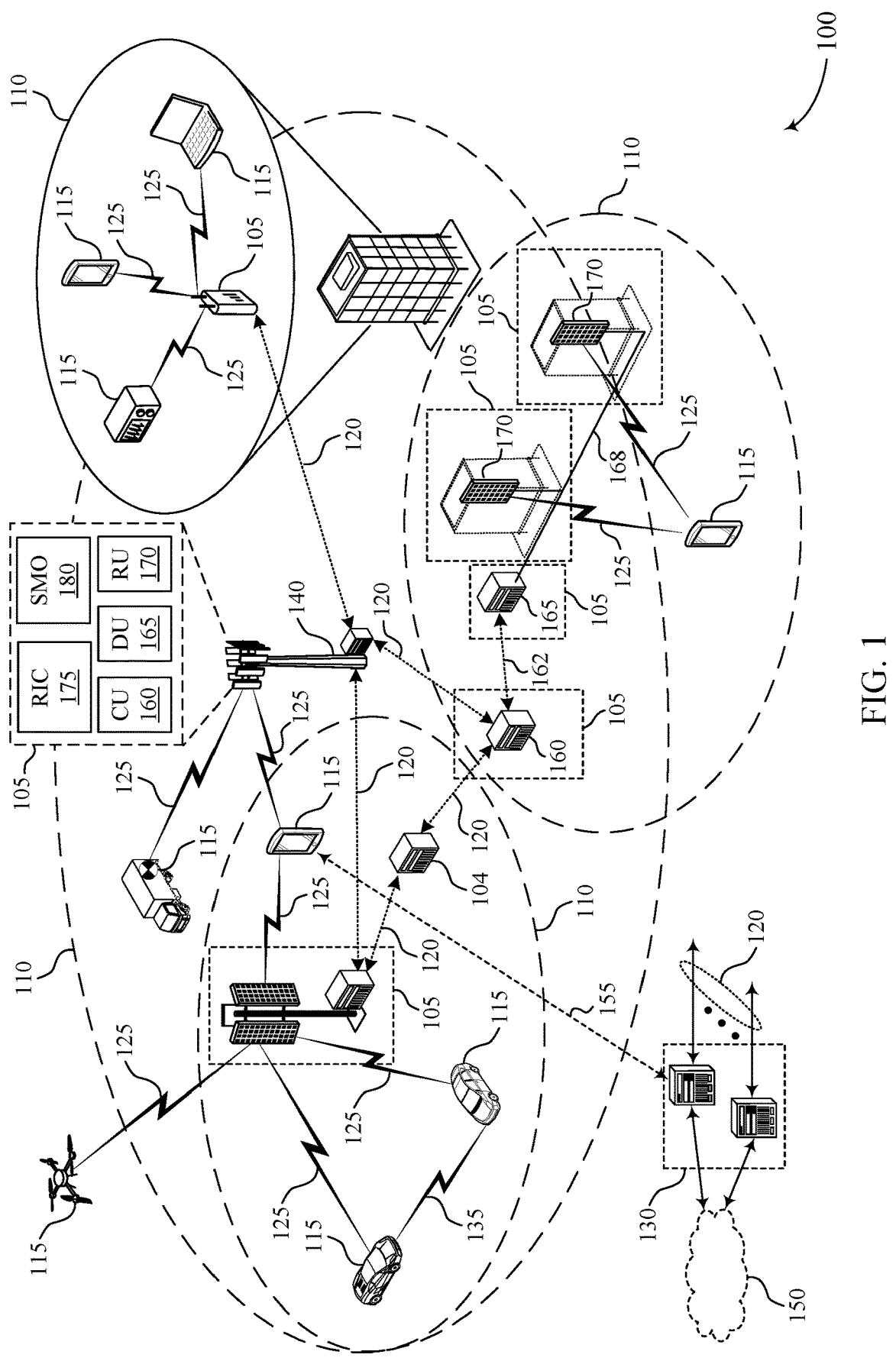
FIGS. 1 through 3 illustrate examples of wireless communications systems that support sounding reference signal (SRS) resource indicator (SRI) designs for codebook (CB)- based communications in accordance with one or more aspects of the present disclosure.

FIG. 1 illustrates an example of a wireless communications system 100 that supports SRI designs for CB-based communications in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a TRP. One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support SRI designs for CB-based communications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MIME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or CB-based feedback (e.g., a multi-panel type CB, a linear combination type CB, a port selection type CB). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may support two types of PUSCH transmissions: a CB-based PUSCH transmission and a non-CB (NCB)-based PUSCH transmission. For a CB-based PUSCH transmission, a UE 115 may be configured with one SRS resource set with "usage" set or configured to "codebook." A threshold (e.g., maximum) or upper limit of four SRS resources with the SRS resource set with "usage" set to "codebook" may be configured for a UE 115 and each SRS resource may be configured, such as RRC-configured, with a number or quantity of ports (such as via an nrofSRS-Ports parameter). Further, an SRI field in an uplink DCI (e.g., a DCI scheduling a PUSCH) may indicate one SRS resource. A quantity of ports configured for the indicated SRS resource may inform, indicate, imply, or otherwise assist a UE 115 in determining or selecting a quantity of antenna ports for a scheduled PUSCH. A UE 115 may transmit the scheduled PUSCH using a same spatial domain filter (e.g., a same uplink beam or directional configuration) as the indicated SRS resources. A UE 115 may determine or select a quantity of layers (e.g., a rank) and a TPMI (e.g., a precoder) for the scheduled PUSCH from or using a separate DCI field, such as a "precoding information and number of layers" field.

For a non-CB-based PUSCH transmission, a UE 115 may be configured with one SRS resource set with "usage" set or configured to "noncodebook." A maximum or upper limit of four SRS resources within the SRS resource set with "usage" set to "noncodebook" may be configured for a UE 115 and each SRS resource may have or otherwise be associated with one port. An SRI field in an uplink DCI (e.g., a DCI scheduling a PUSCH) may indicate one or multiple SRS resources. A number or quantity of indicated SRS resources may inform, indicate, imply, or otherwise assist a UE 115 in determining or selecting a rank (e.g., a number or quantity of layers) for a scheduled PUSCH and the UE 115 may transmit the scheduled PUSCH using a same precoder as well as a same spatial domain filter (e.g., precoder) as the indicated SRS resources.

For both CB-based PUSCH transmissions and non-CB-based PUSCH transmissions, a size of an SRI field may be a function of a quantity of SRS resources within the applicable SRS resource set. For example, a size of an SRI field for CB-based PUSCH transmissions may be defined in accordance with Table 1 if a higher layer parameter of txConfig is set equal to codebook, where $N_{SRS}$ may be a number or quantity of configured SRS resources in an SRS resource set configured by higher layer parameters srs-ResoureSetToAddModList, and associated with the higher layer parameter usage of value 'codeBook.' The size of the SRI field may be $\lceil \log_2 (N_{SRS}) \rceil$ bits.

TABLE 1

| SRI Indication for CB-based PUSCH Transmission | |
| --- | --- |
| Bit field mapped to index | SRI(s), $N_{SRS} = 4$ |
| 0 | 0 |
| 1 | 1 |
| 2 | 2 |
| 3 | 3 |

In some wireless communications systems 100, a network entity 105 may dynamically schedule an uplink shared channel message, such as a PUSCH message from a UE 115 via a message including DCI. In some cases, the message including the DCI may indicate information associated with the PUSCH message to be transmitted from the UE 115. For example, the DCI may include an indication of whether a transmission is associated with a CB-based PUSCH transmission or a NCB-based PUSCH transmission. For example, for CB-based PUSCH transmissions, the DCI message may include a TPMI field indicating information associated with a quantity of PUSCH ports for the UE 115 to select from a set of ports associated with an SRS resource, which in some cases may be indicated via an SRI field in the DCI. For CB-based transmissions, the UE 115 may use the TPMI field to identify a quantity of layers and a precoder to use for the transmitting the PUSCH message.

In some cases, for each pair of numbers that includes a quantity of layers and a quantity of PUSCH ports (e.g., indicated for a PUSCH message), a set of precoding matrices may be defined (e.g., in a specification) with a corresponding set of TPMI indices. That is, the UE 115 may receive a message including DCI that includes a DCI field "Precoding information and number of layers" that indicates a TPMI index. Based on the TPMI index within the "Precoding information and number of layers" field of the DCI, the UE 115 may identify a precoding matrix associated with that TPMI index (e.g., based on the defined set of precoding matrices). For example, Table 2 illustrates an example mapping between TPMI indices and precoding matrices for PUSCH messages associated with one layer and four ports (e.g., for the numerical pair (1, 4)).

TABLE 2

Precoding Matrix W for Single-Layer Transmission Using Four Antenna Ports with Transform Precoding Disabled

| TPMI index | W (ordered from left to right in increasing order of TPMI index) | | | | | | | |
| --- | --- | --- | --- | --- | --- | --- | --- | --- |
| 0-7 | $\frac{1}{2}\begin{bmatrix}1\\0\\0\\0\end{bmatrix}$ | $\frac{1}{2}\begin{bmatrix}0\\1\\0\\0\end{bmatrix}$ | $\frac{1}{2}\begin{bmatrix}0\\0\\1\\0\end{bmatrix}$ | $\frac{1}{2}\begin{bmatrix}0\\0\\0\\1\end{bmatrix}$ | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ | $\frac{1}{2}\begin{bmatrix}1\\1\\1\\1\end{bmatrix}$ | $\frac{1}{2}\begin{bmatrix}1\\1\\j\\j\end{bmatrix}$ | $\frac{1}{2}\begin{bmatrix}1\\1\\-1\\-1\end{bmatrix}$ | $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ | $\frac{1}{2}\begin{bmatrix}1\\j\\j\\-1\end{bmatrix}$ | $\frac{1}{2}\begin{bmatrix}1\\j\\-1\\-j\end{bmatrix}$ | $\frac{1}{2}\begin{bmatrix}1\\j\\-j\\1\end{bmatrix}$ | $\frac{1}{2}\begin{bmatrix}1\\-1\\1\\-1\end{bmatrix}$ | $\frac{1}{2}\begin{bmatrix}1\\-1\\j\\-j\end{bmatrix}$ | $\frac{1}{2}\begin{bmatrix}1\\-1\\-1\\1\end{bmatrix}$ | $\frac{1}{2}\begin{bmatrix}1\\-1\\-j\\j\end{bmatrix}$ |
| 24-27 | $\frac{1}{2}\begin{bmatrix}1\\-j\\-1\\-j\end{bmatrix}$ | $\frac{1}{2}\begin{bmatrix}1\\-j\\j\\1\end{bmatrix}$ | $\frac{1}{2}\begin{bmatrix}1\\-j\\-1\\j\end{bmatrix}$ | $\frac{1}{2}\begin{bmatrix}1\\-j\\-j\\-1\end{bmatrix}$ | — | — | — | — |

In another example, Table 3 illustrates an example mapping between TPMI indices and precoding matrices for PUSCH messages associated with two layers and two ports (e.g., for the numerical pair (2, 2)).

TABLE 3

| TPMI index | W (ordered from left to right in increasing order of TPMI index) |
|---|---|
| Precoding Matrix W for Two-Layer Transmission Using Two Antenna Ports with Transform Precoding Disabled | |
| 0-2 | $\frac{1}{\sqrt{2}}\begin{bmatrix} 1 & 0 \\ 0 & 1 \end{bmatrix}$ $\quad$ $\frac{1}{2}\begin{bmatrix} 1 & 1 \\ 1 & -1 \end{bmatrix}$ $\quad$ $\frac{1}{2}\begin{bmatrix} 1 & 1 \\ j & -j \end{bmatrix}$ |

In another example, Table 4 illustrates an example mapping between TPMI indices and precoding matrices for PUSCH messages associated with three layers and four ports (e.g., for the numerical pair (3, 4)).

TABLE 4

Precoding Matrix W for Three-Layer Transmission Using Four Antenna Ports with Transform Precoding Disabled

| TPMI index | W (ordered from left to right in increasing order of TPMI index) |
|---|---|
| 0-3 | $\frac{1}{2}\begin{bmatrix} 1 & 0 & 0 \\ 0 & 1 & 0 \\ 0 & 0 & 1 \\ 0 & 0 & 0 \end{bmatrix}$ $\frac{1}{2}\begin{bmatrix} 1 & 0 & 0 \\ 0 & 1 & 0 \\ 1 & 0 & 0 \\ 0 & 0 & 1 \end{bmatrix}$ $\frac{1}{2}\begin{bmatrix} 1 & 0 & 0 \\ 0 & 1 & 0 \\ -1 & 0 & 0 \\ 0 & 0 & 1 \end{bmatrix}$ $\frac{1}{2\sqrt{3}}\begin{bmatrix} 1 & 1 & 1 \\ 1 & -1 & 1 \\ 1 & 1 & -1 \\ 1 & -1 & -1 \end{bmatrix}$ |
| 4-6 | $\frac{1}{2\sqrt{3}}\begin{bmatrix} 1 & 1 & 1 \\ 1 & -1 & 1 \\ j & j & -j \\ j & -j & -j \end{bmatrix}$ $\frac{1}{2\sqrt{3}}\begin{bmatrix} 1 & 1 & 1 \\ -1 & 1 & -1 \\ 1 & 1 & -1 \\ -1 & 1 & 1 \end{bmatrix}$ $\frac{1}{2\sqrt{3}}\begin{bmatrix} 1 & 1 & 1 \\ -1 & 1 & -1 \\ j & j & -j \\ -j & j & j \end{bmatrix}$ $\quad$ — |

For CB-based PUSCH transmissions, a TPMI index may be indicated in a DCI field "precoding information and number of layers." Tables 6, 7, 8, and 9 provide additional information for a case in which FullpowerMode1 is not configured. As illustrated by Tables 5, 6, 7, and 8, different tables may correspond to different quantities of antenna ports or different maximum ranks (e.g., different maxRank values).

TABLE 5

Precoding Information and Number of Layers

| Bit field mapped to index | codebookSubset = fullyAndPartialAndNonCoherent | Bit field mapped to index | codebookSubset = partialAndNonCoherent | Bit field mapped to index | codebookSubset = nonCoherent |
|---|---|---|---|---|---|
| 0 | 1 layer: TPMI = 0 | 0 | 1 layer: TPMI = 0 | 0 | 1 layer TPMI = 0 |
| 1 | 1 layer: TPMI = 1 | 1 | 1 layer: TPMI = 1 | 1 | 1 layer: TPMI = 1 |
| . . . | . . . | . . . | . . . | . . . | . . . |
| 3 | 1 layer: TPMI = 3 | 3 | 1 layer: TPMI = 3 | 3 | 1 layer: TPMI = 3 |
| 4 | 2 layers: TPMI = 0 | 4 | 2 layers: TPMI = 0 | 4 | 2 layers: TPMI = 0 |
| . . . | . . . | . . . | . . . | . . . | . . . |
| 9 | 2 layers: TPMI = 5 | 9 | 2 layers: TPMI = 5 | 9 | 2 layers: TPMI = 5 |
| 10 | 3 layers: TPMI = 0 | 10 | 3 layers: TPMI = 0 | 10 | 3 layers: TPMI = 0 |
| 11 | 4 layers: TPMI = 0 | 11 | 4 layers: TPMI = 0 | 11 | 4 layers: TPMI = 0 |
| 12 | 1 layer: TPMI = 4 | 12 | 1 layer: TPMI = 4 | 12-15 | reserved |
| . . . | . . . | . . . | . . . | | |
| 19 | 1 layer: TPMI = 11 | 19 | 1 layer: TPMI = 11 | | |
| 20 | 2 layers: TPMI = 6 | 20 | 2 layers: TPMI = 6 | | |
| . . . | . . . | . . . | . . . | | |
| 27 | 2 layers: TPMI = 13 | 27 | 2 layers: TPMI = 13 | | |
| 28 | 3 layers: TPMI = 1 | 28 | 3 layers: TPMI = 1 | | |
| 29 | 3 layers: TPMI = 2 | 29 | 3 layers: TPMI = 2 | | |

TABLE 5-continued

| Precoding Information and Number of Layers | | | | | |
|---|---|---|---|---|---|
| Bit field mapped to index | codebookSubset = fullyAndPartialAndNonCoherent | Bit field mapped to index | codebookSubset = partialAndNonCoherent | Bit field mapped to index | codebookSubset = nonCoherent |
| 30 | 4 layers: TPMI = 1 | 30 | 4 layers: TPMI = 1 | | |
| 31 | 4 layers: TPMI = 2 | 31 | 4 layers: TPMI = 2 | | |
| 32 | 1 layer: TPMI = 12 | | | | |
| . . . | . . . | | | | |
| 47 | 1 layer: TPMI = 27 | | | | |
| 48 | 2 layers: TPMI = 14 | | | | |
| . . . | . . . | | | | |
| 55 | 2 layers: TPMI = 21 | | | | |
| 56 | 3 layers: TPMI = 3 | | | | |
| . . . | . . . | | | | |
| 59 | 3 layers: TPMI = 6 | | | | |
| 60 | 4 layers: TPMI = 3 | | | | |
| 61 | 4 layers: TPMI = 4 | | | | |
| 62-63 | reserved | | | | |

TABLE 6

| Precoding Information and Number of Layers | | | | | |
|---|---|---|---|---|---|
| Bit field mapped to index | codebookSubset = fullyAndPartialAndNonCoherent | Bit field mapped to index | codebookSubset = partialAndNonCoherent | Bit field mapped to index | codebookSubset = nonCoherent |
| 0 | 1 layer: TPMI = 0 | 0 | 1 layer: TPMI = 0 | 0 | 1 layer TPMI = 0 |
| 1 | 1 layer: TPMI = 1 | 1 | 1 layer: TPMI = 1 | 1 | 1 layer: TPMI = 1 |
| . . . | . . . | . . . | . . . | . . . | . . . |
| 3 | 1 layer: TPMI = 3 | 3 | 1 layer: TPMI = 3 | 3 | 1 layer: TPMI = 3 |
| 4 | 1 layer: TPMI = 4 | 4 | 1 layer: TPMI = 4 | | |
| . . . | . . . | . . . | . . . | | |
| 11 | 2 layers: TPMI = 5 | 11 | 1 layer: TPMI = 11 | | |
| 12 | 3 layers: TPMI = 0 | 12-15 | reserved | | |
| . . . | . . . | | | | |
| 27 | 1 layer: TPMI = 27 | | | | |
| 28-31 | reserved | | | | |

TABLE 7

| Precoding Information and Number of Layers | | | |
|---|---|---|---|
| Bit field mapped to index | codebookSubset = fullyAndPartialAndNonCoherent | Bit field mapped to index | codebookSubset = nonCoherent |
| 0 | 1 layer: TPMI = 0 | 0 | 1 layer TPMI = 0 |
| 1 | 1 layer: TPMI = 1 | 1 | 1 layer: TPMI = 1 |
| 2 | 2 layers: TPMI = 0 | 2 | 2 layers: TPMI = 0 |
| 3 | 1 layer: TPMI = 2 | 3 | reserved |
| 4 | 1 layer: TPMI = 3 | | |
| 5 | 1 layer: TPMI = 4 | | |
| 6 | 1 layer: TPMI = 5 | | |
| 7 | 2 layers: TPMI = 1 | | |
| 8 | 2 layers: TPMI = 2 | | |
| 9-15 | reserved | | |

TABLE 8

| Precoding Information and Number of Layers | | | |
|---|---|---|---|
| Bit field mapped to index | codebookSubset = fullyAndPartialAndNonCoherent | Bit field mapped to index | codebookSubset = nonCoherent |
| 0 | 1 layer: TPMI = 0 | 0 | 1 layer TPMI = 0 |
| 1 | 1 layer: TPMI = 1 | 1 | 1 layer: TPMI = 1 |
| 2 | 1 layer: TPMI = 2 | | |

TABLE 8-continued

| Precoding Information and Number of Layers | | | |
|---|---|---|---|
| Bit field mapped to index | codebookSubset = fullyAndPartialAndNonCoherent | Bit field mapped to index | codebookSubset = nonCoherent |
| 3 | 1 layer: TPMI = 3 | | |
| 4 | 1 layer: TPMI = 4 | | |
| 5 | 1 layer: TPMI = 5 | | |
| 6-7 | reserved | | |

In some aspects, a UE 115 and a network entity 105 may support a TPMI field bitwidth and a threshold (e.g., maximum) quantity of ports. For example, for the higher layer parameter txConfig=codebook, if ul-FulPowerTransmission is configured to fulllpowerMode2, maxRank may be configured to be larger than 2, and at least one SRS resource with 4 antenna ports may be configured in an SRS resource set with usage set to 'codebook' and an SRS resource with 2 antenna ports may be indicated via SRI in a same SRS resource set, Table 7 may be used. For the higher layer parameters txConfig=codebook, if different SRS resources with different quantity of antenna ports are configured, a bitwidth may be determined according to a maximum quantity of ports in an SRS resource among the configured SRS resources in an SRS resource set with usage set to 'codebook.' If the quantity of ports for a configured SRS resource in the set is less than the maximum quantity of ports in an SRS resource among the configured SRS resources, a quantity of most significant bits with value set to '0' may be inserted to the field. Accordingly, a UE 115 and a network entity 105 may assume, for an SRS resource set, if a threshold (e.g., maximum) quantity of ports is $p_{max}$ and, for an indicated SRS resource, the quantity of ports is p, the TPMI field size may be determined according to $p_{max}$, the actual table to use may be determined according to p, and the quantity of PUSCH ports may be equal to the quantity of ports p for the indicated SRS resource.

In some cases, a UE 115 may support, at a given time, one of various different configurations relating to how many layers the UE may use for the PUSCH message. That is, the UE 115 may be capable of transmitting up to (X1, X2) layers in an STxMP deployment. Here, the UE 115 may be capable of transmitting a first PUSCH via a first SRS resource using up to X1 layers and transmitting a second PUSCH via a second SRS resource using up to X2 layers, when the first PUSCH and the second PUSCH are transmitted via a same component carrier and overlap at least partially in a time domain. Additionally, the UE 115 may be capable of supporting up to (P1, P2) ports for PUSCH transmissions in the STxMP deployment. That is, the UE 115 may be capable of transmitting a first PUSCH transmission via a first SRS resource using up to P1 ports and transmitting a second PUSCH transmission via a second SRS resource using up to P2 ports when the first and second PUSCH are transmitted via a same component carrier and overlap at least partially in the time domain. According to a first configuration, the UE 115 may transmit a PUSCH using up to max(X1, X2) layers and up to max (P1, P2) ports when operating in a single transmission reception point (TRP) deployment. According to a second configuration, the UE 115 may transmit a PUSCH using up to X1+X2 layers and up to P1+P2 ports when operating in an sTRP deployment.

While both configurations may be valid UE 115 implementations, some wireless communications systems 100 may be unable to dynamically support both sTRP and STxMP deployments. For example, some wireless communications systems 100 may not define mappings that enable the UE 115 to obtain information that are in compliance with one or both of the first configuration and the second configuration for both sTRP and STxMP PUSCH transmissions based on interpreting fields within a DCI. As such, a network entity 105 may be unable to dynamically schedule a UE 115 with sTRP and STxMP PUSCH messages that comply in cases of both the first configuration and the second configuration.

In some implementations, a UE 115 and a network entity may 105 support one or more configuration- or signaling-based mechanisms according to which the network entity may configure one or more maxRank values and one or more maximum number of ports values in accordance with the first configuration or the second configuration and according to which the UE 115 may interpret one more DCI fields to identify, ascertain, or otherwise determine information associated with an sTRP or STxMP PUSCH message. For example, in scenarios in which the UE 115 is configured in accordance with the first configuration, the network entity 105 may configure one maxRank value and one maximum number of ports value for each SRS resource set (e.g., X1 and P1 for a first SRS resource set and X2 and P2 for a second SRS resource set) that is applicable regardless of whether sTRP operation or STxMP operation is indicated.

Additionally, or alternatively, in scenarios in which the UE 115 is configured in accordance with the second configuration, the network entity 105 may configure a baseline maxRank value (e.g., X) and a baseline maximum number of ports value (e.g., P) that is applicable when sTRP operation is indicated and one or more additional maxRank values and maximum number of ports values for each SRS resource set (e.g., X1 and P1 for a first SRS resource set and X2 and P2 for a second SRS resource set) that are applicable when STxMP operation is indicated. Additionally, or alternatively, in scenarios in which the UE 115 is configured in accordance with the second configuration, the network entity may indicate, via a field in the DCI, whether a scheduled PUSCH overlaps in time with another scheduled PUSCH. In this case, the UE 115 may interpret one or more fields of the DCI differently based on whether the scheduled PUSCH overlaps in time with another scheduled PUSCH. Thus, the network entity 105 may schedule PUSCH transmissions for sTRP operation or STxMP operation that are in compliance with a maximum quantity of layers or ports supported by the UE 115 for the respective operation.

Figure 2:
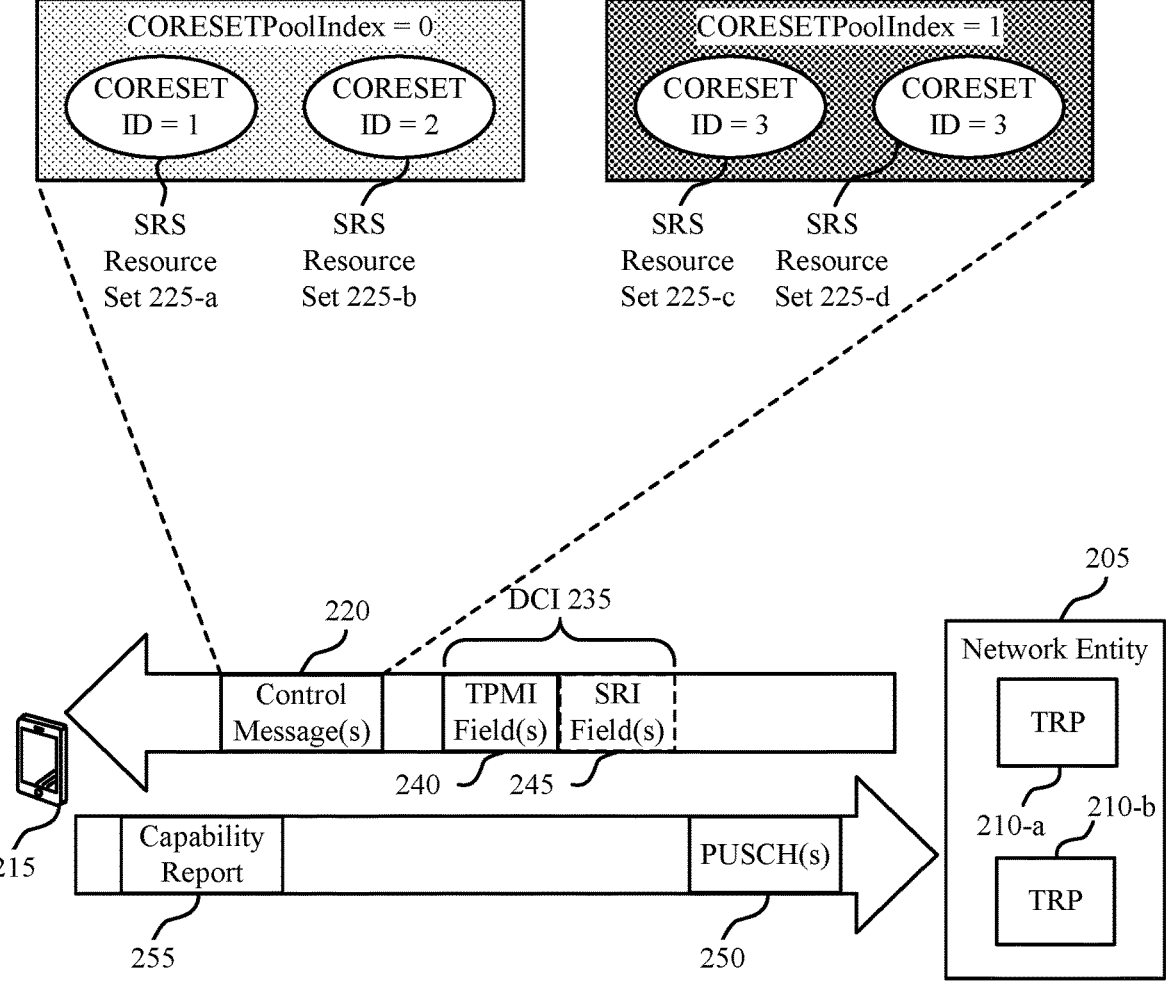

FIG. 2 illustrates an example of a wireless communications system 200 that supports SRI designs for CB-based communications in accordance with one or more aspects of the present disclosure. The wireless communications system 200 may implement or be implemented to realize or facilitate aspects of the wireless communications system 100. For example, the wireless communications system 200 illustrates communication between a UE 215 and a network entity 205 via a TRP 210-a or a TRP 210-b, or both. The UE 215, the network entity 205, the TRP 210-a, and the TRP 210-b may be examples of corresponding devices illustrated by and described with reference to FIG. 1. In some implementations the UE 215 and the network entity 205 may support a dynamic switching between sTRP operation and mTRP operation at the UE 215 in accordance with specific configurations of one more maxRank values and an interpretation rule that the UE 115 may use when receiving, decoding, or interpreting scheduling DCI from the network entity 205.

The UE 215 and the network entity 205 may communicate via uplink and downlink communication links. The UE 215 and the network entity 205 may use the communication links to transmit signaling to one or both of the TRP 210-a and the TRP 210-b and may receive signaling from one or both of the TRP 210-a and the TRP 210-b.

The network entity 205 may transmit one or more control messages 220 to the UE 215. The control messages 220 may include information to indicate the SRS resource sets 225. For example, the control message 220 may include indication of up to five control resource sets, each associated with a CORESET identifier (e.g., a CORESET ID). Additionally, each CORESET may correspond to various SRS resource sets 225. Thus, each SRS resource set 225 may be associated with a CORESET identifier (CORESETID). For example, the SRS resource set 225-a may be associated with the CORESET ID=1 and the SRS resource set 225-b may be associated with the CORESET ID=2. Additionally, the control messages 220 may indicate, for each CORESET (e.g., and each associated SRS resource set 225), a corresponding CORESETPoolIndex value. In some cases, each CORESETPoolIndex value may correspond to different TRPs 210. For example, the CORESETPoolIndex value=0 may correspond to the TRP 210-a and the CORESETPoolIndex value=1 may correspond to the TRP 210-b. In the example of the wireless communications system 200, the UE 215 may be configured (e.g., by the one or more control messages 220) by a higher layer parameter PDCCH-Config that contains two different values of CORESETPoolIndexinf CORESETs for the active BWP of a serving cell.

The UE 215 and the network entity 205 may communicate using PUSCHs 250 in a TDM manner corresponding to different transmission parameters (such as different beam or spatial relation parameters, different power control parameters, or different precoding parameters, or any combination thereof) indicated to or configured at the UE 215. In some implementations, PUSCH 250 repetitions may be scheduled by a single DCI 235 may belong to two sets (e.g., each associated with different CORESETPoolIndex values), where each set may have a respective precoding beam (e.g., a respective transmission configuration indicator (TCI) state or spatial relation) or respective power control parameters, or any combination thereof. To facilitate such separate sets of PUSCH 250 repetitions, the UE 215 and the network entity 205 may associate separate sets of PUSCH 250 repetitions to separate SRS resource sets 225.

In the example of the wireless communications system 200, the UE 215 and the network entity 205 may support multi-DCI based multi-TRP transmission. In some examples, the UE 215 may receive a message from the TRP 210-*a* that includes a first DCI 235 transmitted from TRP 210-*a* that schedules a first PUSCH 250 (e.g., a first PUSCH message) to be transmitted to TRP 210-*a*. Additionally, the UE 215 may receive another message (e.g., transmitted from the TRP 210-*b*) including a second DCI 235 that schedules a second PUSCH 250 (e.g., a second PUSCH message) to be transmitted to the TRP 210-*b*. The UE 215 may perform a TRP 210 differentiation based on CORESETPoolIndex values. In some cases, the multiple DCIs 235 may schedule two different PUSCHs 250 (e.g., transmitted to two different TRPs 210, or associated with different CORESETPoolIndex values) in a same serving cell or component carrier that are TDM-ed.

In some other cases, the multiple DCIs 235 may schedule two different PUSCHs 250 (e.g., transmitted to two different TRPs 210) in a same serving cell or component carrier that at least partially overlap in the time domain. Here, the first PUSCH 250 may be associated with a first SRS resource set

225 that is associated with a first CORESETPoolIndex value. For example, the UE 215 may transmit the first PUSCH 250 to the TRP 210-*a* using an SRS resource set 225 that is associated with the CORESETPoolIndex=0 (e.g., the SRS resource set 225-*a* or the SRS resource set 225-*b*). Additionally, the second PUSCH 250 may be associated with a second SRS resource set 225 that is associated with a second CORESETPoolIndex value. For example, the UE 215 may transmit the second PUSCH 250 to the TRP 210-*a* using an SRS resource set 225 that is associated with the CORESETPoolIndex=1 (e.g., the SRS resource set 225-*c* or the SRS resource set 225-*d*).

In cases that the UE 215 is configured to transmit two PUSCHs 250 that overlap at least partially in the time domain, the UE 215 may support one of various different configurations relating to how many layers the UE may use for a PUSCH 250. That is, the UE 215 may be capable of transmitting up to (X1, X2) layers in an STxMP deployment. Here, the UE 215 may be capable of transmitting a first PUSCH 250 via a first SRS resource using up to X1 layers and transmitting a second PUSCH 250 via a second SRS resource using up to X2 layers, when the first PUSCH 250 and the second PUSCH 250 are transmitted via a same component carrier and overlap at least partially in a time domain. Additionally, the UE 215 may be capable of supporting up to (P1, P2) ports for PUSCH transmissions in the STxMP deployment. That is, the UE 215 may be capable of transmitting a first PUSCH 250 transmission via a first SRS resource using up to P1 ports and transmitting a second PUSCH 250 transmission via a second SRS resource using up to P2 ports when the first and second PUSCH 250 are transmitted via a same component carrier and overlap at least partially in the time domain. According to a first configuration, the UE 215 may transmit a PUSCH 250 using up to max(X1, X2) layers and up to max (P1, P2) ports when operating in a single transmission reception point (TRP) deployment. According to a second configuration, the UE 215 may transmit a PUSCH 250 using up to X1+X2 layers and up to P1+P2 ports when operating in an sTRP deployment. In some examples, X1 and X2 may be equal to 1 or 2.

Examples of the first configuration and the second configuration may be further described in accordance with Table 9, shown below.

TABLE 9

| Maximum Quantities of Ports and Layers Supported in STxMP and sTRP | | | | |
|---|---|---|---|---|
| X1 = X2 = 1<br>P1 = P2 = 1 | X1 = X2 = 1<br>P1 = P2 = 2 | X1 = X2 = 1<br>P1 = P2 = 4 | X1 = X2 = 2<br>P1 = P2 = 2 | X1 = X2 = 2<br>P1 = P2 = 4 |
| First Configuration (Case 1)<br><br>Layers: (1, 1) in STxMP or 1 in sTRP PUSCH Ports: (1, 1) in STxMP or 1 in sTRP | Layers: (1, 1) in STxMP or 1 in sTRP PUSCH Ports: (2, 2) in STxMP or 2 in sTRP | Layers: (1, 1) in STxMP or 1 in sTRP PUSCH Ports: (4, 4) in STxMP or 4 in sTRP | Layers: (2, 2) in STxMP or 2 in sTRP PUSCH Ports: (2, 2) in STxMP or 2 in sTRP | Layers: (2, 2) in STxMP or 2 in sTRP PUSCH Ports: (4, 4) in STxMP or 4 in sTRP |
| Second Configuration (Case 2)<br><br>Layers: (1, 1) in STxMP or 2 in sTRP PUSCH Ports: (1, 1) in STxMP or 2 in sTRP | Layers: (1, 1) in STxMP or 2 in sTRP PUSCH Ports: (2, 2) in STxMP or 4 in sTRP | Layers: (1, 1) in STxMP or 2 in sTRP PUSCH Ports: (4, 4) in STxMP or 8 in sTRP | Layers: (2, 2) in STxMP or 4 in sTRP PUSCH Ports: (2, 2) in STxMP or 4 in sTRP | Layers: (2, 2) in STxMP or 4 in sTRP PUSCH Ports: (4, 4) in STxMP or 8 in sTRP |

Both configurations may be valid because they correspond to different UE 215 RF or baseband implementations.

In case of non-ideal backhaul between two TRPs 210, even when the UE 215 is capable of supporting the second case, the scheduling may be based on the first configuration. In some examples, TRP 210-b may not be aware whether the TRP 210-a dynamically schedules a first PUSCH 250 in a given slot. Hence, the UE 215 may assume the case that a PUSCH 250 has been scheduled. In such cases, the TRP 210-b may not use a higher quantity of layers for a second PUSCH 250 when a first PUSCH 250 is actually not scheduled. The second configuration may be applicable when the UE 215 is capable of implementing the second configuration and when the two TRPs 210 can coordinate dynamically (e.g., at least on whether the other TRP 210 will be scheduling an overlapping PUSCH 250).

In the example of wireless communications system 200, the UE 215 may transmit, to the network entity 205, a capability report 255 indicating a capability of the UE 215 to support a quantity of ports. That is, the UE 215 may indicate a threshold (e.g., maximum) quantity of PUSCH ports the UE 215 is capable of supporting, which may be the same as a maximum quantity of SRS ports. In one case, the UE 215 may transmit, via the capability report 255, an explicit indication of whether the UE 215 supports the first configuration or the second configuration. Here, when the UE 215 indicates a capability of the UE 215 (e.g., an existing or legacy capability) to support a maximum quantity P of SRS ports for SRS resource, if the UE 215 supports the first configuration, when two PUSCHs 250 overlap (e.g., in a same component carrier), the UE 215 may support (P, P) PUSCH ports simultaneously for the two PUSCHs 250. Additionally, if the UE 215 supports the second configuration, when two PUSCHs 250 overlap, the UE 215 may support (P/2, P/2) PUSCH ports simultaneously for the two PUSCHs 250.

In another case, the UE 215 may transmit, via the capability report 255, an indication of a maximum quantity of SRS ports per SRS resource for CB-based PUSCH. Here, the UE 215 may indicate a first maximum quantity of SRS ports (e.g., P ports) applicable or supportable by the UE 215 in cases when the PUSCH 250 does not overlap in time with any other PUSCH 250. Additionally, the UE 215 may indicate a second one or more maximum quantities of SRS ports associated with each SRS resource set or CORESET-PoolIndex value (e.g., (P1, P2) ports) that are applicable or supportable by the UE 215 in cases with two PUSCHs 250 overlap in time. In one example, for the second one or more maximum quantities of SRS ports, the UE 215 may indicate one number or quantity, which may be associated with each of the two SRS resource sets 225 (e.g., P1=P2). In another example, for the second one or more maximum quantities of SRS ports, the UE 215 may indicate separate numbers of ports values that are each associated with a corresponding SRS resource set 225 (e.g., with a corresponding CORE-SETPoolIndex value). Here, P1 may be the same as P2 or different from P2. In this case, the values of P, P1, and P2 indicated by the UE 215 (e.g., within the capability report 255) may determine whether the UE 215 is capable of supporting the first configuration or the second configuration.

In some cases, the configuration may be indicated to the UE 215 within one of the control messages 220. For example, the network entity 205 may transmit the control message 220 (e.g., via RRC signaling) indicating for the UE 215 to implement either the first configuration (e.g., where the UE 215 may transmit a PUSCH 250 using up to max(X1, X2) layers and up to max (P1, P2) ports) or the second configuration (e.g., where the UE 215 may transmit a PUSCH 250 using up to X1+X2 layers and up to P1+P2 ports when operating in an sTRP deployment). In some cases, the UE 215 may be configured to implement the first or second configurations per DCI 235 format (e.g., the UE 215 is separately configured with the first or second configuration for DCI format 0_1 versus 0_2), per BWP, or per component carrier.

In some wireless communications systems 200, however, allowing for the UE 215 to implement the second configuration may be incompatible with some interpretation rules at the UE 215. That is, to dynamically switch between sTRP and STxMP, a size of the TPMI field 240, the indication of the TPMI field 240, and an interpretation of the TPMI field 240 may consider both STxMP and sTRP scheduling.

Accordingly, in some implementations of the present disclosure, the UE 215 and the network entity 205 may support one or more configuration- or signaling-based mechanisms according to which the network entity 205 may configure one or more maxRank values and one or more maximum number of ports values in accordance with the first configuration or the second configuration and according to which the UE 215 may interpret one more fields in the DCI 235 to identify, ascertain, or otherwise determine information associated with an sTRP or STxMP PUSCH 250 message. For example, in scenarios in which the UE 215 is configured in accordance with the first configuration, the network entity 205 may configure (e.g., via the one or more control messages 220 transmitted via RRC signaling) one maxRank value and one maximum number of ports value for each SRS resource set 225 (e.g., X1 and P1 for a first SRS resource set 225-a and X2 and P2 for a second SRS resource set 225-d) that is applicable regardless of whether sTRP operation or STxMP operation is indicated.

Additionally, or alternatively, in scenarios in which the UE 215 is configured in accordance with the second configuration, the network entity 205 may configure (e.g., via the one or more control messages 220 transmitted via RRC signaling) a baseline maxRank value (e.g., X) and a baseline maximum number of ports value (e.g., P) that is applicable when sTRP operation is indicated and one or more additional maxRank values and maximum number of ports values for each SRS resource set 225-b (e.g., X1 and P1 for a first SRS resource set and X2 and P2 for a second SRS resource set 225-d) that are applicable when STxMP operation is indicated. Additionally, or alternatively, in scenarios in which the UE 215 is configured in accordance with the second configuration, the network entity 205 may indicate, via a field in the DCI 235, whether a scheduled PUSCH 250 overlaps in time with another scheduled PUSCH 250. In this case, the UE 215 may interpret one or more fields of the DCI 235 differently based on whether the scheduled PUSCH 250 overlaps in time with another scheduled PUSCH 250. Thus, the network entity 205 may schedule PUSCH transmissions for sTRP operation or STxMP operation that are in compliance with a maximum quantity of layers or ports supported by the UE 215 for the respective operation.

Thus, the UE 215 may be configured by the one or more control messages 220 with one behavior among the first configuration or the second configuration (e.g., via RRC signaling). The one or more control messages 220 may additionally indicate whether any restriction is required (e.g., for maximum quantities of ports or layers for PUSCH transmissions), a configuration of the SRS resource sets 225 (e.g., and how many SRS resource sets 225 may be configured), a presence or absence of a field in the DCI 235 indicating whether there is another overlapping PUSCH 250, a determination of a number of PUSCH ports and interpretation of the TPMI field 240 and the SRI field 245 (E.g., whether the interpretation depends on whether the there is another overlapping PUSCH 250), or a combination thereof. In some cases, the UE 215 may be configured per DCI format (e.g., separately configured for DCI format 0_1 versus 0_2), per BWP, or per CC.

Figure 3:
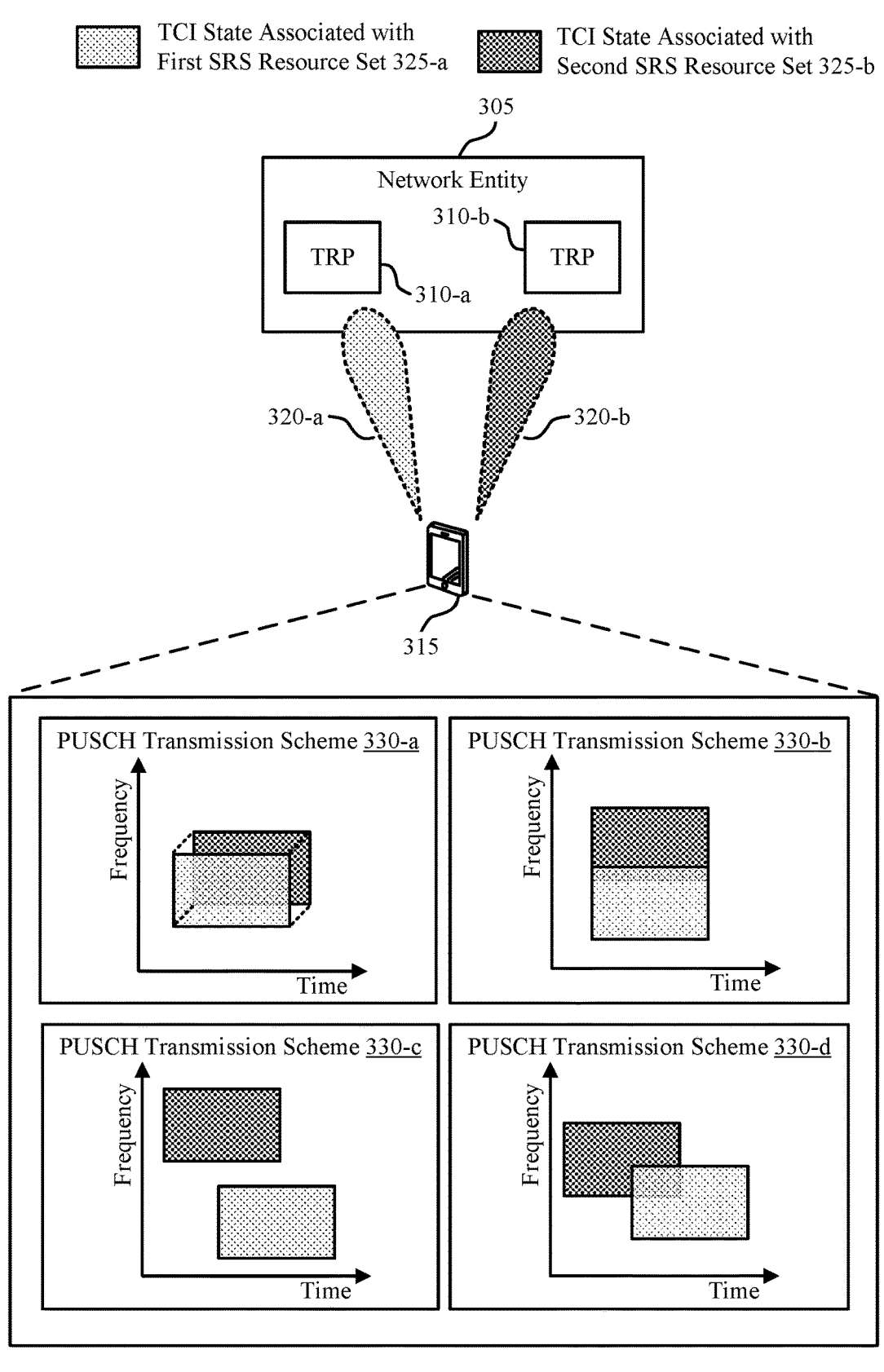

FIG. 3 illustrates an example of a wireless communications system 300 that supports SRI designs for CB-based communications in accordance with one or more aspects of the present disclosure. The wireless communications system 300 may implement or be implemented to realize or facilitate aspects of the wireless communications system 100 or the wireless communications system 200. For example, the wireless communications system 300 illustrate communication between a UE 315 and a network entity 305 associated with a TRP 310-a and a TRP 310-b, which may be examples of corresponding devices as illustrated by and described with reference to FIGS. 1 and 2.

In some examples, the wireless communications system 300 may illustrate multiple PUSCH transmissions from a single UE 315 to multiple TRPs 310 of a network entity 305 via different directional beams 320 (including directional beam 320-a and directional beam 320-b), where the different directional beams 320 may be associated with different SRS resource sets 325, different TCI states, different layers, different PUSCH ports, or different panels of the UE 315, or any combination thereof. As described in the example of FIG. 3, the UE 315 and the network entity 305 may support multi-DCI based multi-TRP framework, where the two PUSCHs are associated with different CORESETPoolIndex values. The first PUSCH (associated with CORESETPoolIndex value 0) may be associated with the first SRS resource set 325-a, and may be transmitted using a first beam or TCI state or power control parameters or precoder. Similarly, the second PUSCH (associated with CORESETPoolIndex value 1) may be associated with the second SRS resource set 325-b, and may be transmitted using a second beam or TCI state or power control parameters or precoder.

In some examples, two different PUSCHs in the same serving cell or component carrier may partially or fully overlap in at least time domain. The PUSCHs may overlap or may not overlap in frequency domain. In the example of the PUSCH transmission scheme 330-a, the first PUSCH and the second PUSCH may overlap both in time and in frequency. In the example of the PUSCH transmission scheme 330-b, the first PUSCH and the second PUSCH overlap in time but not in frequency. In the example of the PUSCH transmission scheme 330-c, the first PUSCH and the second PUSCH partially overlap in time but do not overlap in frequency. In the example of the PUSCH transmission scheme 330-a, the first PUSCH and the second PUSCH partially overlap in time and frequency. To identify the SRS resources for transmitting the overlapping PUSCH transmissions, a quantity of ports and layers for each PUSCH transmission, and a precoder for the PUSCH transmissions, the UE 315 may interpret control messages (e.g., multiple messages including DCI) in accordance with the techniques described herein and may transmit the PUSCH transmission that overlap at least partially in the time domain using at least one of the PUSCH transmission scheme 330-a, the PUSCH transmission scheme 330-b, the PUSCH transmission scheme 330-c, and the PUSCH transmission scheme 330-d.

FIG. 4 illustrates an example of a resource selection procedure 400 that supports SRI designs for CB-based communications in accordance with one or more aspects of the present disclosure. The resource selection procedure 400 may implement or be implemented to realize or facilitate aspects of the wireless communications systems as described with reference to FIGS. 1 through 3.

The SRS resource sets 425 may be configured by a network entity and indicated to a UE via RRC signaling. Here, the network entity may configure SRS resource set 425-a to correspond to a CORESETPoolIndex value of 0 (e.g., associated with PUSCH transmissions to a first TRP). Additionally, the network entity may configure SRS resource set 425-b to correspond to a CORESETPoolIndex value of 1 (e.g., associated with a PUSCH transmissions to a second TRP). For example, the SRS resource set 425-a may include an SRS resource 430-a and SRS resource 430-b. Further, the SRS resource set 425-b may include an SRS resource 430-c and SRS resource 430-d.

The UE may rely on the resource selection procedure 400 to identify one or more SRS resources 430 for transmitting one or multiple PUSCHs 450. For example, the UE may select a single SRS resource 430-a to transmit a single PUSCH 450-a in an sTRP mode. Additionally, the UE may select two SRS resources 430-c and 430-d to transmit two PUSCHs 450-b and 450-c, respectively, in an STxMP mode.

In the example of resource selection procedure 400, the network entity may transmit signaling to the UE (e.g., via RRC signaling), indicating that a maxRank=X. Here, the maxRank value may correspond to a maximum quantity of layers of a PUSCH 450 that is irrespective of whether there is another time-overlapping PUSCH 450 (e.g., associated with another CORESETPoolIndex value) in the same component carrier, such as in an STxMP mode. Thus, the UE may identify that a maximum quantity of layers of a PUSCH 450, independent of whether the UE is transmitting the PUSCH 450-a in an sTRP mode or the PUSCHs 450-b and 450-c in an STxMP mode, is equal to X.

In one case, the network entity may indicate the maxRank value per CORESETPoolIndex value (e.g., per SRS resource set 425). Here, the network entity may indicate a first value X1 for SRS resource set 425-a (e.g., that is associated with the CORESETPoolIndex value=0) and may indicate a second value X1 for SRS resource set 425-b (e.g., that is associated with the CORESETPoolIndex value=1). In some cases, X1 may be the same as X2 or different from X2. In another case, the network entity may indicate the maxRank value per DCI format (e.g., the network entity may separately configure the maxRank value for DCI format 0_1 versus DCI format 0_2), or per BWP, or per CC. Here, a value of X1 may be the same as a value of X2.

To configure the UE to transmit one or multiple PUSCHs 450, the network entity may transmit a message including DCI 435 (e.g., DCI 435-a, DCI 435-b, DCI 435-c). In some cases, the DCI 435 may include a TPMI field 440 (e.g., a TPMI field 440-a, a TPMI field 440-b, a TPMI field 440-c) and, in cases that one or more of the SRS resource sets 425 include more than one SRS resources 430, an SRI field 445 (e.g., an SRI field 445-a, an SRI field 445-b, an SRI field 445-c). In some cases, the network entity may transmit the DCI via resources (e.g., a CORESET) that is associated with a same CORESETPoolIndex value as the SRS resource set 425 including the SRS resource 430 for transmitting the corresponding PUSCH 450. For example, to schedule a PUSCH 450 to be transmitted by an SRS resource 430 within an SRS resource set 425-a associated with the CORESETPoolIndex value 0 (e.g., the SRS resource 430-a or 430-b), the network entity may transmit the DCI 435 via control resources associated with the same CORESET-PoolIndex value 0.

Based on receiving the DCI 435, the UE may interpret the TPMI field 440 scheduling a PUSCH 450 independently of whether there is a second overlapping PUSCH 450. Additionally, the UE may interpret the SRI field 445 scheduling a PUSCH 450 independently of whether there is a second overlapping PUSCH 450. That is, the UE may identify a mapping between a value within the TPMI field 440 of a DCI 435 and a quantity of ports and layers for transmitting the PUSCH 450 as well as a precoding matrix for transmitting the PUSCH 450 independently of whether the scheduled PUSCH 450 overlaps in time with another PUSCH 450. Additionally, the UE may interpret a value in the SRI field 445 to identify an SRS resource 430 from an SRS resource set 425 (e.g., for transmitting a PUSCH 450) independently of whether the scheduled PUSCH 450 overlaps in time with another PUSCH 450.

In cases that the network entity has configured the UE (e.g., via RRC signaling) to operate according to the first configuration, where if the UE is capable of supporting up to (X1, X2) layers and (P1, P2) layers in an STxMP mode the UE is capable of supporting up to max(X1, X2) layers and up to max (P1, P2) ports when operating in an sTRP mode, each PUSCH 450 may be scheduled with a quantity of layers up to maxRank (e.g., X1 or X2) irrespective of whether there is another overlapping PUSCH. Additionally, each PUSCH may be scheduled with a maximum quantity of ports (e.g., P1 or P2, which may be indicated by the UE via a capability report) irrespective of whether there is another overlapping PUSCH 450. For example, the UE may transmit the PUSCH 450-*a* according to an sTRP mode (e.g., where there is no overlapping PUSCH in the time domain) and the PUSCHs 450-*b* and 450-*c* according to an STxMP mode using a quantity of layers that are less than or equal to maxRank (e.g., X1 or X2). Additionally, the UE may transmit the PUSCH 450-*a* and the PUSCHs 450-*b* and 450-*c* using a quantity of ports that are less than or equal to a maximum quantity of PUSCH ports P1 or P2 that the UE is capable of supporting.

In cases that the network entity has configured the UE (e.g., via RRC signaling) to operate according to the second configuration, where if the UE is capable of supporting up to (X1, X2) layers and (P1, P2) layers in an STxMP mode, the UE is capable of supporting up to X1+X2 layers and up to P1+P2 ports when operating in an sTRP mode, a quantity of layers or ports associated with PUSCHs 450 scheduled by the network for transmission by the UE may be based on whether the PUSCH 450 overlaps with another PUSCH 450 in the time domain. That is, when there is no overlapping PUSCH 450, the network entity may indicate up to X (e.g., corresponding to the maxRank) layers for the PUSCH 450-*a*. Additionally, when there is no overlapping PUSCH 450, the network entity may indicate up to P (e.g., a maximum quantity of ports the UE is capable of supporting) for the PUSCH 450-*a*.

In cases that the network entity has configured the UE to operate according to the second configuration and scheduled overlapping PUSCHs 450-*b* and 450-*c*, the network entity may schedule the PUSCH 450-*b* and PUSCH 450-*c* with less than one or more threshold quantities of layers of PUSCH and less than one or more threshold quantities of ports. In some cases, the threshold quantities of layers and ports may be associated with each CORESETPoolIndex value. That is, a threshold quantity of layers for transmitting the PUSCH 450-*b*, which is transmitted via the SRS resource 430-*b* and therefore associated with the CORE-SETPoolIndex value of 0 may correspond to X1 and a threshold quantity of ports for transmitting the PUSCH

450-*b* may correspond to P1. Here, both X1 and P1 may be values that are specific to PUSCHs 450 transmitted via SRS resources 430 that are associated with the CORESETPoolIndex value of 0. Additionally, a threshold quantity of layers for transmitting the PUSCH 450-*c*, which is transmitted via the SRS resource 430-*d* and therefore associated with the CORESETPoolIndex value of 1 may correspond to X2 and a threshold quantity of ports for transmitting the PUSCH 450-*c* may correspond to P2. Here, both X2 and P2 may be values that are specific to PUSCHs 450 transmitted via SRS resources 430 that are associated with the CORESETPoolIndex value of 1.

Here, the UE may not expect to be indicated, via the TPMI field 440-*b*, with more than X1 layers for a PUSCH 450-*b* associated with a first CORESETPoolIndex value (e.g., a CORESETPoolIndex value of 0) if another PUSCH 450-*c* associated with a second CORESETPoolIndex value (e.g., a CORESETPoolIndex value of 1) with time-domain overlap is scheduled in the same CC. Additionally, the UE may not expect to be indicated, via the TPMI field 440-*c*, with more than X2 layers for a PUSCH 450-*c* associated with a second CORESETPoolIndex value (e.g., a CORESETPoolIndex value of 1) if another PUSCH 450-*b* associated with the first CORESETPoolIndex value (e.g., a CORESETPoolIndex value of 0) with time-domain overlap is scheduled in the same CC. Additionally, the UE may not expect to be indicated, via the SRI field 445-*b*, with more than P1 ports for a PUSCH 450-*b* associated with a first CORESET-PoolIndex value (e.g., a CORESETPoolIndex value of 0) if another PUSCH 450-*c* associated with a second CORESET-PoolIndex value (e.g., a CORESETPoolIndex value of 1) with time-domain overlap is scheduled in the same CC. Additionally, the UE may not expect to be indicated, via the SRI field 445-*c*, with more than P2 ports for a PUSCH 450-*c* associated with the second CORESETPoolIndex value (e.g., a CORESETPoolIndex value of 1) if another PUSCH 450-*b* associated with the first CORESETPoolIndex value (e.g., a CORESETPoolIndex value of 0) with time-domain overlap is scheduled in the same CC.

In some cases, the threshold quantities of layers (e.g., X1 and X2) may be indicated to the UE by the network entity via RRC signaling (e.g., separately from a configuration of maxRank=X, which may be used by the UE to interpret the SRI field 445). Additionally, or alternatively, the UE may indicate, to the network entity, the threshold quantities of layers (e.g., X1 and X2) within a capability report. In either case, the values of X1 and X2 may be configured such that maxRank=X≤X1+X2. Additionally, the threshold quantities of ports (e.g., P1 and P2) may be indicated to the network entity by the UE via the capability report. That is, the UE may transmit a capability report to the network entity that indicates P (e.g., a maximum quantity of ports the UE is capable of supporting), P1 (e.g., a maximum quantity of ports the UE is capable of supporting for a PUSCH transmitted via an SRS resource 430 associated with a CORE-SETPoolIndex value of 0 when the PUSCH overlaps in time with another PUSCH), and P2 (e.g., a maximum quantity of ports the UE is capable of supporting for a PUSCH transmitted via an SRS resource 430 associated with a CORE-SETPoolIndex value of 1 when the PUSCH overlaps in time with another PUSCH) within the capability report.

In some cases, to enable the UE to dynamically switch between transmitting a PUSCH 450-*a* according to an sTRP mode and transmitting PUSCHs 450-*b* and 450-*c* according to an STxMP mode in cases that the UE is configured according to the second configuration, the network entity may configure each SRS resource set 425 to include at least one SRS resource 430 associated with P ports for nonoverlapping PUSCH 450-a transmissions and at least one SRS resource 430 associated with P1 ports (e.g., for the SRS resource set 425-a) or P2 ports (e.g., for the SRS resource set 425-b) for overlapping PUSCH 450-b and 450-c transmissions.

FIG. 5 illustrates an example of a resource selection procedure 500 that supports SRI designs for CB-based communications in accordance with one or more aspects of the present disclosure. The resource selection procedure 500 may implement or be implemented to realize or facilitate aspects of the wireless communications systems as described with reference to FIGS. 1 through 3.

The SRS resource sets 525 may be configured by a network entity and indicated to a UE via RRC signaling. Here, the network entity may configure SRS resource set 525-a to correspond to a CORESETPoolIndex value of 0 (e.g., associated with PUSCH transmissions to a first TRP). Additionally, the network entity may configure SRS resource set 525-b to correspond to a CORESETPoolIndex value of 1 (e.g., associated with a PUSCH transmissions to a second TRP). The SRS resource set 525-a may include an SRS resource 530-a and the SRS resource set 525-b may include an SRS resource 530-b. The network entity may additionally configure the UE (e.g., via RRC signaling) to operate according to the second configuration, where if the UE is capable of supporting up to (X1, X2) layers and (P1, P2) layers in an STxMP mode, the UE is capable of supporting up to X1+X2 layers and up to P1+P2 ports when operating in an sTRP mode.

The UE may rely on the resource selection procedure 500 to identify one or more SRS resources 530 for transmitting one or multiple PUSCHs 550. For example, the UE may select a single SRS resource 530-a to transmit a single PUSCH 550-a in an sTRP mode. Additionally, the UE may select two SRS resources 530-a and 530-b to transmit two PUSCHs 550-b and 550-c, respectively, in an STxMP mode.

To configure the UE to transmit one or multiple PUSCHs 550, the network entity may transmit a message including DCI 535 (e.g., DCI 535-a, DCI 535-b, DCI 535-c). In some cases, the network entity may transmit the DCI 535 via resources (e.g., a CORESET) that are associated with a same CORESETPoolIndex value as the SRS resource set 525 including the SRS resource 530 for transmitting the corresponding PUSCH 550. For example, to schedule a PUSCH 550-a or 550-b to be transmitted by an SRS resource 530-a within an SRS resource set 525-a associated with the CORESETPoolIndex value 0 (e.g., the SRS resource 530-a or 530-b), the network entity may transmit the DCI 535 via control resources associated with the same CORESETPoolIndex value 0.

The DCI 535 may include an overlap field 505, a TPMI field 540 and, in cases that one or more of the SRS resource sets 525 include more than one SRS resources 530, an SRI field 545. The overlap field 505 within the DCI 535 may indicate (e.g., via a single bit) a presence of another PUSCH 550 that overlaps in time with the PUSCH 550 being scheduled by the DCI 535 (e.g., in a case of STxMP) or an absence of another PUSCH that overlaps in time with the PUSCH 550 being scheduled by the DCI 535 (e.g., in a case of sTRP). For example, the overlap field 505-a within the DCI 535-a may indicate that no other PUSCHs 550 overlap in time with the PUSCH 550-a. Additionally, the overlap fields 505-b and 505-c may both indicate that the scheduled PUSCH 550 overlaps at least partially in the time domain with another PUSCH 550.

In some cases, the UE may interpret the SRI field 545 (e.g., an SRI field 545-a, an SRI field 545-b, an SRI field 545-c) independently of whether there is a second overlapping PUSCH 550. That is, the UE may interpret a value in the SRI field 545 to identify an SRS resource 530 from an SRS resource set 525 (e.g., for transmitting a PUSCH 550) independently of whether the scheduled PUSCH 550 overlaps in time with another PUSCH 550. In some cases, the DCI 535 may not include the SRI field 545 in cases that each SRS resource set 525 includes a single SRS resource 530. In this case, the UE may identify the SRS resource 530 for transmitting the PUSCH 550 based on the CORESETPoolIndex value associated with the CORESET that the DCI is detected in.

In the example of the resource selection procedure 500, the UE may interpret the TPMI field 540 based on whether there is a second overlapping PUSCH 550. In some instances, the size of the TPMI field 540 may be based on a maximum quantity of SRS ports that the UE supports.

For example, in cases that the overlap field 505 indicates that there is no overlapping PUSCH 550, the UE may transmit the PUSCH 550 with each of the PUSCH ports associated with the SRS resource 530 indicated by the SRI field 545. Additionally, the UE may interpret the TPMI field 540 according to a quantity of ports that includes each of the PUSCH ports associated with the indicated SRS resource 530. For example, in cases that the DCI 535-a indicates, via the overlap field 505-a, that there are no scheduled PUSCHs 550 that overlap in the time domain with the PUSCH 550-a, the UE may transmit the PUSCH 550-a with each of the SRS ports associated with the SRS resource 530-a. Additionally, the UE may interpret the TPMI field 540-a (e.g., or the TMPI field 540-b) according to a mapping that is based on the four ports associated with the SRS resource 530-a.

In cases that the overlap field 505 indicates that there is an overlapping PUSCH 550, the UE may transmit the PUSCH 550 with a subset of the PUSCH ports associated with the SRS resource 530 indicated by the SRI field 545. Additionally, the UE may interpret the TPMI field 540 according to a quantity of ports that includes each of the subset of the PUSCH ports associated with the indicated SRS resource 530. For example, in cases that the DCI 535-c indicates, via the overlap field 505-c, that there is a scheduled PUSCH 550-b that overlap in the time domain with the PUSCH 550-c, the UE may transmit the PUSCH 550-c with each of the two SRS ports included in the subset of SRS ports associated with the SRS resource 530-b. Additionally, the UE may interpret the TPMI field 540-c according to a mapping that is based on the four ports associated with the SRS resource 530-b. Table 10, shown below, illustrates an example mapping between the indicated SRS resource 530 and the quantity of PUSCH ports used for transmitting the PUSCH 550.

TABLE 10

Mapping Between PUSCH Ports and Indicated SRS Resource

| Overlap Field | Indicated SRS Resource | PUSCH Ports |
|---|---|---|
| 0 (no overlapping PUSCH) | SRS resource 530-a (CORESETPoolIndex value = 0) | 4 Ports of SRS resource 530-a |
| 1 (there is an overlapping PUSCH) | SRS resource 530-a (CORESETPoolIndex value = 0) | First 2 Ports of SRS resource 530-a |
| 0 (no overlapping | SRS resource 530-b | 4 Ports of SRS |

TABLE 10-continued

Mapping Between PUSCH Ports and Indicated SRS Resource

| Overlap Field | Indicated SRS Resource | PUSCH Ports |
|---|---|---|
| PUSCH) | (CORESETPoolIndex value = 1) | resource 530-b |
| 1 (there is an overlapping PUSCH) | SRS resource 530-b (CORESETPoolIndex value = 1) | First 2 Ports of SRS resource 530-a |

In some examples, the UE may identify the subset of ports associated with each SRS resource 530 by selecting a first half of the ports associated with the SRS resource 530. For example, the UE may identify the subset of two ports associated with the SRS resource 530-a by selecting the first two ports from the four ports associated with the SRS resource 530-a. In some other examples, the network entity may configure (e.g., via RRC signaling) the subsets of ports for each SRS resource 530. In some cases, the network entity may indicate, for each SRS resource 530, a quantity (m) of ports from the total number of ports associated with that SRS resource 530 included in the subset. That is, for the SRS resource 530-b, the network entity may indicate (e.g., via RRC signaling) a quantity of ports. Then, the UE may identify the subset of ports by selecting the first m ports (e.g., two) from the total number of ports associated with the SRS resource 530-b. In some other cases, the network entity may indicate, for each SRS resource 530, port numbers associated of the ports that are within the subset of ports. For example, the network entity may indicate that SRS port numbers 1 and 3 (e.g., from a set of ports including SRS ports 0, 1, 2, and 3) are in the subset of ports associated with the SRS resource 530-a.

In some other examples, the UE may indicate the subsets of ports for each SRS resource based on information within a capability report transmitted by the UE to the network entity. That is, the UE may indicate, via the capability report, a first quantity of ports P1 associated with SRS resources 530 that are associated with a CORESETPoolIndex value of 0 and may indicate a second quantity of ports P2 associated with SRS resources 530 that are associated with a CORESETPoolIndex value of 1. Here, the subsets of ports for each SRS resource 530 associated with the CORESETPoolIndex value of 0 may include the first P1 ports and the subsets of ports for each SRS resource 530 associated with the CORE-SETPoolIndex value of 1 may include the first P2 ports.

FIG. 6 illustrates an example of a resource selection procedure 600 that supports SRI designs for CB-based communications in accordance with one or more aspects of the present disclosure. The resource selection procedure 600 may implement or be implemented to realize or facilitate aspects of the wireless communications systems as described with reference to FIGS. 1 through 3.

The SRS resource sets 625 may be configured by a network entity and indicated to a UE via RRC signaling. Here, the network entity may configure SRS resource sets 625-a and 625-c to correspond to a CORESETPoolIndex value of 0 (e.g., associated with PUSCH transmissions to a first TRP). The SRS resource set 625-a may include an SRS resource 630-a, the SRS resource set 625-b may include an SRS resource 630-b, the SRS resource set 625-c may include the SRS resource 630-c, and the SRS resource set 625-d may include the SRS resource 630-d. Additionally, the network entity may configure SRS resource sets 625-b and 625-d to correspond to a CORESETPoolIndex value of 1 (e.g., associated with a PUSCH transmissions to a second TRP). The network entity may additionally configure the UE (e.g., via RRC signaling) to operate according to the second configuration, where if the UE is capable of supporting up to (X1, X2) layers and (P1, P2) layers in an STxMP mode, the UE is capable of supporting up to X1+X2 layers and up to P1+P2 ports when operating in an sTRP mode.

The network entity may additionally configure each of the SRS resource sets 625 to be associated with either PUSCHs 650 when no overlapping PUSCHs 650 (e.g., for sTRP transmission) or to be associated with PUSCHs 650 when another PUSCH 650 overlaps with that PUSCH 650 at least partially in the time domain (e.g., for STxMP transmission). In some cases, the network entity may explicitly indicate, to the UE, whether each SRS resource set 625 is configured for PUSCHs 650 when there are overlapping PUSCHs 650 or when there are no overlapping PUSCHs 650 (e.g., via RRC signaling). Additionally, or alternatively, the UE may determine whether each SRS resource set 625 is configured for PUSCHs 650 when there are overlapping PUSCHs 650 or when there are no overlapping PUSCHs 650 implicitly based on an SRS resource set identifier associated with each SRS resource set 625.

In some cases, by configuring each of the SRS resource sets 625 to be for nonoverlapping PUSCH transmissions or overlapping PUSCH transmissions, the network entity may configure each SRS resource set 625 to be associated with a quantity of ports and layers to ensure that the UE operates according to the second configuration, where if the UE is capable of supporting up to (X1, X2) layers and (P1, P2) layers in an STxMP mode, the UE is capable of supporting up to X1+X2 layers and up to P1+P2 ports when operating in an sTRP mode.

In the example of the resource selection procedure 600: the SRS resource set 625-a may be associated with the CORESETPoolIndex value of 0 and be configured for PUSCHs 650 when there is no other overlapping PUSCH 650, the SRS resource set 625-b may be associated with the CORESETPoolIndex value of 1 and be configured for PUSCHs 650 when there is no other overlapping PUSCH 650, the SRS resource set 625-c may be associated with the CORESETPoolIndex value of 0 and be configured for PUSCHs 650 when there is another overlapping PUSCH 650, and the SRS resource set 625-d may be associated with the CORESETPoolIndex value of 1 and be configured for PUSCHs 650 when there is another overlapping PUSCH 650. In this example, the SRS resource set 625-a and the SRS resource set 625-c may be configured with a same set of power control parameters, and the SRS resource sets 625-b and 625-d may be configured with a same set of power control parameters. In some cases, the SRS resource sets 625-a and 625-b that are configured for when there is no other overlapping PUSCH 650 may be associated with four ports. Additionally, the SRS resource sets 625-c and 625-d that are configured for when there is an overlapping PUSCH 650 may be associated with two ports.

The SRS resource set 625-a and the SRS resource set 625-c may be configured with a same number of SRS resources 630. Here, the i'th SRS resource 630-a in the SRS resource set 625-a and the i'th SRS resource 630-c may be configured with a same beam, TCI state, or other spatial relation information. Additionally, a number of SRS ports of the i'th SRS resource 630-c in the SRS resource set 625-c may be configured to be smaller than the number of SRS ports of the i'th SRS resource 630-a in the SRS resource set 625-a. Further, the SRS resource set 625-b and the SRS resource set 625-d may be configured with a same number of SRS resources 630. Here, the i'th SRS resource 630-*b* in the SRS resource set 625-*b* and the i'th SRS resource 630-*d* may be configured with a same beam, TCI state, or other spatial relation information. Additionally, a number of SRS ports of the i'th SRS resource 630-*d* in the SRS resource set 625-*d* may be configured to be smaller than the number of SRS ports of the i'th SRS resource 630-*b* in the SRS resource set 625-*b*.

The UE may rely on the resource selection procedure 600 to identify one or more SRS resources 630 for transmitting one or multiple PUSCHs 650. For example, the UE may select a single SRS resource 630-*a* to transmit a single PUSCH 650-*a* in an sTRP mode. Additionally, the UE may select two SRS resources 630-*c* and 630-*d* to transmit two PUSCHs 650-*b* and 650-*c*, respectively, in an STxMP mode.

To configure the UE to transmit one or multiple PUSCHs 650, the network entity may transmit a message including DCI 635. In some cases, the network entity may transmit the DCI 635 via resources (e.g., a CORESET) that is associated with a same CORESETPoolIndex value as the SRS resource set 625 including the SRS resource 630 for transmitting the corresponding PUSCH 650. For example, to schedule a PUSCH 650-*a* or 650-*b* to be transmitted by an SRS resource 630 within an SRS resource set 625 associated with the CORESETPoolIndex value 0 (e.g., the SRS resource 630-*a* or 630-*c*), the network entity may transmit the DCI 635 via control resources associated with the same CORESETPoolIndex value 0.

The DCI 635 may include an overlap field 605, a TPMI field 640 and, in cases that one or more of the SRS resource sets 625 include more than one SRS resources 630, an SRI field 645. The overlap field 605 within the DCI 635 may indicate (e.g., via a single bit) a presence of another PUSCH 650 that overlaps in time with the PUSCH 650 being scheduled by the DCI 635 (e.g., in a case of STxMP) or an absence of another PUSCH that overlaps in time with the PUSCH 650 being scheduled by the DCI 635 (e.g., in a case of sTRP). For example, the overlap field 605-*a* within the DCI 635-*a* may indicate that no other PUSCHs 650 overlap in time with the PUSCH 650-*a*. Additionally, the overlap fields 605-*b* and 605-*c* may both indicate that the scheduled PUSCH 650 overlaps at least partially in the time domain with another PUSCH 650.

In some cases, the UE may interpret the SRI field 645 (e.g., an SRI field 645-*a*, an SRI field 645-*b*, an SRI field 645-*c*) based on whether there is a second overlapping PUSCH 650. In one example, the UE may interpret the overlap field 605 as indicating one of the two SRS resource sets 625, from the SRS resource sets 625 that are associated with the CORESETPoolIndex value of the CORESET in which the DCI 635 is received, for the PUSCH 650. For example, the UE may receive the DCI 635-*a* via a CORE-SET associated with the CORESETPoolIndex value of 0. Here, the overlap field 605-*a* may indicate that the PUSCH 650-*a* is nonoverlapping (e.g., by setting the bit of the overlap field 605-*a* to a 0), and the UE may interpret the overlap field 605-*a* as indicating the SRS resource set 625-*a* from the SRS resource sets 625-*a* and 625-*c* (e.g., which are both associated with the CORESETPoolIndex value of 0). In another example, the UE may receive the DCI 635-*c* via a CORESET associated with the CORESETPoolIndex value of 1. Here, the overlap field 605-*c* may indicate that the PUSCH 650-*c* is overlapping (e.g., by setting the bit of the overlap field 605-*c* to a 1), and the UE may interpret the overlap field 605-*c* as indicating the SRS resource set 625-*d* from the SRS resource sets 625-*b* and 625-*d* (e.g., which are both associated with the CORESETPoolIndex value of 1).

In another example, the UE may interpret the overlap field 605 as indicating whether another overlapping PUSCH 650 is scheduled in a same component carrier. For example, if the overlap field 605-*a* is 0 (e.g., indicating that there is not another overlapping PUSCH 650 scheduled in the same component carrier as the PUSCH 650-*a*) and the DCI 635-*a* is received in a CORESET with a CORESETPoolIndex value of 0, the UE may select the SRS resource set 625-*a* for the PUSCH 650-*a* (e.g., PUSCH transmission). Additionally, if the overlap field 605-*b* is 1 (e.g., indicating that there is another overlapping PUSCH 650-*c* scheduled in the same component carrier as the PUSCH 650-*b*) and the DCI 635-*b* is received in a CORESET with a CORESETPoolIndex value of 0, the UE may select the SRS resource set 625-*c* for the PUSCH 650-*b* (e.g., PUSCH transmission). Additionally, if the UE receives a DCI 635 in a CORESET with a CORESETPoolIndex value of 1 and including an overlap field 605 with a value of 0 (e.g., indicating that there is not another overlapping PUSCH 650 scheduled in the same component carrier as the PUSCH 650), the UE may select the SRS resource set 625-*b*. Additionally, if the UE receives a DCI 635-*c* in a CORESET with a CORESETPoolIndex value of 1 and including an overlap field 605-*c* with a value of 1 (e.g., indicating that there is an overlapping PUSCH 650-*b* scheduled in the same component carrier as the PUSCH 650-*b*), the UE may select the SRS resource set 625-*d*.

Thus, the UE may determine an SRS resource set 625 for transmitting a PUSCH 650 based on a combination of the overlap field 605 and a CORESETPoolIndex value (e.g., associated with the CORESET in which the DCI 635 is received and associated with the SRS resource set 625). The UE may identify an SRS resource 630 from the determined SRS resource set 625 based on the SRI field 645. In cases that each of the SRS resource sets 625 include a single SRS resource 630, the DCI 635 may not include the SRI field 645. Here, the UE may identify the SRS resource 630 by identifying the SRS resource set 625 including the single SRS resource 630. In some cases, a size of the SRI field 645 may be based on a maximum quantity of SRS resources 630 within an SRS resource set 625. The SRI field 645 may include at least $\lceil \log_2 (N_{SRS}) \rceil$ bits, where $N_{SRS}$ corresponds to the largest quantity of SRS resources 630 within any of the SRS resource sets 625.

In the example of the resource selection procedure 600, the UE may interpret the TPMI field 640 (e.g., a TPMI field 640-*a*, a TPMI field 640-*b*, a TMPI field 640-*c*) based on whether there is a second overlapping PUSCH 650. That is, the UE may interpret the TPMI field 640 based on an actual number of PUSCH ports, which may be equal to a number of SRS ports of the indicated SRS resource 630, which may itself be a function of whether there is a second overlapping PUSCH. In some cases, the size of the TPMI field 640 may be based on a maximum number of SRS ports that can be indicated across all SRS resources 630 of all four SRS resource sets 625.

FIG. 7 illustrates an example of a process flow 700 in a system that supports SRI designs for CB-based communications in accordance with one or more aspects of the present disclosure. The process flow 700 may implement or be implemented to realize or facilitate aspects of the wireless communications system 100, the wireless communications system 200, the wireless communications system 300, the resource selection procedure 400, or the resource selection procedure 500. For example, the process flow 700 illustrates communication between a UE 715 and a network entity 705 associated with a TRP 710-*a* and a TRP 710-*b*, which may be examples of corresponding devices as illustrated by and described with reference to FIGS. 1 and 2.

In the following description of the process flow 700, the operations may be performed (such as reported or provided) in a different order than the order shown, or the operations performed by the example devices may be performed in different orders or at different times. For example, specific operations also may be left out of the process flow 700, or other operations may be added to the process flow 700. Further, although some operations or signaling may be shown to occur at different times for discussion purposes, these operations may actually occur at the same time. Further, the signaling illustrated by and described with reference to FIG. 6 may include one or more UCI messages, one or more DCI messages, RRC signaling, one or more MAC-CEs, or one or more data messages, or any combination thereof.

At 720, the UE 715 may receive, from the network entity 705, one or more control messages. The one or more control messages may indicate a quantity of SRS resource sets, a quantity of one or more SRI fields included in the one or more control messages, and a quantity of one or more TPMI fields included in the one or more control messages. Here, the SRS resource sets may be configured for CB usage. The one or more control messages may additionally indicate at least one maximum rank value (e.g., maxRank=X) that is associated with PUSCH messages from the UE 715, the at least one maximum rank value being based on a threshold quantity of rank values supported by the UE.

At 725, the UE 715 may receive, from the network entity 705, one or more messages including DCI that schedules a PUSCH message. The DCI may include one or more TPMI fields and one or more SRI fields.

At 730, the UE 715 may interpret the DCI. For example, the UE 715 may interpret the one or more SRI fields and the one or more TPMI fields according to a mapping between a content of the one or more TPMI fields and a quantity of ports associated with at least one SRS resource. In some cases, the mapping may be indicated by a quantity of the at least one maximum rank value and a maximum quantity of ports that the UE 715 is capable of supporting when the PUSCH message overlaps in time with another PUSCH message (e.g., is associated with more than one PUSCH that overlaps at least partially in the time domain).

At 735, the UE 715 may transmit, to the network entity 705, the PUSCH message in accordance with the mapping between the content of the one or more TPMI fields and the quantity of ports associated with the at least one SRS resource.

FIG. 8 shows a block diagram 800 of a device 805 that supports SRI designs for CB-based communications in accordance with one or more aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to SRI designs for CB-based communications). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to SRI designs for CB-based communications). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of SRI designs for CB-based communications as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a UE in accordance with examples as disclosed herein. For example, the communications manager 820 may be configured as or otherwise support a means for receiving one or more control messages that indicate: a quantity of a set of multiple SRS resource sets, a quantity of one or more SRI fields included in one or more control messages, and a quantity of one or more TPMI fields included in the one or more control messages, where the set of multiple SRS resource sets are configured for CB usage; and at least one maximum rank value that is associated with uplink shared channel transmissions from the UE, the at least one maximum rank value being based on a threshold quantity of rank values supported by the UE. The communications manager 820 may be configured as or otherwise support a means for receiving a message including DCI that schedules an uplink shared channel message, the DCI including one or more SRI fields and one or more TPMI fields. The communications manager 820 may be configured as or otherwise support a means for interpreting the one or more SRI fields and the one or more TPMI fields according to a mapping between a content of the one or more TPMI fields and a quantity of ports associated with at least one SRS resource from the set of multiple SRS resource sets, the mapping being indicated by a quantity of the at least one maximum rank value and a maximum quantity of ports the UE is capable of supporting (e.g., when the uplink shared channel message is associated with more than one uplink shared channel that overlaps at least partially in a time domain). The communications manager 820 may be configured as or otherwise support a means for transmitting the uplink shared channel message in accordance with the mapping between the content of the one or more TPMI fields and the quantity of ports associated with the at least one SRS resource from the set of multiple SRS resource sets.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for more efficient utilization of communication resources.

FIG. 9 shows a block diagram 900 of a device 905 that supports SRI designs for CB-based communications in accordance with one or more aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to SRI designs for CB-based communications). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to SRI designs for CB-based communications). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of SRI designs for CB-based communications as described herein. For example, the communications manager 920 may include a control message receiver 925, a DCI receiver 930, an interpretation component 935, an PUSCH transmitter 940, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a UE in accordance with examples as disclosed herein. The control message receiver 925 may be configured as or otherwise support a means for receiving one or more control messages that indicate: a quantity of a set of multiple SRS resource sets, a quantity of one or more SRI fields included in one or more control messages, and a quantity of one or more TPMI fields included in the one or more control messages, where the set of multiple SRS resource sets are configured for CB usage; and the control message receiver 925 may be configured as or otherwise support a means for at least one maximum rank value that is associated with uplink shared channel transmissions from the UE, the at least one maximum rank value being based on a threshold quantity of rank values supported by the UE. The DCI receiver 930 may be configured as or otherwise support a means for receiving a message including DCI that schedules an uplink shared channel message, the DCI including one or more SRI fields and one or more TPMI fields. The interpretation component 935 may be configured as or otherwise support a means for interpreting the one or more SRI fields and the one or more TPMI fields according to a mapping between a content of the one or more TPMI fields and a quantity of ports associated with at least one SRS resource from the set of multiple SRS resource sets, the mapping being indicated by a quantity of the at least one maximum rank value and the interpretation component 935 may be configured as or otherwise support a means for a maximum quantity of ports the UE is capable of supporting (e.g., when the uplink shared channel message is associated with more than one uplink shared channel that overlaps at least partially in a time domain). The PUSCH transmitter 940 may be configured as or otherwise support a means for transmitting the uplink shared channel message in accordance with the mapping between the content of the one or more TPMI fields and the quantity of ports associated with the at least one SRS resource from the set of multiple SRS resource sets.

FIG. 10 shows a block diagram 1000 of a communications manager 1020 that supports SRI designs for CB-based communications in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of SRI designs for CB-based communications as described herein. For example, the communications manager 1020 may include a control message receiver 1025, a DCI receiver 1030, an interpretation component 1035, an PUSCH transmitter 1040, a capability component 1045, a configuration component 1050, or any combination thereof. Each of these components may communicate, directly or indirectly, with one another (e.g., via one or more buses).

The communications manager 1020 may support wireless communication at a UE in accordance with examples as disclosed herein. The control message receiver 1025 may be configured as or otherwise support a means for receiving one or more control messages that indicate: a quantity of a set of multiple SRS resource sets, a quantity of one or more SRI fields included in one or more control messages, and a quantity of one or more TPMI fields included in the one or more control messages, where the set of multiple SRS resource sets are configured for CB usage; and the control message receiver 1025 may be configured as or otherwise support a means for at least one maximum rank value that is associated with uplink shared channel transmissions from the UE, the at least one maximum rank value being based on a threshold quantity of rank values supported by the UE. The DCI receiver 1030 may be configured as or otherwise support a means for receiving a message including DCI that schedules an uplink shared channel message, the DCI including one or more SRI fields and one or more TPMI fields. The interpretation component 1035 may be configured as or otherwise support a means for interpreting the one or more SRI fields and the one or more TPMI fields according to a mapping between a content of the one or more TPMI fields and a quantity of ports associated with at least one SRS resource from the set of multiple SRS resource sets, the mapping being indicated by a quantity of the at least one maximum rank value and the interpretation component 1035 may be configured as or otherwise support a means for a maximum quantity of ports the UE is capable of supporting (e.g., when the uplink shared channel message is associated with more than one uplink shared channel that overlaps at least partially in a time domain). The PUSCH transmitter 1040 may be configured as or otherwise support a means for transmitting the uplink shared channel message in accordance with the mapping between the content of the one or more TPMI fields and the quantity of ports associated with the at least one SRS resource from the set of multiple SRS resource sets.

In some examples, the capability component 1045 may be configured as or otherwise support a means for transmitting, via a capability report, information associated with the maximum quantity of ports the UE is capable of supporting when the uplink shared channel message is associated with the more than one uplink shared channel that overlap at least partially in the time domain, when the uplink shared channel message is associated with a single uplink shared channel, or both, where receiving the message including the DCI is based on transmitting the information via the capability report.

In some examples, the configuration component 1050 may be configured as or otherwise support a means for receiving an indication of a configuration associated with the at least one maximum rank value, where the configuration is either a first configuration or a second configuration. In some examples, the configuration component 1050 may be configured as or otherwise support a means for the first configuration indicating that, if the uplink shared channel message is associated with a single uplink shared channel, the maximum quantity of ports associated with the uplink shared channel message is equal to a larger between a first maximum quantity of ports of a first SRS resource and a second maximum quantity of ports of a second SRS resource and the configuration component 1050 may be configured as or otherwise support a means for the second configuration indicating that, if the uplink shared channel message is associated with the single uplink shared channel, the maximum quantity of ports associated with the uplink shared channel message is equal to a summation of the first maximum quantity of ports of the first SRS resource and the second maximum quantity of ports of the second SRS resource.

In some examples, the configuration is indicated per DCI format, per bandwidth part, or per component carrier.

In some examples, to support receiving the one or more control messages that indicate the at least one maximum rank value, the control message receiver 1025 may be configured as or otherwise support a means for receiving an indication of a respective maximum rank value for each respective SRS resource set of the set of multiple SRS resource sets configured at the UE.

In some examples, interpreting the one or more TPMI fields is independent of whether the uplink shared channel message is associated with the more than one uplink shared channel that overlap at least partially in the time domain. In some examples, interpreting the one or more SRI fields is independent of whether the uplink shared channel message is associated with the more than one uplink shared channel that overlap at least partially in the time domain. In some examples, the at least one maximum rank value that is associated with uplink shared channel transmissions from the UE is applicable when the uplink shared channel message is associated with a single uplink shared channel or the more than one uplink shared channel that overlap at least partially in the time domain. In some examples, a threshold quantity of ports supported by the UE are applicable when the uplink shared channel message is associated with the single uplink shared channel or the more than one uplink shared channel that overlap at least partially in the time domain.

In some examples, the respective maximum rank value for each respective SRS resource set of the set of multiple SRS resource sets is applicable when the uplink shared channel message is associated with a single uplink shared channel or the more than one uplink shared channel that overlap at least partially in the time domain.

In some examples, each maximum rank value of the at least one maximum rank value is indicated per control resource set index value, per SRS resource set, per DCI format, per bandwidth part, or per component carrier.

In some examples, to support receiving the one or more control messages that indicate the at least one maximum rank value, the control message receiver 1025 may be configured as or otherwise support a means for receiving an indication of a baseline maximum rank value that is applicable to any one or more of the set of multiple SRS resource sets when the uplink shared channel message is associated with a single uplink shared channel. In some examples, to support receiving the one or more control messages that indicate the at least one maximum rank value, the control message receiver 1025 may be configured as or otherwise support a means for receiving an indication of a respective set of one or more maximum rank values for each respective SRS resource set of the set of multiple SRS resource sets, where the respective set of one or more maximum rank values for each respective SRS resource set are applicable to that respective SRS resource set when the uplink shared channel message is associated with the more than one uplink shared channel that overlap at least partially in the time domain, and where the baseline maximum rank value is less than or equal to a summation of the respective set of one or more maximum rank values for each respective SRS resource set of the set of multiple SRS resource sets.

In some examples, if the uplink shared channel message is associated with the single uplink shared channel, the one or more TPMI fields each indicate a rank value less than or equal to the baseline maximum rank value. In some examples, if the uplink shared channel message is associated with the more than one uplink shared channel that overlap at least partially in the time domain, the one or more TPMI fields each indicate rank values that are less than or equal to the respective set of one or more maximum rank values for each respective SRS resource set of the more than one uplink shared channel that overlap at least partially in the time domain.

In some examples, interpreting the one or more TPMI fields is independent of whether the uplink shared channel message is associated with the more than one uplink shared channel that overlap at least partially in the time domain. In some examples, interpreting the one or more SRI fields is independent of whether the uplink shared channel message is associated with the more than one uplink shared channel that overlap at least partially in the time domain.

In some examples, if the uplink shared channel message is associated with the single uplink shared channel, the one or more SRI fields each indicate a quantity of ports less than or equal to the maximum quantity of ports the UE is capable of supporting. In some examples, if the uplink shared channel message is associated with the more than one uplink shared channel that overlap at least partially in the time domain, the one or more SRI fields each indicate quantities of ports that are less than or equal to multiple maximum quantities of ports for each respective SRS resource set of the more than one uplink shared channel, where the maximum quantity of ports the UE is capable of supporting is equal to a summation of the multiple maximum quantities of ports for each respective SRS resource set.

In some examples, the DCI includes a field including information indicative of whether the uplink shared channel message is associated with the more than one uplink shared channel that overlap at least partially in the time domain. In some examples, the mapping is further indicated by whether the uplink shared channel message is associated with the more than one uplink shared channel that overlap at least partially in the time domain.

In some examples, if the field in the DCI indicates that the uplink shared channel message is associated with a single uplink shared channel, interpreting the one or more TPMI fields includes interpreting the one or more TPMI fields according to the mapping between the content of the one or more TPMI fields and each of the quantity of ports associated with one SRS resource for the single uplink shared channels. In some examples, if the field in the DCI indicates that the uplink shared channel message is associated with the more than one uplink shared channel that overlap at least partially in the time domain, interpreting the one or more TPMI fields includes interpreting the one or more TPMI fields according to a first mapping between the content of a first TPMI field and a first subset of a first quantity of ports associated with a first SRS resource from a first SRS resource set and a second mapping between the content of a second TPMI field and a second subset of a second quantity of ports associated with a second SRS resource from a second SRS resource set.

In some examples, the first subset includes a first half of the first quantity of ports associated with the first SRS resource. In some examples, the second subset includes a first half of the second quantity of ports associated with the second SRS resource.

In some examples, to support receiving the one or more control messages, the control message receiver 1025 may be configured as or otherwise support a means for receiving an indication of the first subset of the first quantity of ports associated with the first SRS resource and the second subset of the second quantity of ports associated with the second SRS resource.

In some examples, the capability component 1045 may be configured as or otherwise support a means for transmitting, via a capability report, information indicating the first subset of the first quantity of ports associated with the first SRS resource and the second subset of the second quantity of ports associated with the second SRS resource, the first subset and the second subset corresponding to maximum quantities of ports the UE is capable of supporting for the first SRS resource and the second SRS resource when the uplink shared channel message is associated with the more than one uplink shared channel that overlap at least partially in the time domain.

In some examples, interpreting the one or more SRI fields is independent of whether the uplink shared channel message is associated with the more than one uplink shared channel that overlap at least partially in the time domain.

In some examples, a size of each of the one or more TPMI fields corresponds to the maximum quantity of ports the UE is capable of supporting when the uplink shared channel message is associated with more than one uplink shared channel that overlap at least partially in the time domain.

In some examples, receiving the message including the DCI includes receiving the message within a first control resource set associated with a first control resource set index value, receiving the message within a second control resource set associated with a second control resource set index value, or a combination thereof. In some examples, one or more SRS resource sets are indicated from the set of multiple SRS resource sets by a combination of the field in the DCI that indicates whether the uplink shared channel message is associated with the more than one uplink shared channel and whether the message including the DCI is received within the first control resource set associated with the first control resource set index value or the second control resource set associated with the second control resource set index value. In some examples, interpreting the one or more SRI fields includes selecting, from the one or more SRS resource sets indicated from the set of multiple SRS resource sets, the at least one SRS resource for transmitting the uplink shared channel message in accordance with the one or more SRI fields.

In some examples, a first SRS resource set is indicated from the set of multiple SRS resource sets when the field in the DCI indicates that the uplink shared channel message is associated with a single uplink shared channel and the message including the DCI is received within the first control resource set associated with the first control resource set index value. In some examples, a second SRS resource set is indicated from the set of multiple SRS resource sets when the field in the DCI indicates that the uplink shared channel message is associated with the single uplink shared channel and the message including the DCI is received within the second control resource set associated with the second control resource set index value. In some examples, a third SRS resource set is indicated from the set of multiple SRS resource sets when the field in the DCI indicates that the uplink shared channel message is associated with the more than one uplink shared channel and the message including the DCI is received within the first control resource set associated with the first control resource set index value. In some examples, a fourth SRS resource set is indicated from the set of multiple SRS resource sets when the field in the DCI indicates that the uplink shared channel message is associated with the more than one uplink shared channel and the message including the DCI is received within the second control resource set associated with the first control resource set index value.

In some examples, the first SRS resource set and the third SRS resource set are associated with a first set of common power control parameters. In some examples, the second SRS resource set and the fourth SRS resource set are associated with a second set of common power control parameters.

In some examples, the first SRS a first quantity of SRS resources in the first SRS resource set and the third SRS resource set are the same. In some examples, a second quantity of SRS resources in the second SRS resource set and the fourth SRS resource set are the same.

In some examples, a first SRS resource having a first position within the first SRS resource set and a second SRS resource having the first position within the third SRS resource set are associated with a same beam, a same TCI state, a same spatial relation information, or a combination thereof. In some examples, a third SRS resource having a second position within the second SRS resource set and a fourth SRS resource having the second position within the fourth SRS resource set are associated with a same beam, a same TCI state, a same spatial relation information, or a combination thereof.

In some examples, a first SRS resource having a first position within the third SRS resource set is associated with a smaller quantity of ports than a second SRS resource having the first position within the first SRS resource set. In some examples, a third SRS resource having a second position within the fourth SRS resource set is associated with a smaller quantity of ports than a fourth SRS resource having the second position within the second SRS resource set.

In some examples, if the message including the DCI is received within the first control resource set, the field including information indicative of whether the uplink shared channel message is associated with more than one uplink shared channel that overlap at least partially in the time domain includes one bit that indicates: the first SRS resource setting if the uplink shared channel message is associated with the single uplink shared channel; and the third SRS resource setting if the uplink shared channel message is associated with the more than one uplink shared channel. In some examples, if the message including the DCI is received within the second control resource set, the field including information indicative of whether the uplink shared channel message is associated with more than one uplink shared channel that overlap at least partially in the time domain includes one bit that indicates: the second SRS resource setting if the uplink shared channel message is associated with the single uplink shared channel; and the fourth SRS resource set if the uplink shared channel message is associated with the more than one uplink shared channel.

In some examples, interpreting the one or more SRI fields is based on a combination of the field in the DCI that indicates whether the uplink shared channel message is associated with the more than one uplink shared channel and whether the message including the DCI is received within the first control resource set associated with the first control resource set index value or the second control resource set associated with the second control resource set index value.

In some examples, interpreting the one or more TPMI fields is based on a quantity of ports associated with the selected at least one SRS resource for transmitting the uplink shared channel message.

In some examples, the field including information indicative of whether the uplink shared channel message is associated with more than one uplink shared channel that overlap at least partially in the time domain includes one bit that indicates: the uplink shared channel message is associated with a single uplink shared channel; or the uplink shared channel message is associated with the more than one uplink shared channel that overlap at least partially in the time domain.

FIG. 11 shows a diagram of a system 1100 including a device 1105 that supports SRI designs for CB-based communications in accordance with one or more aspects of the present disclosure. The device 1105 may be an example of or include the components of a device 805, a device 905, or a UE 115 as described herein. The device 1105 may communicate (e.g., wirelessly) with one or more network entities 105, one or more UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting SRI designs for CB-based communications). For example, the device 1105 or a component of the device 1105 may include a processor 1140 and memory 1130 coupled with or to the processor 1140, the processor 1140 and memory 1130 configured to perform various functions described herein.

The communications manager 1120 may support wireless communication at a UE in accordance with examples as disclosed herein. For example, the communications manager 1120 may be configured as or otherwise support a means for receiving one or more control messages that indicate: a quantity of a set of multiple SRS resource sets, a quantity of one or more SRI fields included in one or more control messages, and a quantity of one or more TPMI fields included in the one or more control messages, where the set of multiple SRS resource sets are configured for CB usage; and at least one maximum rank value that is associated with uplink shared channel transmissions from the UE, the at least one maximum rank value being based on a threshold quantity of rank values supported by the UE. The communications manager 1120 may be configured as or otherwise support a means for receiving a message including DCI that schedules an uplink shared channel message, the DCI including one or more SRI fields and one or more TPMI fields. The communications manager 1120 may be configured as or otherwise support a means for interpreting the one or more SRI fields and the one or more TPMI fields according to a mapping between a content of the one or more TPMI fields and a quantity of ports associated with at least one SRS resource from the set of multiple SRS resource sets, the mapping being indicated by a quantity of the at least one maximum rank value and a maximum quantity of ports the UE is capable of supporting (e.g., when the uplink shared channel message is associated with more than one uplink shared channel that overlaps at least partially in a time domain). The communications manager 1120 may be configured as or otherwise support a means for transmitting the uplink shared channel message in accordance with the mapping between the content of the one or more TPMI fields and the quantity of ports associated with the at least one SRS resource from the set of multiple SRS resource sets.

By including or configuring the communications manager 1120 in accordance with examples as described herein, the device 1105 may support techniques more efficient utilization of communication resources.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of SRI designs for CB-based communications as described herein, or the processor 1140 and the memory 1130 may be otherwise configured to perform or support such operations.

FIG. 12 shows a block diagram 1200 of a device 1205 that supports SRI designs for CB-based communications in accordance with one or more aspects of the present disclosure. The device 1205 may be an example of aspects of a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The communications manager 1220, the receiver 1210, the transmitter 1215, or various combinations thereof or various components thereof may be examples of means for performing various aspects of SRI designs for CB-based communications as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1220 may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communication at a network entity in accordance with examples as disclosed herein. For example, the communications manager 1220 may be configured as or otherwise support a means for transmitting one or more control messages that indicate: a quantity of a set of multiple SRS resource sets, a quantity of one or more SRI fields included in one or more control messages, and a quantity of one or more TPMI fields included in the one or more control messages, where the set of multiple SRS resource sets are configured for CB usage; and at least one maximum rank value that is associated with uplink shared channel transmissions from a UE, the at least one maximum rank value being based on a threshold quantity of rank values supported by the UE. The communications manager 1220 may be configured as or otherwise support a means for transmitting a message including DCI that schedules an uplink shared channel message, the DCI including one or more SRI fields and one or more TPMI fields. The communications manager 1220 may be configured as or otherwise support a means for receiving the uplink shared channel message in accordance with according to a mapping between a content of the one or more TPMI fields and a quantity of ports associated with at least one SRS resource from the set of multiple SRS resource sets, the mapping being indicated by a quantity of the at least one maximum rank value and a maximum quantity of ports the UE is capable of supporting (e.g., when the uplink shared channel message is associated with more than one uplink shared channel that overlaps at least partially in a time domain).

By including or configuring the communications manager 1220 in accordance with examples as described herein, the device 1205 (e.g., a processor controlling or otherwise coupled with the receiver 1210, the transmitter 1215, the communications manager 1220, or a combination thereof) may support techniques for reduced power consumption.

FIG. 13 shows a block diagram 1300 of a device 1305 that supports SRI designs for CB-based communications in accordance with one or more aspects of the present disclosure. The device 1305 may be an example of aspects of a device 1205 or a network entity 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The device 1305, or various components thereof, may be an example of means for performing various aspects of SRI designs for CB-based communications as described herein. For example, the communications manager 1320 may include a control message transmitter 1325, a DCI transmitter 1330, an PUSCH receiver 1335, or any combination thereof. The communications manager 1320 may be an example of aspects of a communications manager 1220 as described herein. In some examples, the communications manager 1320, or various components thereof, may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both, to obtain information, output information, or perform various other operations as described herein.

The communications manager 1320 may support wireless communication at a network entity in accordance with examples as disclosed herein. The control message transmitter 1325 may be configured as or otherwise support a means for transmitting one or more control messages that indicate: a quantity of a set of multiple SRS resource sets, a quantity of one or more SRI fields included in one or more control messages, and a quantity of one or more TPMI fields included in the one or more control messages, where the set of multiple SRS resource sets are configured for CB usage; and the control message transmitter 1325 may be configured as or otherwise support a means for at least one maximum rank value that is associated with uplink shared channel transmissions from a UE, the at least one maximum rank value being based on a threshold quantity of rank values supported by the UE. The DCI transmitter 1330 may be configured as or otherwise support a means for transmitting a message including DCI that schedules an uplink shared channel message, the DCI including one or more SRI fields and one or more TPMI fields. The PUSCH receiver 1335 may be configured as or otherwise support a means for receiving the uplink shared channel message in accordance with according to a mapping between a content of the one or more TPMI fields and a quantity of ports associated with at least one SRS resource from the set of multiple SRS resource sets, the mapping being indicated by a quantity of the at least one maximum rank value and the PUSCH receiver 1335 may be configured as or otherwise support a means for a maximum quantity of ports the UE is capable of supporting (e.g., when the uplink shared channel message is associated with more than one uplink shared channel that overlaps at least partially in a time domain).

FIG. 14 shows a block diagram 1400 of a communications manager 1420 that supports SRI designs for CB-based communications in accordance with one or more aspects of the present disclosure. The communications manager 1420 may be an example of aspects of a communications manager 1220, a communications manager 1320, or both, as described herein. The communications manager 1420, or various components thereof, may be an example of means for performing various aspects of SRI designs for CB-based communications as described herein. For example, the communications manager 1420 may include a control message transmitter 1425, a DCI transmitter 1430, an PUSCH receiver 1435, a capability report receiver 1440, a configuration component 1445, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1420 may support wireless communication at a network entity in accordance with examples as disclosed herein. The control message transmitter 1425 may be configured as or otherwise support a means for transmitting one or more control messages that indicate: a means for a quantity of a set of multiple SRS resource sets, a quantity of one or more SRI fields included in one or more control messages, and a quantity of one or more TPMI fields included in the one or more control messages, where the set of multiple SRS resource sets are configured for CB usage; and the control message transmitter 1425 may be configured as or otherwise support a means for at least one maximum rank value that is associated with uplink shared channel transmissions from a UE, the at least one maximum rank value being based on a threshold quantity of rank values supported by the UE. The DCI transmitter 1430 may be configured as or otherwise support a means for transmitting a message including DCI that schedules an uplink shared channel message, the DCI including one or more SRI fields and one or more TPMI fields. The PUSCH receiver 1435 may be configured as or otherwise support a means for receiving the uplink shared channel message in accordance with according to a mapping between a content of the one or more TPMI fields and a quantity of ports associated with at least one SRS resource from the set of multiple SRS resource sets, the mapping being indicated by a quantity of the at least one maximum rank value and the PUSCH receiver 1435 may be configured as or otherwise support a means for a maximum quantity of ports the UE is capable of supporting (e.g., when the uplink shared channel message is associated with more than one uplink shared channel that overlaps at least partially in a time domain).

In some examples, the capability report receiver 1440 may be configured as or otherwise support a means for receiving, via a capability report, information associated with the maximum quantity of ports the UE is capable of supporting when the uplink shared channel message is associated with the more than one uplink shared channel that overlap at least partially in the time domain, when the uplink shared channel message is associated with a single uplink shared channel, or both, where transmitting the message including the DCI is based on transmitting the information via the capability report.

In some examples, the configuration component 1445 may be configured as or otherwise support a means for transmitting an indication of a configuration associated with the at least one maximum rank value, where the configuration is either a first configuration or a second configuration. In some examples, the configuration component 1445 may be configured as or otherwise support a means for the first configuration indicating that, if the uplink shared channel message is associated with a single uplink shared channel, the maximum quantity of ports associated with the uplink shared channel message is equal to a larger between a first maximum quantity of ports of a first SRS resource and a second maximum quantity of ports of a second SRS resource and the configuration component 1445 may be configured as or otherwise support a means for the second configuration indicating that, if the uplink shared channel message is associated with the single uplink shared channel, the maximum quantity of ports associated with the uplink shared channel message is equal to a summation of the first maximum quantity of ports of the first SRS resource and the second maximum quantity of ports of the second SRS resource.

In some examples, the configuration is indicated per DCI format, per bandwidth part, or per component carrier.

In some examples, to support transmitting the one or more control messages that indicate the at least one maximum rank value, the control message transmitter 1425 may be configured as or otherwise support a means for transmitting an indication of a respective maximum rank value for each respective SRS resource set of the set of multiple SRS resource sets configured at the UE.

In some examples, an interpretation of the one or more TPMI fields is independent of whether the uplink shared channel message is associated with the more than one uplink shared channel that overlap at least partially in the time domain. In some examples, an interpretation of the one or more SRI fields is independent of whether the uplink shared channel message is associated with the more than one uplink shared channel that overlap at least partially in the time domain. In some examples, the at least one maximum rank value that is associated with uplink shared channel transmissions from the UE is applicable when the uplink shared channel message is associated with a single uplink shared channel or the more than one uplink shared channel that overlap at least partially in the time domain. In some examples, a threshold quantity of ports supported by the UE are applicable when the uplink shared channel message is associated with the single uplink shared channel or the more than one uplink shared channel that overlap at least partially in the time domain.

In some examples, the respective maximum rank value for each respective SRS resource set of the set of multiple SRS resource sets is applicable when the uplink shared channel message is associated with a single uplink shared channel or the more than one uplink shared channel that overlap at least partially in the time domain.

In some examples, each maximum rank value of the at least one maximum rank value is indicated per control resource set index value, per SRS resource set, per DCI format, per bandwidth part, or per component carrier.

In some examples, to support transmitting the one or more control messages that indicate the at least one maximum rank value, the control message transmitter 1425 may be configured as or otherwise support a means for transmitting an indication of a baseline maximum rank value that is applicable to any one or more of the set of multiple SRS resource sets when the uplink shared channel message is associated with a single uplink shared channel. In some examples, to support transmitting the one or more control messages that indicate the at least one maximum rank value, the control message transmitter 1425 may be configured as or otherwise support a means for transmitting an indication of a respective set of one or more maximum rank values for each respective SRS resource set of the set of multiple SRS resource sets, where the respective set of one or more maximum rank values for each respective SRS resource set are applicable to that respective SRS resource set when the uplink shared channel message is associated with the more than one uplink shared channel that overlap at least partially in the time domain, and where the baseline maximum rank value is less than or equal to a summation of the respective set of one or more maximum rank values for each respective SRS resource set of the set of multiple SRS resource sets.

In some examples, if the uplink shared channel message is associated with the single uplink shared channel, the one or more TPMI fields each indicate a rank value less than or equal to the baseline maximum rank value. In some examples, if the uplink shared channel message is associated with the more than one uplink shared channel that overlap at least partially in the time domain, the one or more TPMI fields each indicate rank values that are less than or equal to the respective set of one or more maximum rank values for each respective SRS resource set of the more than one uplink shared channel that overlap at least partially in the time domain.

In some examples, an interpretation of the one or more TPMI fields is independent of whether the uplink shared channel message is associated with the more than one uplink shared channel that overlap at least partially in the time domain. In some examples, an interpretation of the one or more SRI fields is independent of whether the uplink shared channel message is associated with the more than one uplink shared channel that overlap at least partially in the time domain.

In some examples, if the uplink shared channel message is associated with the single uplink shared channel, the one or more SRI fields each indicate a quantity of ports less than or equal to the maximum quantity of ports the UE is capable of supporting. In some examples, if the uplink shared channel message is associated with the more than one uplink shared channel that overlap at least partially in the time domain, the one or more SRI fields each indicate quantities of ports that are less than or equal to multiple maximum quantities of ports for each respective SRS resource set of the more than one uplink shared channel, where the maximum quantity of ports the UE is capable of supporting is equal to a summation of the multiple maximum quantities of ports for each respective SRS resource set.

In some examples, the DCI includes a field including information indicative of whether the uplink shared channel message is associated with the more than one uplink shared channel that overlap at least partially in the time domain. In some examples, the mapping is further indicated by whether the uplink shared channel message is associated with the more than one uplink shared channel that overlap at least partially in the time domain.

In some examples, if the field in the DCI indicates that the uplink shared channel message is associated with a single uplink shared channel, an interpretation of the one or more TPMI fields includes interpreting the one or more TPMI fields according to the mapping between the content of the one or more TPMI fields and each of the quantity of ports associated with one SRS resource for the single uplink shared channels. In some examples, if the field in the DCI indicates that the uplink shared channel message is associated with the more than one uplink shared channel that overlap at least partially in the time domain, an interpretation of the one or more TPMI fields includes interpreting the one or more TPMI fields according to a first mapping between the content of a first TPMI field and a first subset of a first quantity of ports associated with a first SRS resource from a first SRS resource set and a second mapping between the content of a second TPMI field and a second subset of a second quantity of ports associated with a second SRS resource from a second SRS resource set.

In some examples, the first subset includes a first half of the first quantity of ports associated with the first SRS resource. In some examples, the second subset includes a first half of the second quantity of ports associated with the second SRS resource.

In some examples, to support transmitting the one or more control messages, the control message transmitter 1425 may be configured as or otherwise support a means for transmitting an indication of the first subset of the first quantity of ports associated with the first SRS resource and the second subset of the second quantity of ports associated with the second SRS resource.

In some examples, the capability report receiver 1440 may be configured as or otherwise support a means for receiving, via a capability report, information indicating the first subset of the first quantity of ports associated with the first SRS resource and the second subset of the second quantity of ports associated with the second SRS resource, the first subset and the second subset corresponding to maximum quantities of ports the UE is capable of supporting for the first SRS resource and the second SRS resource when the uplink shared channel message is associated with the more than one uplink shared channel that overlap at least partially in the time domain.

In some examples, the interpretation of the one or more SRI fields is independent of whether the uplink shared channel message is associated with the more than one uplink shared channel that overlap at least partially in the time domain.

In some examples, a size of each of the one or more TPMI fields corresponds to the maximum quantity of ports the UE is capable of supporting when the uplink shared channel message is associated with more than one uplink shared channel that overlap at least partially in the time domain.

In some examples, transmitting the message including the DCI includes transmitting the message within a first control resource set associated with a first control resource set index value, transmitting the message within a second control resource set associated with a second control resource set index value, or a combination thereof. In some examples, one or more SRS resource sets are indicated from the set of multiple SRS resource sets by a combination of the field in the DCI that indicates whether the uplink shared channel message is associated with the more than one uplink shared channel and whether the message including the DCI is transmitted within the first control resource set associated with the first control resource set index value or the second control resource set associated with the second control resource set index value. In some examples, an interpretation of the one or more SRI fields includes selecting, from the one or more SRS resource sets indicated from the set of multiple SRS resource sets, the at least one SRS resource for receiving the uplink shared channel message in accordance with the one or more SRI fields.

In some examples, a first SRS resource set is indicated from the set of multiple SRS resource sets when the field in the DCI indicates that the uplink shared channel message is associated with a single uplink shared channel and the message including the DCI is transmitted within the first control resource set associated with the first control resource set index value. In some examples, a second SRS resource set is indicated from the set of multiple SRS resource sets when the field in the DCI indicates that the uplink shared channel message is associated with the single uplink shared channel and the message including the DCI is transmitted within the second control resource set associated with the second control resource set index value. In some examples, a third SRS resource set is indicated from the set of multiple SRS resource sets when the field in the DCI indicates that the uplink shared channel message is associated with the more than one uplink shared channel and the message including the DCI is transmitted within the first control resource set associated with the first control resource set index value. In some examples, a fourth SRS resource set is indicated from the set of multiple SRS resource sets when the field in the DCI indicates that the uplink shared channel message is associated with the more than one uplink shared channel and the message including the DCI is transmitted within the second control resource set associated with the first control resource set index value.

In some examples, the first SRS resource set and the third SRS resource set are associated with a first set of common power control parameters. In some examples, the second SRS resource set and the fourth SRS resource set are associated with a second set of common power control parameters.

In some examples, the first SRS a first quantity of SRS resources in the first SRS resource set and the third SRS resource set are the same. In some examples, a second quantity of SRS resources in the second SRS resource set and the fourth SRS resource set are the same.

In some examples, a first SRS resource having a first position within the first SRS resource set and a second SRS resource having the first position within the third SRS resource set are associated with a same beam, a same TCI state, a same spatial relation information, or a combination thereof. In some examples, a third SRS resource having a second position within the second SRS resource set and a fourth SRS resource having the second position within the fourth SRS resource set are associated with a same beam, a same TCI state, a same spatial relation information, or a combination thereof.

In some examples, a first SRS resource having a first position within the third SRS resource set is associated with a smaller quantity of ports than a second SRS resource having the first position within the first SRS resource set. In some examples, a third SRS resource having a second position within the fourth SRS resource set is associated with a smaller quantity of ports than a fourth SRS resource having the second position within the second SRS resource set.

In some examples, if the message including the DCI is transmitted within the first control resource set, the field including information indicative of whether the uplink shared channel message is associated with more than one uplink shared channel that overlap at least partially in the time domain includes one bit that indicates: the first SRS resource setting if the uplink shared channel message is associated with the single uplink shared channel; and the third SRS resource setting if the uplink shared channel message is associated with the more than one uplink shared channel. In some examples, if the message including the DCI is transmitted within the second control resource set, the field including information indicative of whether the uplink shared channel message is associated with more than one uplink shared channel that overlap at least partially in the time domain includes one bit that indicates: the second SRS resource setting if the uplink shared channel message is associated with the single uplink shared channel; and the fourth SRS resource set if the uplink shared channel message is associated with the more than one uplink shared channel.

In some examples, the interpretation of the one or more SRI fields is based on a combination of the field in the DCI that indicates whether the uplink shared channel message is associated with the more than one uplink shared channel and whether the message including the DCI is transmitted within the first control resource set associated with the first control resource set index value or the second control resource set associated with the second control resource set index value.

In some examples, an interpretation of the one or more TPMI fields is based on a quantity of ports associated with the selected at least one SRS resource for receiving the uplink shared channel message.

In some examples, the field including information indicative of whether the uplink shared channel message is associated with more than one uplink shared channel that overlap at least partially in the time domain includes one bit that indicates: the uplink shared channel message is associated with a single uplink shared channel; or the uplink shared channel message is associated with the more than one uplink shared channel that overlap at least partially in the time domain.

FIG. 15 shows a diagram of a system 1500 including a device 1505 that supports SRI designs for CB-based communications in accordance with one or more aspects of the present disclosure. The device 1505 may be an example of or include the components of a device 1205, a device 1305, or a network entity 105 as described herein. The device 1505 may communicate with one or more network entities 105, one or more UEs 115, or any combination thereof, which may include communications over one or more wired interfaces, over one or more wireless interfaces, or any combination thereof. The device 1505 may include components that support outputting and obtaining communications, such as a communications manager 1520, a transceiver 1510, an antenna 1515, a memory 1525, code 1530, and a processor 1535. These components may be in electronic communication or otherwise coupled (e.g., operatively, communicatively, functionally, electronically, electrically) via one or more buses (e.g., a bus 1540).

The transceiver 1510 may support bi-directional communications via wired links, wireless links, or both as described herein. In some examples, the transceiver 1510 may include a wired transceiver and may communicate bi-directionally with another wired transceiver. Additionally, or alternatively, in some examples, the transceiver 1510 may include a wireless transceiver and may communicate bi-directionally with another wireless transceiver. In some examples, the device 1505 may include one or more antennas 1515, which may be capable of transmitting or receiving wireless transmissions (e.g., concurrently). The transceiver 1510 may also include a modem to modulate signals, to provide the modulated signals for transmission (e.g., by one or more antennas 1515, by a wired transmitter), to receive modulated signals (e.g., from one or more antennas 1515, from a wired receiver), and to demodulate signals. In some implementations, the transceiver 1510 may include one or more interfaces, such as one or more interfaces coupled with the one or more antennas 1515 that are configured to support various receiving or obtaining operations, or one or more interfaces coupled with the one or more antennas 1515 that are configured to support various transmitting or outputting operations, or a combination thereof. In some implementations, the transceiver 1510 may include or be configured for coupling with one or more processors or memory components that are operable to perform or support operations based on received or obtained information or signals, or to generate information or other signals for transmission or other outputting, or any combination thereof. In some implementations, the transceiver 1510, or the transceiver 1510 and the one or more antennas 1515, or the transceiver 1510 and the one or more antennas 1515 and one or more processors or memory components (for example, the processor 1535, or the memory 1525, or both), may be included in a chip or chip assembly that is installed in the device 1505. In some examples, the transceiver may be operable to support communications via one or more communications links (e.g., a communication link 125, a backhaul communication link 120, a midhaul communication link 162, a fronthaul communication link 168).

The memory 1525 may include RAM and ROM. The memory 1525 may store computer-readable, computer-executable code 1530 including instructions that, when executed by the processor 1535, cause the device 1505 to perform various functions described herein. The code 1530 may be stored in a non-transitory computer-readable medium such as system memory or another type of memory. In some cases, the code 1530 may not be directly executable by the processor 1535 but may cause a computer (e.g., when compiled and executed) to perform functions described herein. In some cases, the memory 1525 may contain, among other things, a BIOS which may control basic hardware or software operation such as the interaction with peripheral components or devices.

The processor 1535 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1535 may be configured to operate a memory array using a memory controller. In some other cases, a memory controller may be integrated into the processor 1535. The processor 1535 may be configured to execute computer-readable instructions stored in a memory (e.g., the memory 1525) to cause the device 1505 to perform various functions (e.g., functions or tasks supporting SRI designs for CB-based communications). For example, the device 1505 or a component of the device 1505 may include a processor 1535 and memory 1525 coupled with the processor 1535, the processor 1535 and memory 1525 configured to perform various functions described herein. The processor 1535 may be an example of a cloud-computing platform (e.g., one or more physical nodes and supporting software such as operating systems, virtual machines, or container instances) that may host the functions (e.g., by executing code 1530) to perform the functions of the device 1505. The processor 1535 may be any one or more suitable processors capable of executing scripts or instructions of one or more software programs stored in the device 1505 (such as within the memory 1525). In some implementations, the processor 1535 may be a component of a processing system. A processing system may generally refer to a system or series of machines or components that receives inputs and processes the inputs to produce a set of outputs (which may be passed to other systems or components of, for example, the device 1505). For example, a processing system of the device 1505 may refer to a system including the various other components or subcomponents of the device 1505, such as the processor 1535, or the transceiver 1510, or the communications manager 1520, or other components or combinations of components of the device 1505. The processing system of the device 1505 may interface with other components of the device 1505, and may process information received from other components (such as inputs or signals) or output information to other components. For example, a chip or modem of the device 1505 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1505 may transmit information output from the chip or modem. Additionally, or alternatively, in some implementations, the one or more interfaces may refer to an interface between the processing system of the chip or modem and a receiver, such that the device 1505 may obtain information or signal inputs, and the information may be passed to the processing system. A person having ordinary skill in the art will readily recognize that a first interface also may obtain information or signal inputs, and a second interface also may output information or signal outputs.

In some examples, a bus 1540 may support communications of (e.g., within) a protocol layer of a protocol stack. In some examples, a bus 1540 may support communications associated with a logical channel of a protocol stack (e.g., between protocol layers of a protocol stack), which may include communications performed within a component of the device 1505, or between different components of the device 1505 that may be co-located or located in different locations (e.g., where the device 1505 may refer to a system in which one or more of the communications manager 1520, the transceiver 1510, the memory 1525, the code 1530, and the processor 1535 may be located in one of the different components or divided between different components).

In some examples, the communications manager 1520 may manage aspects of communications with a core network 130 (e.g., via one or more wired or wireless backhaul links). For example, the communications manager 1520 may manage the transfer of data communications for client devices, such as one or more UEs 115. In some examples, the communications manager 1520 may manage communications with other network entities 105, and may include a controller or scheduler for controlling communications with UEs 115 in cooperation with other network entities 105. In some examples, the communications manager 1520 may support an X2 interface within an LTE/LTE-A wireless communications network technology to provide communication between network entities 105.

The communications manager 1520 may support wireless communication at a network entity in accordance with examples as disclosed herein. For example, the communications manager 1520 may be configured as or otherwise support a means for transmitting one or more control messages that indicate: a quantity of a set of multiple SRS resource sets, a quantity of one or more SRI fields included in one or more control messages, and a quantity of one or more TPMI fields included in the one or more control messages, where the set of multiple SRS resource sets are configured for CB usage; and at least one maximum rank value that is associated with uplink shared channel transmissions from a UE, the at least one maximum rank value being based on a threshold quantity of rank values supported by the UE. The communications manager 1520 may be configured as or otherwise support a means for transmitting a message including DCI that schedules an uplink shared channel message, the DCI including one or more SRI fields and one or more TPMI fields. The communications manager 1520 may be configured as or otherwise support a means for receiving the uplink shared channel message in accordance with according to a mapping between a content of the one or more TPMI fields and a quantity of ports associated with at least one SRS resource from the set of multiple SRS resource sets, the mapping being indicated by a quantity of the at least one maximum rank value and a maximum quantity of ports the UE is capable of supporting (e.g., when the uplink shared channel message is associated with more than one uplink shared channel that overlaps at least partially in a time domain).

By including or configuring the communications manager 1520 in accordance with examples as described herein, the device 1505 may support techniques for more efficient utilization of communication resources and improved coordination.

In some examples, the communications manager 1520 may be configured to perform various operations (e.g., receiving, obtaining, monitoring, outputting, transmitting) using or otherwise in cooperation with the transceiver 1510, the one or more antennas 1515 (e.g., where applicable), or any combination thereof. Although the communications manager 1520 is illustrated as a separate component, in some examples, one or more functions described with reference to the communications manager 1520 may be supported by or performed by the transceiver 1510, the processor 1535, the memory 1525, the code 1530, or any combination thereof. For example, the code 1530 may include instructions executable by the processor 1535 to cause the device 1505 to perform various aspects of SRI designs for CB-based communications as described herein, or the processor 1535 and the memory 1525 may be otherwise configured to perform or support such operations.

FIG. 16 shows a flowchart illustrating a method 1600 that supports SRI designs for CB-based communications in accordance with one or more aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1605, the method may include receiving one or more control messages that indicate: a quantity of a set of multiple SRS resource sets, a quantity of one or more SRI fields included in one or more control messages, and a quantity of one or more TPMI fields included in the one or more control messages, where the set of multiple SRS resource sets are configured for CB usage; and at least one maximum rank value that is associated with uplink shared channel transmissions from the UE, the at least one maximum rank value being based on a threshold quantity of rank values supported by the UE. The operations of 1605 may be performed in accordance with examples as disclosed herein. In some examples, aspects of the operations of 1605 may be performed by a control message receiver 1025 as described with reference to FIG. 10.

At 1610, the method may include receiving a message including DCI that schedules an uplink shared channel message, the DCI including one or more SRI fields and one or more TPMI fields. The operations of 1610 may be performed in accordance with examples as disclosed herein. In some examples, aspects of the operations of 1610 may be performed by a DCI receiver 1030 as described with reference to FIG. 10.

At 1615, the method may include interpreting the one or more SRI fields and the one or more TPMI fields according to a mapping between a content of the one or more TPMI fields and a quantity of ports associated with at least one SRS resource from the set of multiple SRS resource sets, the mapping being indicated by a quantity of the at least one maximum rank value and a maximum quantity of ports the UE is capable of supporting (e.g., when the uplink shared channel message is associated with more than one uplink shared channel that overlaps at least partially in a time domain). The operations of 1615 may be performed in accordance with examples as disclosed herein. In some examples, aspects of the operations of 1615 may be performed by an interpretation component 1035 as described with reference to FIG. 10.

At 1620, the method may include transmitting the uplink shared channel message in accordance with the mapping between the content of the one or more TPMI fields and the quantity of ports associated with the at least one SRS resource from the set of multiple SRS resource sets. The operations of 1620 may be performed in accordance with examples as disclosed herein. In some examples, aspects of the operations of 1620 may be performed by an PUSCH transmitter 1040 as described with reference to FIG. 10.

FIG. 17 shows a flowchart illustrating a method 1700 that supports SRI designs for CB-based communications in accordance with one or more aspects of the present disclosure. The operations of the method 1700 may be implemented by a network entity or its components as described herein. For example, the operations of the method 1700 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 1705, the method may include transmitting one or more control messages that indicate: a quantity of a set of multiple SRS resource sets, a quantity of one or more SRI fields included in one or more control messages, and a quantity of one or more TPMI fields included in the one or more control messages, where the set of multiple SRS resource sets are configured for CB usage; and at least one maximum rank value that is associated with uplink shared channel transmissions from a UE, the at least one maximum rank value being based on a threshold quantity of rank values supported by the UE. The operations of 1705 may be performed in accordance with examples as disclosed herein. In some examples, aspects of the operations of 1705 may be performed by a control message transmitter 1425 as described with reference to FIG. 14.

At 1710, the method may include transmitting a message including DCI that schedules an uplink shared channel message, the DCI including one or more SRI fields and one or more TPMI fields. The operations of 1710 may be performed in accordance with examples as disclosed herein. In some examples, aspects of the operations of 1710 may be performed by a DCI transmitter 1430 as described with reference to FIG. 14.

At 1715, the method may include receiving the uplink shared channel message in accordance with according to a mapping between a content of the one or more TPMI fields and a quantity of ports associated with at least one SRS resource from the set of multiple SRS resource sets, the mapping being indicated by: a quantity of the at least one maximum rank value and a maximum quantity of ports the UE is capable of supporting (e.g., when the uplink shared channel message is associated with more than one uplink shared channel that overlaps at least partially in a time domain). The operations of 1715 may be performed in accordance with examples as disclosed herein. In some examples, aspects of the operations of 1715 may be performed by an PUSCH receiver 1435 as described with reference to FIG. 14.

The following provides an overview of aspects of the present disclosure:

Aspect 1: A method for wireless communication by a UE, comprising: receiving one or more control messages that indicate: a quantity of a plurality of SRS resource sets, a quantity of one or more SRI fields included in one or more control messages, and a quantity of one or more TPMI fields included in the one or more control messages, wherein the plurality of SRS resource sets are configured for CB usage, and at least one maximum rank value that is associated with uplink shared channel transmissions from the UE, the at least one maximum rank value being based at least in part on a threshold quantity of rank values supported by the UE; receiving a message comprising DCI that schedules an uplink shared channel message, the DCI including one or more SRI fields and one or more TPMI fields; interpreting the one or more SRI fields and the one or more TPMI fields according to a mapping between a content of the one or more TPMI fields and a quantity of ports associated with at least one SRS resource from the plurality of SRS resource sets, the mapping being indicated by: a quantity of the at least one maximum rank value, and a maximum quantity of ports the UE is capable of supporting; and transmitting the uplink shared channel message in accordance with the mapping between the content of the one or more TPMI fields and the quantity of ports associated with the at least one SRS resource from the plurality of SRS resource sets.

Aspect 2: The method of aspect 1, further comprising: transmitting, via a capability report, information associated with the maximum quantity of ports the UE is capable of supporting when the uplink shared channel message is associated with more than one uplink shared channel that overlap at least partially in a time domain, when the uplink shared channel message is associated with a single uplink shared channel, or both, wherein receiving the message comprising the DCI is based at least in part on transmitting the information via the capability report.

Aspect 3: The method of any of aspects 1 through 2, further comprising: receiving an indication of a configuration associated with the at least one maximum rank value, wherein the configuration is either a first configuration or a second configuration, and wherein: the first configuration indicates that, if the uplink shared channel message is associated with a single uplink shared channel, the maximum quantity of ports associated with the uplink shared channel message is equal to a larger between a first maximum quantity of ports of a first SRS resource and a second maximum quantity of ports of a second SRS resource, and the second configuration indicates that, if the uplink shared channel message is associated with the single uplink shared channel, the maximum quantity of ports associated with the uplink shared channel message is equal to a summation of the first maximum quantity of ports of the first SRS resource and the second maximum quantity of ports of the second SRS resource.

Aspect 4: The method of aspect 3, wherein the configuration is indicated per DCI format, per bandwidth part, or per component carrier.

Aspect 5: The method of any of aspects 1 through 4, wherein receiving the one or more control messages that indicate the at least one maximum rank value further comprises: receiving an indication of a respective maximum rank value for each respective SRS resource set of the plurality of SRS resource sets configured at the UE.

Aspect 6: The method of aspect 5, wherein interpreting the one or more TPMI fields is independent of whether the uplink shared channel message is associated with more than one uplink shared channel that overlap at least partially in a time domain; interpreting the one or more SRI fields is independent of whether the uplink shared channel message is associated with the more than one uplink shared channel that overlap at least partially in the time domain; the at least one maximum rank value that is associated with uplink shared channel transmissions from the UE is applicable when the uplink shared channel message is associated with a single uplink shared channel or the more than one uplink shared channel that overlap at least partially in the time domain; and a threshold quantity of ports supported by the UE are applicable when the uplink shared channel message is associated with the single uplink shared channel or the more than one uplink shared channel that overlap at least partially in the time domain.

Aspect 7: The method of any of aspects 5 through 6, wherein the respective maximum rank value for each respective SRS resource set of the plurality of SRS resource sets is applicable when the uplink shared channel message is associated with a single uplink shared channel or more than one uplink shared channel that overlap at least partially in a time domain.

Aspect 8: The method of any of aspects 1 through 7, wherein each maximum rank value of the at least one maximum rank value is indicated per control resource set index value, per SRS resource set, per DCI format, per bandwidth part, or per component carrier.

Aspect 9: The method of any of aspects 1 through 8, wherein receiving the one or more control messages that indicate the at least one maximum rank value further comprises: receiving an indication of a baseline maximum rank value that is applicable to any one or more of the plurality of SRS resource sets when the uplink shared channel message is associated with a single uplink shared channel; and receiving an indication of a respective set of one or more maximum rank values for each respective SRS resource set of the plurality of SRS resource sets, wherein the respective set of one or more maximum rank values for each respective SRS resource set are applicable to that respective SRS resource set when the uplink shared channel message is associated with more than one uplink shared channel that overlap at least partially in a time domain, and wherein the baseline maximum rank value is less than or equal to a summation of the respective set of one or more maximum rank values for each respective SRS resource set of the plurality of SRS resource sets.

Aspect 10: The method of aspect 9, wherein if the uplink shared channel message is associated with the single uplink shared channel, the one or more TPMI fields each indicate a rank value less than or equal to the baseline maximum rank value; and if the uplink shared channel message is associated with the more than one uplink shared channel that overlap at least partially in the time domain, the one or more TPMI fields each indicate rank values that are less than or equal to the respective set of one or more maximum rank values for each respective SRS resource set of the more than one uplink shared channel that overlap at least partially in the time domain.

Aspect 11: The method of any of aspects 9 through 10, wherein interpreting the one or more TPMI fields is independent of whether the uplink shared channel message is associated with the more than one uplink shared channel that overlap at least partially in the time domain; interpreting the one or more SRI fields is independent of whether the uplink shared channel message is associated with the more than one uplink shared channel that overlap at least partially in the time domain; if the uplink shared channel message is associated with the single uplink shared channel, the one or more SRI fields each indicate a quantity of ports less than or equal to the maximum quantity of ports the UE is capable of supporting; and if the uplink shared channel message is associated with the more than one uplink shared channel that overlap at least partially in the time domain, the one or more SRI fields each indicate quantities of ports that are less than or equal to multiple maximum quantities of ports for each respective SRS resource set of the more than one uplink shared channel, wherein the maximum quantity of ports the UE is capable of supporting is equal to a summation of the multiple maximum quantities of ports for each respective SRS resource set.

Aspect 12: The method of any of aspects 1 through 11, wherein the DCI comprises a field including information indicative of whether the uplink shared channel message is associated with more than one uplink shared channel that overlap at least partially in a time domain; and the mapping is further indicated by whether the uplink shared channel message is associated with the more than one uplink shared channel that overlap at least partially in the time domain.

Aspect 13: The method of aspect 12, wherein if the field in the DCI indicates that the uplink shared channel message is associated with a single uplink shared channel, interpreting the one or more TPMI fields comprises interpreting the one or more TPMI fields according to the mapping between the content of the one or more TPMI fields and each of the quantity of ports associated with one SRS resource for the single uplink shared channel; and if the field in the DCI indicates that the uplink shared channel message is associated with the more than one uplink shared channel that overlap at least partially in the time domain, interpreting the one or more TPMI fields comprises interpreting the one or more TPMI fields according to a first mapping between the content of a first TPMI field and a first subset of a first quantity of ports associated with a first SRS resource from a first SRS resource set and a second mapping between the content of a second TPMI field and a second subset of a second quantity of ports associated with a second SRS resource from a second SRS resource set.

Aspect 14: The method of aspect 13, wherein the first subset comprises a first half of the first quantity of ports associated with the first SRS resource; and the second subset comprises a first half of the second quantity of ports associated with the second SRS resource.

Aspect 15: The method of any of aspects 13 through 14, wherein receiving the one or more control messages further comprises: receiving an indication of the first subset of the first quantity of ports associated with the first SRS resource and the second subset of the second quantity of ports associated with the second SRS resource.

Aspect 16: The method of any of aspects 13 through 15, further comprising: transmitting, via a capability report, information indicating the first subset of the first quantity of ports associated with the first SRS resource and the second subset of the second quantity of ports associated with the second SRS resource, the first subset and the second subset corresponding to maximum quantities of ports the UE is capable of supporting for the first SRS resource and the second SRS resource when the uplink shared channel message is associated with the more than one uplink shared channel that overlap at least partially in the time domain.

Aspect 17: The method of any of aspects 13 through 16, wherein interpreting the one or more SRI fields is independent of whether the uplink shared channel message is associated with the more than one uplink shared channel that overlap at least partially in the time domain.

Aspect 18: The method of any of aspects 12 through 17, wherein a size of each of the one or more TPMI fields corresponds to the maximum quantity of ports the UE is capable of supporting when the uplink shared channel message is associated with more than one uplink shared channel that overlap at least partially in the time domain.

Aspect 19: The method of any of aspects 12 through 18, wherein receiving the message comprising the DCI comprises receiving the message within a first control resource set associated with a first control resource set index value, receiving the message within a second control resource set associated with a second control resource set index value, or a combination thereof; one or more SRS resource sets are indicated from the plurality of SRS resource sets by a combination of the field in the DCI that indicates whether the uplink shared channel message is associated with the more than one uplink shared channel and whether the message comprising the DCI is received within the first control resource set associated with the first control resource set index value or the second control resource set associated with the second control resource set index value; and interpreting the one or more SRI fields comprises selecting, from the one or more SRS resource sets indicated from the plurality of SRS resource sets, the at least one SRS resource for transmitting the uplink shared channel message in accordance with the one or more SRI fields.

Aspect 20: The method of aspect 19, wherein a first SRS resource set is indicated from the plurality of SRS resource sets when the field in the DCI indicates that the uplink shared channel message is associated with a single uplink shared channel and the message comprising the DCI is received within the first control resource set associated with the first control resource set index value; a second SRS resource set is indicated from the plurality of SRS resource sets when the field in the DCI indicates that the uplink shared channel message is associated with the single uplink shared channel and the message comprising the DCI is received within the second control resource set associated with the second control resource set index value; a third SRS resource set is indicated from the plurality of SRS resource sets when the field in the DCI indicates that the uplink shared channel message is associated with the more than one uplink shared channel and the message comprising the DCI is received within the first control resource set associated with the first control resource set index value; and a fourth SRS resource set is indicated from the plurality of SRS resource sets when the field in the DCI indicates that the uplink shared channel message is associated with the more than one uplink shared channel and the message comprising the DCI is received within the second control resource set associated with the first control resource set index value.

Aspect 21: The method of aspect 20, wherein the first SRS resource set and the third SRS resource set are associated with a first set of common power control parameters; the second SRS resource set and the fourth SRS resource set are associated with a second set of common power control parameters; a first quantity of SRS resources in the first SRS resource set and the third SRS resource set are the same; and a second quantity of SRS resources in the second SRS resource set and the fourth SRS resource set are the same.

Aspect 22: The method of any of aspects 20 through 21, wherein a first SRS resource having a first position within the first SRS resource set and a second SRS resource having the first position within the third SRS resource set are associated with a same beam, a same TCI state, a same spatial relation information, or a combination thereof; a third SRS resource having a second position within the second SRS resource set and a fourth SRS resource having the second position within the fourth SRS resource set are associated with a same beam, a same TCI state, a same spatial relation information, or a combination thereof; the first SRS resource having a first position within the third SRS resource set is associated with a smaller quantity of ports than a second SRS resource having the first position within the first SRS resource set; and the third SRS resource having a second position within the fourth SRS resource set is associated with a smaller quantity of ports than a fourth SRS resource having the second position within the second SRS resource set.

Aspect 23: The method of any of aspects 20 through 22, wherein if the message comprising the DCI is received within the first control resource set, the field including information indicative of whether the uplink shared channel message is associated with more than one uplink shared channel that overlap at least partially in the time domain comprises one bit that indicates: the first SRS resource set if the uplink shared channel message is associated with the single uplink shared channel, or the third SRS resource set if the uplink shared channel message is associated with the more than one uplink shared channel; and if the message comprising the DCI is received within the second control resource set, the field including information indicative of whether the uplink shared channel message is associated with more than one uplink shared channel that overlap at least partially in the time domain comprises one bit that indicates: the second SRS resource set if the uplink shared channel message is associated with the single uplink shared channel, or the fourth SRS resource set if the uplink shared channel message is associated with the more than one uplink shared channel.

Aspect 24: The method of any of aspects 19 through 23, wherein interpreting the one or more SRI fields is based at least in part on a combination of the field in the DCI that indicates whether the uplink shared channel message is associated with the more than one uplink shared channel and whether the message comprising the DCI is received within the first control resource set associated with the first control resource set index value or the second control resource set associated with the second control resource set index value; and interpreting the one or more TPMI fields is based at least in part on a quantity of ports associated with the selected at least one SRS resource for transmitting the uplink shared channel message.

Aspect 25: The method of any of aspects 12 through 24, wherein the field including information indicative of whether the uplink shared channel message is associated with more than one uplink shared channel that overlap at least partially in the time domain comprises one bit that indicates: the uplink shared channel message is associated with a single uplink shared channel; or the uplink shared channel message is associated with the more than one uplink shared channel that overlap at least partially in the time domain.

Aspect 26: A method for wireless communication by a network entity, comprising: transmitting one or more control messages that indicate: a quantity of a plurality of SRS resource sets, a quantity of one or more SRI fields included in one or more control messages, and a quantity of one or more TPMI fields included in the one or more control messages, wherein the plurality of SRS resource sets are configured for CB usage, and at least one maximum rank value that is associated with uplink shared channel transmissions from a UE, the at least one maximum rank value being based at least in part on a threshold quantity of rank values supported by the UE; transmitting a message comprising DCI that schedules an uplink shared channel message, the DCI including one or more SRI fields and one or more TPMI fields; and receiving the uplink shared channel message in accordance with according to a mapping between a content of the one or more TPMI fields and a quantity of ports associated with at least one SRS resource from the plurality of SRS resource sets, the mapping being indicated by: a quantity of the at least one maximum rank value, and a maximum quantity of ports the UE is capable of supporting.

Aspect 27: The method of aspect 26, further comprising: receiving, via a capability report, information associated with the maximum quantity of ports the UE is capable of supporting when the uplink shared channel message is associated with more than one uplink shared channel that overlap at least partially in a time domain, when the uplink shared channel message is associated with a single uplink shared channel, or both, wherein transmitting the message comprising the DCI is based at least in part on transmitting the information via the capability report.

Aspect 28: The method of any of aspects 26 through 27, further comprising: transmitting an indication of a configuration associated with the at least one maximum rank value, wherein the configuration is either a first configuration or a second configuration, and wherein: the first configuration indicates that, if the uplink shared channel message is associated with a single uplink shared channel, the maximum quantity of ports associated with the uplink shared channel message is equal to a larger between a first maximum quantity of ports of a first SRS resource and a second maximum quantity of ports of a second SRS resource, and the second configuration indicates that, if the uplink shared channel message is associated with the single uplink shared channel, the maximum quantity of ports associated with the uplink shared channel message is equal to a summation of the first maximum quantity of ports of the first SRS resource and the second maximum quantity of ports of the second SRS resource.

Aspect 29: The method of aspect 28, wherein the configuration is indicated per DCI format, per bandwidth part, or per component carrier.

Aspect 30: The method of any of aspects 26 through 29, wherein transmitting the one or more control messages that indicate the at least one maximum rank value further comprises: transmitting an indication of a respective maximum rank value for each respective SRS resource set of the plurality of SRS resource sets configured at the UE.

Aspect 31: The method of aspect 30, wherein an interpretation of the one or more TPMI fields is independent of whether the uplink shared channel message is associated with more than one uplink shared channel that overlap at least partially in a time domain; an interpretation of the one or more SRI fields is independent of whether the uplink shared channel message is associated with the more than one uplink shared channel that overlap at least partially in the time domain; the at least one maximum rank value that is associated with uplink shared channel transmissions from the UE is applicable when the uplink shared channel message is associated with a single uplink shared channel or the more than one uplink shared channel that overlap at least partially in the time domain; and a threshold quantity of ports supported by the UE are applicable when the uplink shared channel message is associated with the single uplink shared channel or the more than one uplink shared channel that overlap at least partially in the time domain.

Aspect 32: The method of any of aspects 30 through 31, wherein the respective maximum rank value for each respective SRS resource set of the plurality of SRS resource sets is applicable when the uplink shared channel message is associated with a single uplink shared channel or more than one uplink shared channel that overlap at least partially in a time domain.

Aspect 33: The method of any of aspects 26 through 32, wherein each maximum rank value of the at least one maximum rank value is indicated per control resource set index value, per SRS resource set, per DCI format, per bandwidth part, or per component carrier.

Aspect 34: The method of any of aspects 26 through 33, wherein transmitting the one or more control messages that indicate the at least one maximum rank value further comprises: transmitting an indication of a baseline maximum rank value that is applicable to any one or more of the plurality of SRS resource sets when the uplink shared channel message is associated with a single uplink shared channel; and transmitting an indication of a respective set of one or more maximum rank values for each respective SRS resource set of the plurality of SRS resource sets, wherein the respective set of one or more maximum rank values for each respective SRS resource set are applicable to that respective SRS resource set when the uplink shared channel message is associated with more than one uplink shared channel that overlap at least partially in a time domain, and wherein the baseline maximum rank value is less than or equal to a summation of the respective set of one or more maximum rank values for each respective SRS resource set of the plurality of SRS resource sets.

Aspect 35: The method of aspect 34, wherein if the uplink shared channel message is associated with the single uplink shared channel, the one or more TPMI fields each indicate a rank value less than or equal to the baseline maximum rank value; and if the uplink shared channel message is associated with the more than one uplink shared channel that overlap at least partially in the time domain, the one or more TPMI fields each indicate rank values that are less than or equal to the respective set of one or more maximum rank values for each respective SRS resource set of the more than one uplink shared channel that overlap at least partially in the time domain.

Aspect 36: The method of any of aspects 34 through 35, wherein an interpretation of the one or more TPMI fields is independent of whether the uplink shared channel message is associated with the more than one uplink shared channel that overlap at least partially in the time domain; an interpretation of the one or more SRI fields is independent of whether the uplink shared channel message is associated with the more than one uplink shared channel that overlap at least partially in the time domain; if the uplink shared channel message is associated with the single uplink shared channel, the one or more SRI fields each indicate a quantity of ports less than or equal to the maximum quantity of ports the UE is capable of supporting; and if the uplink shared channel message is associated with the more than one uplink shared channel that overlap at least partially in the time domain, the one or more SRI fields each indicate quantities of ports that are less than or equal to multiple maximum quantities of ports for each respective SRS resource set of the more than one uplink shared channel, wherein the maximum quantity of ports the UE is capable of supporting is equal to a summation of the multiple maximum quantities of ports for each respective SRS resource set.

Aspect 37: The method of any of aspects 26 through 36, wherein the DCI comprises a field including information indicative of whether the uplink shared channel message is associated with more than one uplink shared channel that overlap at least partially in a time domain; and the mapping is further indicated by whether the uplink shared channel message is associated with the more than one uplink shared channel that overlap at least partially in the time domain.

Aspect 38: The method of aspect 37, wherein if the field in the DCI indicates that the uplink shared channel message is associated with a single uplink shared channel, an interpretation of the one or more TPMI fields comprises interpreting the one or more TPMI fields according to the mapping between the content of the one or more TPMI fields and each of the quantity of ports associated with one SRS resource for the single uplink shared channels; and if the field in the DCI indicates that the uplink shared channel message is associated with the more than one uplink shared channel that overlap at least partially in the time domain, an interpretation of the one or more TPMI fields comprises interpreting the one or more TPMI fields according to a first mapping between the content of a first TPMI field and a first subset of a first quantity of ports associated with a first SRS resource from a first SRS resource set and a second mapping between the content of a second TPMI field and a second subset of a second quantity of ports associated with a second SRS resource from a second SRS resource set.

Aspect 39: The method of aspect 38, wherein the first subset comprises a first half of the first quantity of ports associated with the first SRS resource; and the second subset comprises a first half of the second quantity of ports associated with the second SRS resource.

Aspect 40: The method of any of aspects 38 through 39, wherein transmitting the one or more control messages further comprises: transmitting an indication of the first subset of the first quantity of ports associated with the first SRS resource and the second subset of the second quantity of ports associated with the second SRS resource.

Aspect 41: The method of any of aspects 38 through 40, further comprising: receiving, via a capability report, information indicating the first subset of the first quantity of ports associated with the first SRS resource and the second subset of the second quantity of ports associated with the second SRS resource, the first subset and the second subset corresponding to maximum quantities of ports the UE is capable of supporting for the first SRS resource and the second SRS resource when the uplink shared channel message is associated with the more than one uplink shared channel that overlap at least partially in the time domain.

Aspect 42: The method of any of aspects 38 through 41, wherein the interpretation of the one or more SRI fields is independent of whether the uplink shared channel message is associated with the more than one uplink shared channel that overlap at least partially in the time domain.

Aspect 43: The method of any of aspects 37 through 42, wherein a size of each of the one or more TPMI fields corresponds to the maximum quantity of ports the UE is capable of supporting when the uplink shared channel message is associated with more than one uplink shared channel that overlap at least partially in the time domain.

Aspect 44: The method of any of aspects 37 through 43, wherein transmitting the message comprising the DCI comprises transmitting the message within a first control resource set associated with a first control resource set index value, transmitting the message within a second control resource set associated with a second control resource set index value, or a combination thereof; one or more SRS resource sets are indicated from the plurality of SRS resource sets by a combination of the field in the DCI that indicates whether the uplink shared channel message is associated with the more than one uplink shared channel and whether the message comprising the DCI is transmitted within the first control resource set associated with the first control resource set index value or the second control resource set associated with the second control resource set index value; and an interpretation of the one or more SRI fields comprises selecting, from the one or more SRS resource sets indicated from the plurality of SRS resource sets, the at least one SRS resource for receiving the uplink shared channel message in accordance with the one or more SRI fields.

Aspect 45: The method of aspect 44, wherein a first SRS resource set is indicated from the plurality of SRS resource sets when the field in the DCI indicates that the uplink shared channel message is associated with a single uplink shared channel and the message comprising the DCI is transmitted within the first control resource set associated with the first control resource set index value; a second SRS resource set is indicated from the plurality of SRS resource sets when the field in the DCI indicates that the uplink shared channel message is associated with the single uplink shared channel and the message comprising the DCI is transmitted within the second control resource set associated with the second control resource set index value; a third SRS resource set is indicated from the plurality of SRS resource sets when the field in the DCI indicates that the uplink shared channel message is associated with the more than one uplink shared channel and the message comprising the DCI is transmitted within the first control resource set associated with the first control resource set index value; and a fourth SRS resource set is indicated from the plurality of SRS resource sets when the field in the DCI indicates that the uplink shared channel message is associated with the more than one uplink shared channel and the message comprising the DCI is transmitted within the second control resource set associated with the first control resource set index value.

Aspect 46: The method of aspect 45, wherein the first SRS resource set and the third SRS resource set are associated with a first set of common power control parameters; the second SRS resource set and the fourth SRS resource set are associated with a second set of common power control parameters; a first quantity of SRS resources in the first SRS resource set and the third SRS resource set are the same; and a second quantity of SRS resources in the second SRS resource set and the fourth SRS resource set are the same.

Aspect 47: The method of any of aspects 45 through 46, wherein a first SRS resource having a first position within the first SRS resource set and a second SRS resource having the first position within the third SRS resource set are associated with a same beam, a same TCI state, a same spatial relation information, or a combination thereof; and a third SRS resource having a second position within the second SRS resource set and a fourth SRS resource having the second position within the fourth SRS resource set are associated with a same beam, a same TCI state, a same spatial relation information, or a combination thereof; the first SRS resource having a first position within the third SRS resource set is associated with a smaller quantity of ports than a second SRS resource having the first position within the first SRS resource set; and the third SRS resource having a second position within the fourth SRS resource set is associated with a smaller quantity of ports than a fourth SRS resource having the second position within the second SRS resource set.

Aspect 48: The method of any of aspects 45 through 47, wherein if the message comprising the DCI is transmitted within the first control resource set, the field including information indicative of whether the uplink shared channel message is associated with more than one uplink shared channel that overlap at least partially in the time domain comprises one bit that indicates: the first SRS resource set if the uplink shared channel message is associated with the single uplink shared channel, or the third SRS resource set if the uplink shared channel message is associated with the more than one uplink shared channel; and if the message comprising the DCI is transmitted within the second control resource set, the field including information indicative of whether the uplink shared channel message is associated with more than one uplink shared channel that overlap at least partially in the time domain comprises one bit that indicates: the second SRS resource set if the uplink shared channel message is associated with the single uplink shared channel, or the fourth SRS resource set if the uplink shared channel message is associated with the more than one uplink shared channel.

Aspect 49: The method of any of aspects 44 through 48, wherein the interpretation of the one or more SRI fields is based at least in part on a combination of the field in the DCI that indicates whether the uplink shared channel message is associated with the more than one uplink shared channel and whether the message comprising the DCI is transmitted within the first control resource set associated with the first control resource set index value or the second control resource set associated with the second control resource set index value; and an interpretation of the one or more TPMI fields is based at least in part on a quantity of ports associated with the selected at least one SRS resource for receiving the uplink shared channel message.

Aspect 50: The method of any of aspects 37 through 49, wherein the field including information indicative of whether the uplink shared channel message is associated with more than one uplink shared channel that overlap at least partially in the time domain comprises one bit that indicates: the uplink shared channel message is associated with a single uplink shared channel; or the uplink shared channel message is associated with the more than one uplink shared channel that overlap at least partially in the time domain.

Aspect 51: A UE for wireless communication, comprising one or more memories and one or more processors coupled to the one or more memories and individually or collectively configured to perform a method of any of aspects 1 through 25.

Aspect 52: A UE for wireless communication, comprising at least one means for performing a method of any of aspects 1 through 25.

Aspect 53: A non-transitory computer-readable medium storing code for wireless communication, the code comprising instructions executable by one or more processors to perform a method of any of aspects 1 through 25.

Aspect 54: A network entity for wireless communication, comprising one or more memories and one or more processors coupled to the one or more memories and individually or collectively configured to perform a method of any of aspects 26 through 50.

Aspect 55: A network entity for wireless communication, comprising at least one means for performing a method of any of aspects 26 through 50.

Aspect 56: A non-transitory computer-readable medium storing code for wireless communication, the code comprising instructions executable by one or more processors to perform a method of any of aspects 26 through 50.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communication, comprising: one or more memories; and one or more processors coupled to the one or more memories and individually or collectively configured to:

receive one or more control messages that indicate:

a quantity of a plurality of sound reference signal (SRS) resource sets, a quantity of one or more SRS resource indicator fields included in one or more control messages, and a quantity of one or more transmit precoding matrix indicator (TPMI) fields included in the one or more control messages, wherein the plurality of SRS resource sets are configured for codebook usage, and at least one maximum rank value that be associated with uplink shared channel transmissions from the UE, the at least one maximum rank value being based at least in part on a threshold quantity of rank values supported by the UE;

receive a message comprising downlink control information that schedules an uplink shared channel message, the downlink control information including one or more SRS resource indicator fields and one or more TPMI fields;

interpret the one or more SRS resource indicator fields and the one or more TPMI fields according to a mapping between a content of the one or more TPMI fields and a quantity of ports associated with at least one SRS resource from the plurality of SRS resource sets, the mapping being indicated by:

a quantity of the at least one maximum rank value, and a maximum quantity of ports the UE is capable of supporting; and transmit the uplink shared channel message in accordance with the mapping between the content of the one or more TPMI fields and the quantity of ports associated with the at least one SRS resource from the plurality of SRS resource sets.

2. The UE of claim 1, wherein the one or more processors are individually or collectively further configured to transmit, via a capability report, information associated with the maximum quantity of ports the UE is capable of supporting when the uplink shared channel message is associated with more than one uplink shared channel that overlap at least partially in a time domain, when the uplink shared channel message is associated with a single uplink shared channel, or both, wherein receiving the message comprising the downlink control information is based at least in part on transmitting the information via the capability report.

3. The UE of claim 1, wherein the one or more processors are individually or collectively further configured to:

receive an indication of a configuration associated with the at least one maximum rank value, wherein the configuration is either a first configuration or a second configuration, and wherein:

the first configuration indicates that, if the uplink shared channel message is associated with a single uplink shared channel, the maximum quantity of ports associated with the uplink shared channel message is equal to a larger between a first maximum quantity of ports of a first SRS resource and a second maximum quantity of ports of a second SRS resource, and the second configuration indicates that, if the uplink shared channel message is associated with the single uplink shared channel, the maximum quantity of ports associated with the uplink shared channel message is equal to a summation of the first maximum quantity of ports of the first SRS resource and the second maximum quantity of ports of the second SRS resource.

4. The UE of claim 3, wherein:

the configuration is indicated per downlink control information format, per bandwidth part, or per component carrier.

5. The UE of claim 1, wherein to receive the one or more control messages that indicate the at least one maximum rank value, the one or more processors are individually or collectively further configured to receive an indication of a respective maximum rank value for each respective SRS resource set of the plurality of SRS resource sets configured at the UE.

6. The UE of claim 5, wherein:

interpreting the one or more TPMI fields is independent of whether the uplink shared channel message is associated with more than one uplink shared channel that overlap at least partially in a time domain;

interpreting the one or more SRS resource indicator fields is independent of whether the uplink shared channel message is associated with the more than one uplink shared channel that overlap at least partially in the time domain;

the at least one maximum rank value that is associated with uplink shared channel transmissions from the UE is applicable when the uplink shared channel message is associated with a single uplink shared channel or the more than one uplink shared channel that overlap at least partially in the time domain; and a threshold quantity of ports supported by the UE are applicable when the uplink shared channel message is associated with the single uplink shared channel or the more than one uplink shared channel that overlap at least partially in the time domain.

7. The UE of claim 5, wherein the respective maximum rank value for each respective SRS resource set of the plurality of SRS resource sets is applicable when the uplink shared channel message is associated with a single uplink shared channel or more than one uplink shared channel that overlap at least partially in a time domain.

8. The UE of claim 1, wherein:

each maximum rank value of the at least one maximum rank value is indicated per control resource set index value, per SRS resource set, per downlink control information format, per bandwidth part, or per component carrier.

9. The UE of claim 1, wherein to receive the one or more control messages that indicate the at least one maximum rank value, the one or more processors are individually or collectively further configured to:

receive an indication of a baseline maximum rank value that is applicable to any one or more of the plurality of SRS resource sets when the uplink shared channel message is associated with a single uplink shared channel; and receive an indication of a respective set of one or more maximum rank values for each respective SRS resource set of the plurality of SRS resource sets, wherein the respective set of one or more maximum rank values for each respective SRS resource set are applicable to that respective SRS resource set when the uplink shared channel message is associated with more than one uplink shared channel that overlap at least partially in a time domain, and wherein the baseline maximum rank value is less than or equal to a summation of the respective set of one or more maximum rank values for each respective SRS resource set of the plurality of SRS resource sets.

10. The UE of claim 9, wherein:

if the uplink shared channel message is associated with the single uplink shared channel, the one or more TPMI fields each indicate a rank value less than or equal to the baseline maximum rank value; and if the uplink shared channel message is associated with the more than one uplink shared channel that overlap at least partially in the time domain, the one or more TPMI fields each indicate rank values that are less than or equal to the respective set of one or more maximum rank values for each respective SRS resource set of the more than one uplink shared channel that overlap at least partially in the time domain.

11. The UE of claim 9, wherein:

interpreting the one or more TPMI fields is independent of whether the uplink shared channel message is associated with the more than one uplink shared channel that overlap at least partially in the time domain;

interpreting the one or more SRS resource indicator fields is independent of whether the uplink shared channel message is associated with the more than one uplink shared channel that overlap at least partially in the time domain;

if the uplink shared channel message is associated with the single uplink shared channel, the one or more SRS resource indicator fields each indicate a quantity of ports less than or equal to the maximum quantity of ports the UE is capable of supporting; and if the uplink shared channel message is associated with the more than one uplink shared channel that overlap at least partially in the time domain, the one or more SRS resource indicator fields each indicate quantities of ports that are less than or equal to multiple maximum quantities of ports for each respective SRS resource set of the more than one uplink shared channel, wherein the maximum quantity of ports the UE is capable of supporting is equal to a summation of the multiple maximum quantities of ports for each respective SRS resource set.

12. The UE of claim 1, wherein:

the downlink control information comprises a field including information indicative of whether the uplink shared channel message is associated with more than one uplink shared channel that overlap at least partially in a time domain; and the mapping is further indicated by whether the uplink shared channel message is associated with the more than one uplink shared channel that overlap at least partially in the time domain.

13. The UE of claim 12, wherein:

if the field in the downlink control information indicates that the uplink shared channel message is associated with a single uplink shared channel, interpreting the one or more TPMI fields comprises interpreting the one or more TPMI fields according to the mapping between the content of the one or more TPMI fields and each of the quantity of ports associated with one SRS resource for the single uplink shared channel; and if the field in the downlink control information indicates that the uplink shared channel message is associated with the more than one uplink shared channel that overlap at least partially in the time domain, interpreting the one or more TPMI fields comprises interpreting the one or more TPMI fields according to a first mapping between the content of a first TPMI field and a first subset of a first quantity of ports associated with a first SRS resource from a first SRS resource set and a second mapping between the content of a second TPMI field and a second subset of a second quantity of ports associated with a second SRS resource from a second SRS resource set.

14. The UE of claim 13, wherein:

the first subset comprises a first half of the first quantity of ports associated with the first SRS resource; and the second subset comprises a first half of the second quantity of ports associated with the second SRS resource.

15. The UE of claim 13, wherein to receive the one or more control messages, the one or more processors are individually or collectively further configured to receive an indication of the first subset of the first quantity of ports associated with the first SRS resource and the second subset of the second quantity of ports associated with the second SRS resource.

16. The UE of claim 13, wherein the one or more processors are individually or collectively further configured to transmit, via a capability report, information indicating the first subset of the first quantity of ports associated with the first SRS resource and the second subset of the second quantity of ports associated with the second SRS resource, the first subset and the second subset corresponding to maximum quantities of ports the UE is capable of supporting for the first SRS resource and the second SRS resource when the uplink shared channel message is associated with the more than one uplink shared channel that overlap at least partially in the time domain.

17. The UE of claim 13, wherein interpreting the one or more SRS resource indicator fields is independent of whether the uplink shared channel message is associated with the more than one uplink shared channel that overlap at least partially in the time domain.

18. The UE of claim 12, wherein a size of each of the one or more TPMI fields corresponds to the maximum quantity of ports the UE is capable of supporting when the uplink shared channel message is associated with more than one uplink shared channel that overlap at least partially in the time domain.

19. The UE of claim 12, wherein:

receiving the message comprising the downlink control information comprises receiving the message within a first control resource set associated with a first control resource set index value, receiving the message within a second control resource set associated with a second control resource set index value, or a combination thereof;

one or more SRS resource sets are indicated from the plurality of SRS resource sets by a combination of the field in the downlink control information that indicates whether the uplink shared channel message is associated with the more than one uplink shared channel and whether the message comprising the downlink control information is received within the first control resource set associated with the first control resource set index value or the second control resource set associated with the second control resource set index value; and interpreting the one or more SRS resource indicator fields comprises selecting, from the one or more SRS resource sets indicated from the plurality of SRS resource sets, the at least one SRS resource for transmitting the uplink shared channel message in accordance with the one or more SRS resource indicator fields.

20. The UE of claim 19, wherein:

a first SRS resource set is indicated from the plurality of SRS resource sets when the field in the downlink control information indicates that the uplink shared channel message is associated with a single uplink shared channel and the message comprising the downlink control information is received within the first control resource set associated with the first control resource set index value;

a second SRS resource set is indicated from the plurality of SRS resource sets when the field in the downlink control information indicates that the uplink shared channel message is associated with the single uplink shared channel and the message comprising the downlink control information is received within the second control resource set associated with the second control resource set index value;

a third SRS resource set is indicated from the plurality of SRS resource sets when the field in the downlink control information indicates that the uplink shared channel message is associated with the more than one uplink shared channel and the message comprising the downlink control information is received within the first control resource set associated with the first control resource set index value; and a fourth SRS resource set is indicated from the plurality of SRS resource sets when the field in the downlink control information indicates that the uplink shared channel message is associated with the more than one uplink shared channel and the message comprising the downlink control information is received within the second control resource set associated with the first control resource set index value.

21. The UE of claim 20, wherein:

the first SRS resource set and the third SRS resource set are associated with a first set of common power control parameters;

the second SRS resource set and the fourth SRS resource set are associated with a second set of common power control parameters;

a first quantity of SRS resources in the first SRS resource set and the third SRS resource set are the same; and a second quantity of SRS resources in the second SRS resource set and the fourth SRS resource set are the same.

22. The UE of claim 20, wherein:

a first SRS resource having a first position within the first SRS resource set and a second SRS resource having the first position within the third SRS resource set are associated with a same beam, a same transmission configuration indicator state, a same spatial relation information, or a combination thereof;

a third SRS resource having a second position within the second SRS resource set and a fourth SRS resource having the second position within the fourth SRS resource set are associated with a same beam, a same transmission configuration indicator state, a same spatial relation information, or a combination thereof;

the first SRS resource having the first position within the third SRS resource set is associated with a smaller quantity of ports than the second SRS resource having the first position within the first SRS resource set; and the third SRS resource having the second position within the fourth SRS resource set is associated with a smaller quantity of ports than the fourth SRS resource having the second position within the second SRS resource set.

23. The UE of claim 20, wherein:

if the message comprising the downlink control information is received within the first control resource set, the field including information indicative of whether the uplink shared channel message is associated with more than one uplink shared channel that overlap at least partially in the time domain comprises one bit that indicates:

the first SRS resource set if the uplink shared channel message is associated with the single uplink shared channel, or the third SRS resource set if the uplink shared channel message is associated with the more than one uplink shared channel; and if the message comprising the downlink control information is received within the second control resource set, the field including information indicative of whether the uplink shared channel message is associated with more than one uplink shared channel that overlap at least partially in the time domain comprises one bit that indicates:

the second SRS resource set if the uplink shared channel message is associated with the single uplink shared channel, or the fourth SRS resource set if the uplink shared channel message is associated with the more than one uplink shared channel.

24. The UE of claim 19, wherein:

interpreting the one or more SRS resource indicator fields is based at least in part on a combination of the field in the downlink control information that indicates whether the uplink shared channel message is associated with the more than one uplink shared channel and whether the message comprising the downlink control information is received within the first control resource set associated with the first control resource set index value or the second control resource set associated with the second control resource set index value; and interpreting the one or more TPMI fields is based at least in part on a quantity of ports associated with the selected at least one SRS resource for transmitting the uplink shared channel message.

25. The UE of claim 12, wherein the field including information indicative of whether the uplink shared channel message is associated with more than one uplink shared channel that overlap at least partially in the time domain comprises one bit that indicates:

the uplink shared channel message is associated with a single uplink shared channel; or the uplink shared channel message is associated with the more than one uplink shared channel that overlap at least partially in the time domain.

26. A network entity for wireless communication, comprising: one or more memories; and one or more processor coupled to the one or more memories and individually or collectively configured to:

transmit one or more control messages that indicate:

a quantity of a plurality of sound reference signal (SRS) resource sets, a quantity of one or more SRS resource indicator fields included in one or more control messages, and a quantity of one or more transmit precoding matrix indicator (TPMI) fields included in the one or more control messages, wherein the plurality of SRS resource sets are configured for codebook usage, and at least one maximum rank value that be associated with uplink shared channel transmissions from a user equipment (UE), the at least one maximum rank value being based at least in part on a threshold quantity of rank values supported by the UE;

transmit a message comprising downlink control information that schedules an uplink shared channel message, the downlink control information including one or more SRS resource indicator fields and one or more TPMI fields; and receive the uplink shared channel message in accordance with according to a mapping between a content of the one or more TPMI fields and a quantity of ports associated with at least one SRS resource from the plurality of SRS resource sets, the mapping being indicated by:

a quantity of the at least one maximum rank value, and a maximum quantity of ports the UE is capable of supporting.

27. The network entity of claim 26, wherein the one or more processors are individually or collectively further configured to receive, via a capability report, information associated with the maximum quantity of ports the UE is capable of supporting when the uplink shared channel message is associated with more than one uplink shared channel that overlap at least partially in a time domain, when the uplink shared channel message is associated with a single uplink shared channel, or both, wherein transmitting the message comprising the downlink control information is based at least in part on transmitting the information via the capability report.

28. The network entity of claim 26, wherein the one or more processors are individually or collectively further configured to:

transmit an indication of a configuration associated with the at least one maximum rank value, wherein the configuration is either a first configuration or a second configuration, and wherein:

the first configuration indicates that, if the uplink shared channel message is associated with a single uplink shared channel, the maximum quantity of ports associated with the uplink shared channel message is equal to a larger between a first maximum quantity of ports of a first SRS resource and a second maximum quantity of ports of a second SRS resource, and the second configuration indicates that, if the uplink shared channel message is associated with the single uplink shared channel, the maximum quantity of ports associated with the uplink shared channel message is equal to a summation of the first maximum quantity of ports of the first SRS resource and the second maximum quantity of ports of the second SRS resource.

29. A method for wireless communication by a user equipment (UE), comprising:

receiving one or more control messages that indicate:

a quantity of a plurality of sounding reference signal (SRS) resource sets, a quantity of one or more SRS resource indicator fields included in one or more control messages, and a quantity of one or more transmit precoding matrix indicator (TPMI) fields included in the one or more control messages, wherein the plurality of SRS resource sets are configured for codebook usage, and at least one maximum rank value that is associated with uplink shared channel transmissions from the UE, the at least one maximum rank value being based at least in part on a threshold quantity of rank values supported by the UE;

receiving a message comprising downlink control information that schedules an uplink shared channel message, the downlink control information including one or more SRS resource indicator fields and one or more TPMI fields;

interpreting the one or more SRS resource indicator fields and the one or more TPMI fields according to a mapping between a content of the one or more TPMI fields and a quantity of ports associated with at least one SRS resource from the plurality of SRS resource sets, the mapping being indicated by:

a quantity of the at least one maximum rank value, and a maximum quantity of ports the UE is capable of supporting; and transmitting the uplink shared channel message in accordance with the mapping between the content of the one or more TPMI fields and the quantity of ports associated with the at least one SRS resource from the plurality of SRS resource sets.

30. A method for wireless communication by a network entity, comprising:

transmitting one or more control messages that indicate:

a quantity of a plurality of sounding reference signal (SRS) resource sets, a quantity of one or more SRS resource indicator fields included in one or more control messages, and a quantity of one or more transmit precoding matrix indicator (TPMI) fields included in the one or more control messages, wherein the plurality of SRS resource sets are configured for codebook usage, and at least one maximum rank value that is associated with uplink shared channel transmissions from a user equipment (UE), the at least one maximum rank value being based at least in part on a threshold quantity of rank values supported by the UE;

transmitting a message comprising downlink control information that schedules an uplink shared channel message, the downlink control information including one or more SRS resource indicator fields and one or more TPMI fields; and receiving the uplink shared channel message in accordance with according to a mapping between a content of the one or more TPMI fields and a quantity of ports associated with at least one SRS resource from the plurality of SRS resource sets, the mapping being indicated by:

a quantity of the at least one maximum rank value, and a maximum quantity of ports the UE is capable of supporting.

* * * * *